United States Patent
Rubenstein et al.

(10) Patent No.: US 12,513,096 B2
(45) Date of Patent: *Dec. 30, 2025

(54) SYSTEM AND METHOD FOR VIRTUAL INTERFACES AND ADVANCED SMART ROUTING IN A GLOBAL VIRTUAL NETWORK

(71) Applicant: UMBRA Technologies Ltd., Hong Kong (CN)

(72) Inventors: Joseph E. Rubenstein, Beijing (CN); Carlos Eduardo Oré, Saint-Herblain (FR); Thibaud Auguste Bernard Jean Saint-Martin, Aubignan (FR)

(73) Assignee: UMBRA Technologies Ltd., British Virgin Islands (GB)

( * ) Notice: Subject to any disclaimer, the term of this patent is extended or adjusted under 35 U.S.C. 154(b) by 17 days.

This patent is subject to a terminal disclaimer.

(21) Appl. No.: 19/234,943

(22) Filed: Jun. 11, 2025

(65) Prior Publication Data

US 2025/0310275 A1 Oct. 2, 2025

Related U.S. Application Data

(63) Continuation of application No. 18/486,942, filed on Oct. 13, 2023, now Pat. No. 12,341,706, which is a
(Continued)

(51) Int. Cl.
*H04L 47/70* (2022.01)
*G06F 9/4401* (2018.01)
(Continued)

(52) U.S. Cl.
CPC .......... *H04L 47/825* (2013.01); *G06F 9/4401* (2013.01); *G06F 9/4416* (2013.01);
(Continued)

(58) Field of Classification Search
CPC ..... H04L 45/22; H04L 45/28; H04L 12/4641; H04L 45/302; H04L 45/64
See application file for complete search history.

(56) References Cited

U.S. PATENT DOCUMENTS 4,890,281 A * 12/1989 Balboni ............... H04L 49/203
370/415
6,209,039 B1 3/2001 Albright et al.
(Continued)

FOREIGN PATENT DOCUMENTS

AU 2014381693 B2 11/2019
CN 1392708 A 1/2003
(Continued)

OTHER PUBLICATIONS

Chowdhury, N.M.M.K. et al., "Virtual Network Embedding with Coordinated Node and Link Mapping", IEEE Communications Society Subject Matter Experts for Publication in the IEEE Infocom 2009, pp. 783-791. (Year: 2009) (9 pages).
(Continued)

*Primary Examiner* — Parth Patel
(74) *Attorney, Agent, or Firm* — Gardella Alcati

(57) ABSTRACT

Systems and methods for connecting devices via a virtual global network are disclosed. In one embodiment the network system may comprise an endpoint device including a tunnel manager and a first virtual interface, an access point server including at least one tunnel listener and a second virtual interface. One or more tunnels are formed connecting the tunnel managers and tunnel listeners. The virtual interfaces provide a logical point of access to the one or more tunnels.

17 Claims, 67 Drawing Sheets

Related U.S. Application Data continuation of application No. 16/872,148, filed on May 11, 2020, now Pat. No. 11,799,687, which is a continuation of application No. 15/563,246, filed as application No. PCT/IB2016/000531 on Apr. 7, 2016, now Pat. No. 10,659,256.

(60) Provisional application No. 62/151,174, filed on Apr. 22, 2015, provisional application No. 62/144,293, filed on Apr. 7, 2015.

(51) Int. Cl.

| | | |
|---|---|---|
| *G06F 21/57* | (2013.01) | |
| *H04L 9/08* | (2006.01) | |
| *H04L 9/40* | (2022.01) | |
| *H04L 12/46* | (2006.01) | |
| *H04L 45/00* | (2022.01) | |
| *H04L 45/28* | (2022.01) | |
| *H04L 45/302* | (2022.01) | |
| *H04L 45/64* | (2022.01) | |
| *H04L 47/83* | (2022.01) | |

(52) U.S. Cl.
CPC .............. *G06F 21/575* (2013.01); *H04L 9/08* (2013.01); *H04L 12/4633* (2013.01); *H04L 12/465* (2013.01); *H04L 45/22* (2013.01); *H04L 45/28* (2013.01); *H04L 45/302* (2013.01); *H04L 45/64* (2013.01); *H04L 47/83* (2022.05); *H04L 63/02* (2013.01); *H04L 63/0218* (2013.01); *H04L 63/0236* (2013.01); *H04L 63/0254* (2013.01); *H04L 63/0263* (2013.01); *H04L 63/0272* (2013.01); *H04L 12/4641* (2013.01)

(56) References Cited

U.S. PATENT DOCUMENTS

| | | | |
|---|---|---|---|
| 6,693,876 B1 | 2/2004 | Zey | |
| 7,028,183 B2 | 4/2006 | Simon et al. | |
| 7,069,318 B2 | 6/2006 | Burbeck et al. | |
| 7,161,899 B2 | 1/2007 | Limaye et al. | |
| 7,167,796 B2 * | 1/2007 | Taylor | B60R 1/088 701/25 |
| 7,173,902 B2 | 2/2007 | Daniell et al. | |
| 7,203,762 B2 | 4/2007 | Yamada et al. | |
| 7,310,348 B2 | 12/2007 | Trinh et al. | |
| 7,349,403 B2 | 3/2008 | Lee et al. | |
| 7,551,623 B1 | 6/2009 | Feroz et al. | |
| 7,689,722 B1 | 3/2010 | Timms et al. | |
| 7,742,405 B2 | 6/2010 | Trinh et al. | |
| 7,801,030 B1 * | 9/2010 | Aggarwal | H04L 45/04 370/227 |
| 7,908,350 B2 | 3/2011 | Duponchel et al. | |
| 7,957,311 B2 | 6/2011 | Trinh et al. | |
| 8,259,571 B1 | 9/2012 | Raphel et al. | |
| 8,422,397 B2 | 4/2013 | Ansari et al. | |
| 8,458,786 B1 * | 6/2013 | Kailash | H04L 63/0272 713/153 |
| 8,611,355 B1 | 12/2013 | Sella et al. | |
| 8,699,683 B1 * | 4/2014 | Jackson | H04M 15/80 379/142.18 |
| 8,854,965 B1 | 10/2014 | Richards | |
| 8,861,344 B2 | 10/2014 | Trinh et al. | |
| 8,891,522 B2 | 11/2014 | Fletcher et al. | |
| 8,892,772 B1 | 11/2014 | Filsfils et al. | |
| 8,966,075 B1 | 2/2015 | Chickering et al. | |
| 8,972,602 B2 | 3/2015 | Mithyantha | |
| 8,976,798 B2 | 3/2015 | Border et al. | |
| 9,036,589 B2 | 5/2015 | Kakadia et al. | |
| 9,038,151 B1 | 5/2015 | Chua et al. | |
| 9,137,027 B2 | 9/2015 | Matthews et al. | |
| 9,137,200 B2 | 9/2015 | Blau et al. | |
| 9,164,795 B1 | 10/2015 | Vincent | |
| 9,172,603 B2 | 10/2015 | Padmanabhan et al. | |
| 9,220,110 B2 | 12/2015 | Rune et al. | |
| 9,231,851 B2 | 1/2016 | Chen | |
| 9,241,004 B1 | 1/2016 | April | |
| 9,253,028 B2 | 2/2016 | DeCusatis et al. | |
| 9,277,452 B1 | 3/2016 | Aithal et al. | |
| 9,288,233 B2 | 3/2016 | Nakae et al. | |
| 9,294,304 B2 * | 3/2016 | Sindhu | H04L 12/4641 |
| 9,344,955 B2 | 5/2016 | Hakola et al. | |
| 9,350,710 B2 | 5/2016 | Herle et al. | |
| 9,351,193 B2 | 5/2016 | Raleigh et al. | |
| 9,432,258 B2 | 8/2016 | Van der Merwe et al. | |
| 9,432,336 B2 * | 8/2016 | Ostrowski | G06F 21/606 |
| 9,450,817 B1 | 9/2016 | Bahadur et al. | |
| 9,455,924 B2 | 9/2016 | Cicic et al. | |
| 9,485,323 B1 | 11/2016 | Stickle et al. | |
| 9,565,117 B2 | 2/2017 | Dahod et al. | |
| 9,569,587 B2 | 2/2017 | Ansari et al. | |
| 9,590,820 B1 * | 3/2017 | Shukla | H04L 45/64 |
| 9,590,902 B2 | 3/2017 | Lin et al. | |
| 9,699,001 B2 | 7/2017 | Addanki et al. | |
| 9,699,135 B2 | 7/2017 | Dinha | |
| 9,888,042 B2 | 2/2018 | Annamalaisami et al. | |
| 9,898,317 B2 * | 2/2018 | Nakil | H04L 43/10 |
| 10,009,189 B2 | 6/2018 | Wu | |
| 10,019,649 B2 | 7/2018 | Curington et al. | |
| 10,070,369 B2 | 9/2018 | Lynn, Jr. et al. | |
| 10,091,304 B2 | 10/2018 | Hoffmann | |
| 10,237,253 B2 | 3/2019 | Chen | |
| 10,659,256 B2 * | 5/2020 | Oré | H04L 63/0218 |
| 10,684,350 B2 | 6/2020 | Dupray et al. | |
| 10,904,201 B1 | 1/2021 | Ermagan et al. | |
| 11,032,187 B2 * | 6/2021 | Hassan | H04L 45/50 |
| 11,092,447 B2 * | 8/2021 | Aiello | G01C 21/36 |
| 12,341,706 B2 * | 6/2025 | Rubenstein | H04L 47/83 |
| 2003/0072433 A1 | 4/2003 | Brown et al. | |
| 2003/0147403 A1 | 8/2003 | Border et al. | |
| 2003/0233551 A1 | 12/2003 | Kouznetsov et al. | |
| 2004/0264465 A1 * | 12/2004 | Dunk | H04L 63/166 370/392 |
| 2005/0180319 A1 | 8/2005 | Hutnik et al. | |
| 2005/0235352 A1 | 10/2005 | Staats et al. | |
| 2006/0020793 A1 | 1/2006 | Rogers et al. | |
| 2006/0031407 A1 | 2/2006 | Dispensa et al. | |
| 2006/0031483 A1 * | 2/2006 | Lund | H04L 63/0236 709/224 |
| 2008/0043742 A1 | 2/2008 | Pong et al. | |
| 2008/0117927 A1 | 5/2008 | Donhauser et al. | |
| 2008/0130891 A1 | 6/2008 | Sun et al. | |
| 2008/0240121 A1 * | 10/2008 | Xiong | H04L 45/50 370/401 |
| 2008/0256166 A1 * | 10/2008 | Branson | H04L 12/4633 709/201 |
| 2008/0260151 A1 | 10/2008 | Fluhrer et al. | |
| 2009/0003223 A1 | 1/2009 | McCallum et al. | |
| 2009/0092043 A1 * | 4/2009 | Lapuh | H04L 49/552 370/409 |
| 2009/0122990 A1 * | 5/2009 | Gundavelli | H04L 63/164 380/278 |
| 2009/0129386 A1 | 5/2009 | Rune | |
| 2009/0144443 A1 * | 6/2009 | Vasseur | H04L 45/02 709/238 |
| 2009/0213754 A1 | 8/2009 | Melamed | |
| 2009/0304003 A1 | 12/2009 | Huynh Van et al. | |
| 2010/0017603 A1 | 1/2010 | Jones | |
| 2010/0325309 A1 | 12/2010 | Cicic et al. | |
| 2012/0082057 A1 * | 4/2012 | Welin | H04L 47/125 370/252 |
| 2012/0188867 A1 | 7/2012 | Fiorone et al. | |
| 2013/0246623 A1 * | 9/2013 | Seth | H04L 47/783 709/226 |
| 2013/0259465 A1 | 10/2013 | Blair | |
| 2013/0287037 A1 * | 10/2013 | Bush | H04L 45/28 370/401 |
| 2013/0322255 A1 | 12/2013 | Dillon | |
| 2014/0086253 A1 * | 3/2014 | Yong | H04L 49/70 370/395.53 |

(56) References Cited

U.S. PATENT DOCUMENTS

| | | |
|---|---|---|
| 2014/0108665 A1 | 4/2014 | Arora et al. |
| 2014/0149549 A1 | 5/2014 | Fu |
| 2014/0181248 A1 | 6/2014 | Deutsch et al. |
| 2014/0226456 A1 | 8/2014 | Khan et al. |
| 2014/0229945 A1 | 8/2014 | Barkai et al. |
| 2014/0269712 A1 | 9/2014 | Kidambi |
| 2014/0269728 A1 | 9/2014 | Jalan et al. |
| 2014/0304728 A1 | 10/2014 | Wendling |
| 2014/0324931 A1 | 10/2014 | Grube et al. |
| 2014/0362712 A1 | 12/2014 | Agarwal et al. |
| 2014/0369230 A1* | 12/2014 | Nallur .................. H04L 49/70 370/254 |
| 2015/0056960 A1 | 2/2015 | Egner et al. |
| 2015/0063117 A1 | 3/2015 | DiBurro et al. |
| 2015/0063360 A1 | 3/2015 | Thakkar et al. |
| 2015/0086018 A1 | 3/2015 | Harjula et al. |
| 2015/0128246 A1* | 5/2015 | Feghali ............... H04L 63/0209 726/13 |
| 2015/0271104 A1 | 9/2015 | Chikkamath et al. |
| 2015/0334041 A1* | 11/2015 | Hedbor ................. H04L 47/83 709/203 |
| 2015/0341223 A1 | 11/2015 | Shen et al. |
| 2016/0006695 A1 | 1/2016 | Prodoehl et al. |
| 2016/0028586 A1 | 1/2016 | Blair |
| 2016/0134528 A1 | 5/2016 | Lin et al. |
| 2016/0226755 A1* | 8/2016 | Hammam ........... H04L 12/4633 |
| 2016/0285977 A1* | 9/2016 | Ng ..................... H04L 12/4633 |
| 2016/0308762 A1* | 10/2016 | Teng .................. H04L 12/4633 |
| 2016/0337223 A1 | 11/2016 | Mackay |
| 2016/0337484 A1 | 11/2016 | Tola |
| 2016/0352628 A1 | 12/2016 | Reddy et al. |
| 2017/0078922 A1 | 3/2017 | Raleigh et al. |
| 2017/0105142 A1* | 4/2017 | Hecht ..................... H04L 69/18 |
| 2017/0230821 A1* | 8/2017 | Chong .................. H04N 7/181 |
| 2018/0091417 A1* | 3/2018 | Oré ...................... G06F 21/575 |
| 2020/0382341 A1* | 12/2020 | Oré ....................... G06F 9/4416 |
| 2021/0342725 A1* | 11/2021 | Marsden ............... G06F 18/217 |
| 2021/0345188 A1* | 11/2021 | Shaheen ............. H04W 88/085 |
| 2024/0129162 A1* | 4/2024 | Rubenstein ............. H04L 45/28 |

FOREIGN PATENT DOCUMENTS

| | | |
|---|---|---|
| CN | 1754161 A | 3/2006 |
| CN | 101969414 A | 2/2011 |
| CN | 104320472 A | 1/2015 |
| WO | 2003090018 A2 | 10/2003 |
| WO | 2008058088 A1 | 5/2008 |
| WO | 2013120069 A1 | 8/2013 |
| WO | 2013135753 A1 | 9/2013 |
| WO | 2015021343 A1 | 2/2015 |
| WO | 2017015667 A1 | 1/2017 |

OTHER PUBLICATIONS

Figueiredo, R. J., et al., "Social VPNs: Integrating Overlay and Social Networks for Seamless P2P Networking," 2008 IEEE 17th Workshop on Enabling Technologies: Infrastructure for Collaborative Enterprises, Rome, Italy, 2008, pp. 93-98, doi: 10.1109/WETICE.2008.43, 2008 (6 paqes).

Awduche, D., et al., "Requirements for Traffic Engineering Over MPLS", Network Working Group RFC 2702, Sep. 1999, 29 pages.

Awduche, D., et al., "RSVP-TE: Extensions to RSVP for LSP Tunnels", Network Working Group RFC 3209, Dec. 2001, 61 pages.

Katz, D., et al., "Traffic Engineering Extensions (TE) Extensions to OSPF Version 2", Network Working Group RFC 3630, Sep. 2003, 14 pages.

Ishiguro, K., et al., "Traffic Engineering Extensions to OSPF Version 3", Network Working Group RFC 5329, Sep. 2008, 12 pages.

Giacalone, S., et al., "OSPF Traffic Engineering (TE) Metric Extensions", Network Working Group RFC 7471, Mar. 2015, 19 pages.

* cited by examiner

26/67

```
List of tunnel build stages:  26-610
PREP   = Prepare tunnel
HAND   = Handshake(s)
EXCH   = Exchange info
BLD    = Build tunnel
TRAF   = Push traffic
ROUTE  = Add routes to TUN
OnUp   = Run on TUN up
```

```
List of VIF build stages:   26-620
PRV    = Prepare VIF
CRV    = Create VIF
RTVIF  = Add routes to VIF
TNVIF  = Build tunnels on VIF
DTVIF  = Add VIF into traffic flow
VIFUp  = Run on VIF up scripts List of VIF operations:   26-630
SWT    = Switch traffic to other TUN
DPT    = Deprecate tunnel
CRT    = Create new tunnel
```

| TUN0 26-100 | PREP 26-102 | HAND 26-104 | EXCH 26-106 | BLD 26-108 | TRAF 26-110 | ROUTE 26-120 | OnUp 26-150 |

Total Time: Regular Tunnel – to be built or rebuilt
26-180

| VIF0 26-200 | PRV 26-202 | CRV 26-204 | RTVIF 26-206 | TNVIF 26-208 | DTVIF 26-210 | VIFUp 26-250 |

Total Time: VIF to be built or rebuilt and at least one TUN to be added
26-280

| TUN2 26-300 | PREP 26-302 | HAND 26-304 | EXCH 26-306 | BLD 26-308 TRAF 26-310 ROUTE 26-320 | OnUp 26-350 |

Total Time: Tunnel on VIF – to be built or rebuilt
26-380

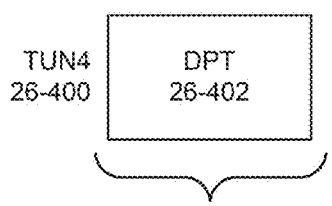

Total Time: Tunnel on VIF –
to be destroyed
26-380

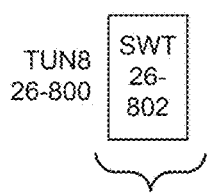

Total Time: Tunnel on VIF –
switch traffic to it
26-880

FIG. 26

SYSTEM AND METHOD FOR VIRTUAL INTERFACES AND ADVANCED SMART ROUTING IN A GLOBAL VIRTUAL NETWORK

CROSS-REFERENCE TO RELATED APPLICATION

This application is a continuation of U.S. patent application Ser. No. 18/486,942, filed Oct. 13, 2023, now U.S. Pat. No. 12,341,706, which is a continuation of U.S. patent application Ser. No. 16/872,148, filed May 11, 2020, now U.S. Pat. No. 11,799,687, which is a continuation of U.S. patent application Ser. No. 15/563,246, filed Sep. 29, 2017, now U.S. Pat. No. 10,659,256, which is a U.S. National Stage application under 35 U.S.C. § 371 of International Patent Application No. PCT/IB2016/000531, filed Apr. 7, 2016, which claims priority to U.S. Provisional Application No. 62/144,293 filed on Apr. 7, 2015, and U.S. Provisional Application No. 62/151,174 filed on Apr. 22, 2015. The entire content of each application above is incorporated herein by reference in its entirety.

FIELD OF THE DISCLOSURE

The present disclosure relates generally to networks, and more particularly, to the automated construction of virtual interfaces (VIFs) and structures of VIFs acting as hook points for multiple network tunnels. VIFs allow for the shifting of time and resource intensive operations such as routing upstream to the VIF which were typically applied to tunnels.

BACKGROUND OF THE DISCLOSURE

Human beings are able to perceive delays of 200 ms or more as this is typically the average human reaction time to an event. If latency is too high, online systems such as thin-clients to cloud-based servers, customer relationship management (CRM), enterprise resource planning (ERP) and other systems will perform poorly and may even cease functioning due to timeouts. High latency combined with high packet loss can make a connection unusable. Even if data gets through, at a certain point too much slowness results in a poor user experience (UX) and in those instances the result can be refusal by users to accept those conditions in effect rendering poorly delivered services as useless.

To address some of these issues, various technologies have been developed. One such technology is WAN optimization, typically involving a hardware (HW) device at the edge of a local area network (LAN) which builds a tunnel to another WAN optimization HW device at the edge of another LAN, forming a wide area network (WAN) between them. This technology assumes a stable connection through which the two devices connect to each other. A WAN optimizer strives to compress and secure the data flow often resulting in a speed gain. The commercial driver for the adoption of WAN optimization is to save on the volume of data sent in an effort to reduce the cost of data transmission. Disadvantages of this are that it is often point-to-point and can struggle when the connection between the two devices is not good as there is little to no control over the path of the flow of traffic through the Internet between them. To address this, users of WAN optimizers often opt to run their WAN over an MPLS or DDN line or other dedicated circuit resulting in an added expense and again usually entailing a rigid, fixed point-to-point connection.

Direct links such as MPLS, DDN, Dedicated Circuits or other types of fixed point-to-point connection offer quality of connection and Quality of Service (QOS) guarantees. They are expensive and often take a significantly long time to install due to the need to physically draw lines from a POP at each side of the connection. The point-to-point topology works well when connecting from within one LAN to the resources of another LAN via this directly connected WAN. However, when the gateway (GW) to the general Internet is located at the LAN of one end, say at the corporate headquarters, then traffic from the remote LAN of a subsidiary country may be routed to the Internet through the GW. A slowdown occurs as traffic flows through the internet back to servers in the same country as the subsidiary. Traffic must then go from the LAN through the WAN to the LAN where the GW is located and then through the Internet back to a server in the origin country, then back through the internet to the GW, and then back down the dedicated line to the client device within the LAN. In essence doubling or tripling (or worse) the global transit time of what should take a small fraction of global latency to access this nearby site. To overcome this, alternative connectivity of another internet line with appropriate configuration changes and added devices can offer local traffic to the internet, at each end of such a system.

Another option for creating WAN links from one LAN to another LAN involve the building of tunnels such as IPSec or other protocol tunnels between two routers, firewalls, or equivalent edge devices. These are usually encrypted and can offer compression and other logic to try to improve connectivity. There is little to no control over the routes between the two points as they rely on the policy of various middle players on the internet who carry their traffic over their network(s) and peer to other carriers and/or network operators. Firewalls and routers, switches and other devices from a number of equipment vendors usually have tunneling options built into their firmware.

While last mile connectivity has vastly improved in recent years there are still problems with long distance connectivity and throughput due to issues related to distance, protocol limitations, peering, interference, and other problems and threats. As such, there exists a need for secure network optimization services running over the top of standard internet connections.

SUMMARY OF THE DISCLOSURE

Systems and methods for connecting devices via a virtual global network are disclosed. In one embodiment the network system may comprise an endpoint device including a tunnel manager and a first virtual interface, an access point server including at least one tunnel listener and a second virtual interface. One or more communication paths or tunnels are formed connecting the tunnel managers and tunnel listeners. The virtual interfaces provide a logical point of access to the one or more tunnels.

In one embodiment the communication paths include at least one tunnel in the active state and one tunnel in the being built, standby, or deprecated state.

In other embodiments tunnels in the standby state are periodically tested to assess their viability and operational capability. Tunnels in the standby state may be kept alive with at least one of pings or keep alive traffic. In other embodiments tunnels in the active state are periodically tested to assess their viability and operational capability.

In some embodiments tunnels in the active state are transitioned to the deprecated state and tunnels in the standby state are transitioned to the active state. This transition may be based on periodic testing and determining that the quality of service (QOS) indicates that the tunnel in the standby state is the optimal tunnel and should be transitioned to be the active tunnel.

In other embodiments multiple tunnels are in the active state. During periods of low packet loss the active tunnels concurrently send unique streams of data between the endpoint device and the access point server. During periods of high packet loss the active tunnels concurrently send duplicate streams of data between the endpoint device and the access point server during periods of high packet loss.

BRIEF DESCRIPTION OF THE DRAWINGS

In order to facilitate a fuller understanding of the present disclosure, reference is now made to the accompanying drawings, in which like elements are referenced with like numerals or references. These drawings should not be construed as limiting the present disclosure, but are intended to be illustrative only.

FIG. 26 illustrates timelines for various tunnel (TUN) and virtual interface (VIF) related operations.

DETAILED DESCRIPTION

Figure 1:
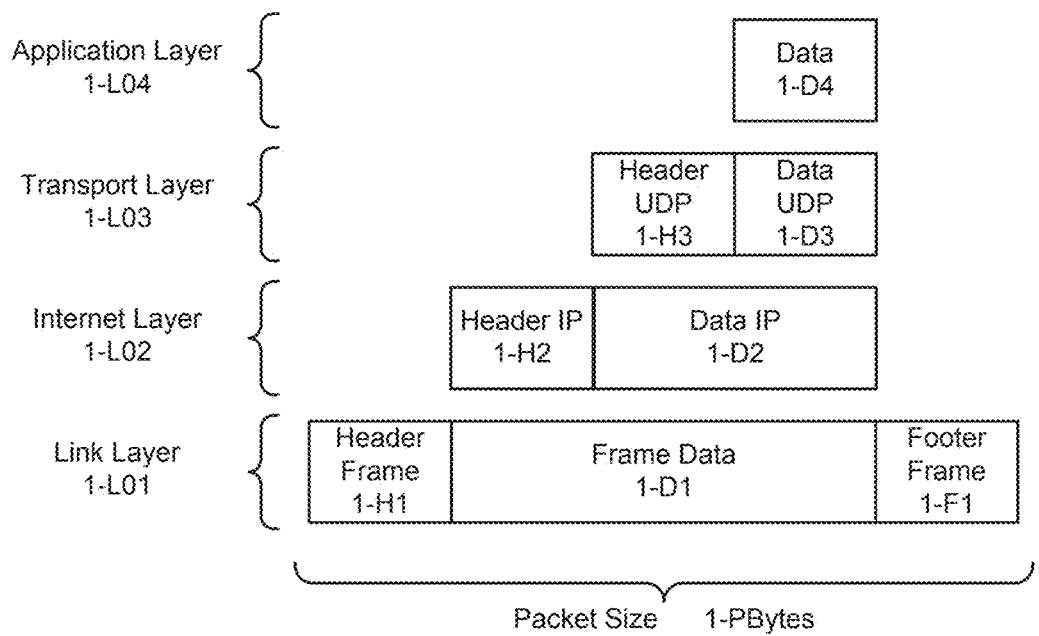
FIG. 1 illustrates the packet bloat for IP transport packets when headers are added to the data at various layers.

A GVN offers secure network optimization services to clients over the top of their standard internet connection. This is an overview of the constituent parts of a GVN as well as a description of related technologies which can serve as GVN elements. GVN elements may operate independently or within the ecosystem of a GVN such as utilizing the GVN framework for their own purposes, or can be deployed to enhance the performance and efficiency of a GVN. This overview also describes how other technologies can benefit from a GVN either as a stand-alone deployment using some or all components of a GVN, or which could be rapidly deployed as an independent mechanism on top of an existing GVN, utilizing its benefits.

A software (SW) based virtual private network (VPN) offers privacy via a tunnel between a client device and a VPN server. These have an advantage of encryption and in some cases also compression. But here again there is little to no control over how traffic flows between VPN client and VPN server as well as between the VPN server and host server, host client or other devices at destination. These are often point-to-point connections that require client software to be installed per device using the VPN and some technical proficiency to maintain the connection for each device. If a VPN server egress point is in close proximity via quality communication path to destination host server or host client then performance will be good. If not, then there will be noticeable drags on performance and dissatisfaction from a usability perspective. It is often a requirement for a VPN user to have to disconnect from one VPN server and reconnect to another VPN server to have quality or local access to content from one region versus the content from another region.

A Global Virtual Network (GVN) is a type of computer network over the top (OTT) of the internet providing global secure network optimization services utilizing a mesh of devices distributed around the world securely linked to each other by advanced tunnels, collaborating and communicating via Application Program Interface (API), Database (DB) replication, and other methods. Traffic routing in the GVN is always via best communication path governed by Advanced Smart Routing (ASR) powered by automated systems which combine builders, managers, testers, algorithmic analysis and other methodologies to adapt to changing conditions and learning over time to configure and reconfigure the system.

The GVN offers a service to provide secure, reliable, fast, stable, precise and focused concurrent connectivity over the top (OTT) of one or more regular Internet connections. These benefits are achieved through compression of data flow transiting multiple connections of wrapped, disguised, and encrypted tunnels between the EPD and access point servers (SRV_AP) in close proximity to the EPD. The quality of connection between EPD and SRV_AP's is constantly being monitored.

A GVN is a combination of a hardware (HW) End Point Device (EPD) with installed software (SW), databases (DB) and other automated modules of the GVN system such as Neutral Application Programming Interface Mechanism (NAPIM), back channel manager, tunnel manager, and more features which connect the EPD to distributed infrastructure devices such as access point server (SRV_AP) and central server (SRV_CNTRL) within the GVN.

Algorithms continually analyze current network state while taking into account trailing trends plus long-term historical performance to determine best route for traffic to take and which is the best SRV_AP or series of SRV_AP servers to push traffic through. Configuration, communication path and other changes are made automatically and on the fly with minimal or no user interaction or intervention required.

Advanced Smart Routing in an EPD and in an SRV_AP ensure that traffic flows via the most ideal path from origin to destination through an as simple as possible "Third Layer" of the GVN. This third layer is seen by client devices connected to the GVN as a normal internet path but with a lower number of hops, better security and in most cases lower latency than traffic flowing through the regular internet to the same destination. Logic and automation operate at the "second layer" of the GVN where the software of the GVN automatically monitors and controls the underlying routing and construct of virtual interfaces (VIF), multiple tunnels and binding of communication paths. The third and second layers of the GVN exist on top of the operational "first layer" of the GVN which interacts with the devices of the underlying Internet network.

The cloud from a technical and networking perspective refers to devices or groups or arrays or clusters of devices which are connected and are available to other devices through the open internet. The physical location of these devices is not of significant importance as they often have their data replicated across multiple locations with delivery to/from closest server to/from requesting client utilizing content delivery network (CDN) or other such technology to speed connectivity which enhances user experience (UX).

In addition to the broader theme of addressing quality of service (QOS) issues related to the network connectivity which improve general performance and enhance user experience, two other main features are that a GVN allows for the extension of a network edge into the cloud. Additionally, the EPD acts as a bridge between the broader network and a local area network (LAN) bringing elements of the cloud as a local node extension into the edge of the LAN. The GVN also allows for the automated construction of virtual interfaces (VIFs) and structures of VIFs acting as hook points for multiple tunnels. These VIFs allow for the shifting of time- and resource-intensive operations such as routing upstream to the VIF which were typically applied to tunnels.

FIG. 1 illustrates the packet bloat for IP transport packets when headers are added to the data at various layers. At the Application Layer 1-L04, the data payload has an initial size as indicated by Data 1-D4. The size of the packet is indicated by Packet Size 1-PBytes. At the next layer, Transport Layer 1-L03, the Packet Size 1-PBytes has the original size of the data 1-D4 which is equal to Data UDP 1-D3. It further includes bloat of Header UDP 1-H3. At the next layer, Internet Layer 1-L02 the body payload Data IP 1-D2 is a combination of 1-D3 and 1-H3. It increases 1-PBytes by Header IP 1-H2. At the Link Layer 1-L01, Frame Data 1-D1 is a combination of 1-H2 and 1-D2. It further increases 1-PBytes by Header Frame 1-H1 and Footer Frame 1-F1.

Figure 2:
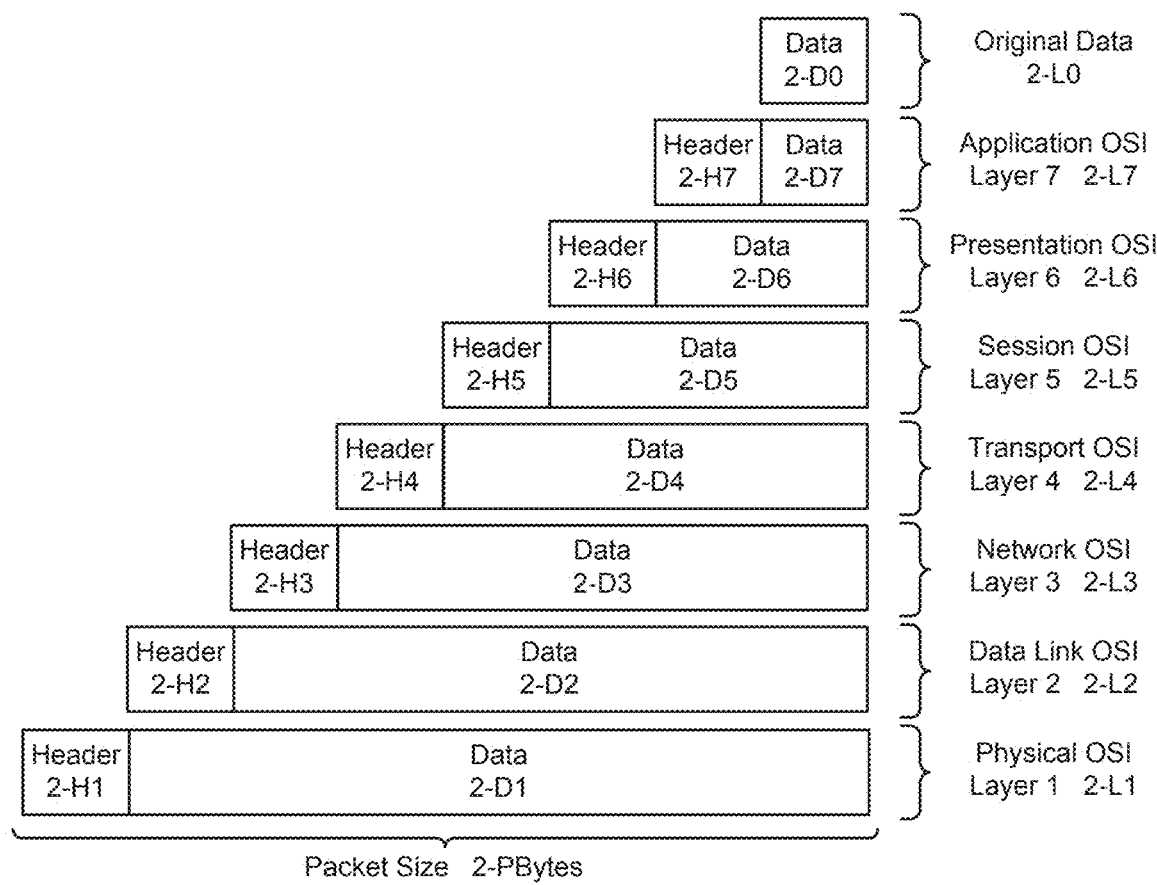
FIG. 2 illustrates the packet bloat of data and headers at each of the seven layers of the OSI model.

FIG. 2 illustrates the packet bloat of data and headers at each of the seven layers of the OSI model. The original data 2-DO grows at each level Application OSI Layer 7 2-L7 with the addition of headers such as Header 2-H7. At each subsequent layer down from layer 7 to layer 1, the data layer is a combination of the previous upper level's layer of Data and Header combined. The total packet bloat in an OSI model at the Physical OSI Layer 2-L1 is denoted by Packet Size 2-PBytes.

Figure 3:
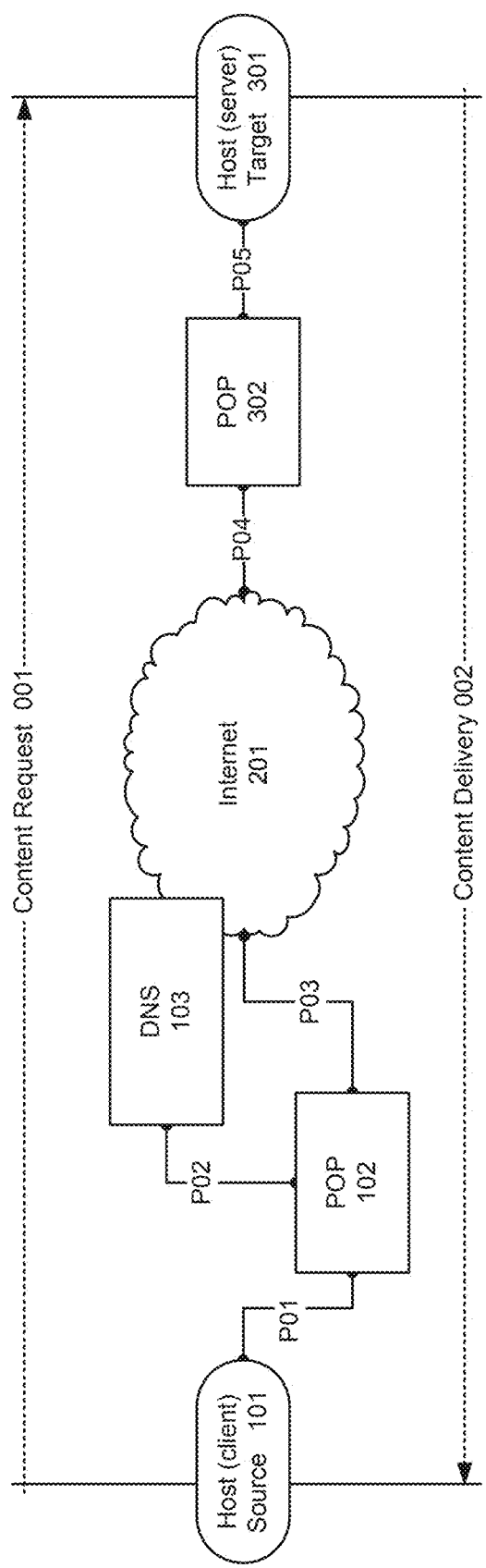
FIG. 3 shows a block diagram depicting resolution of universal resource locator (URL) via lookup through internet domain name system (DNS) for routing from Host (client) to the numeric IP address of the Host (server)

FIG. 3 shows a block diagram depicting resolution of universal resource locator (URL) via lookup through internet domain name system (DNS) for routing from Host (client) to the numeric IP address of the Host (server). A content request or push from host client (C) 101 to host server(S) 301 as files or streams or blocks of data flows in the direction of arrow 001. The response 002 of content delivery from host S to host C as files or streams or blocks of data. The host client device 101 in Client-Server (C-S) relationship makes a request to access content from a remote host S or sends data to remote host S via a universal resource locator (URL) or other network reachable address.

The connection from the host client to the internet is marked as P01-connection from client 101 to POP 102 directly facing or can be located in a local area network (LAN) which then connects to the internet via a point of presence (POP) can be referred to as the last mile connection.

The point of presence (POP) 102 which represents connection provided from an end point by an internet service provider (ISP) to the internet via their network and its interconnects. If the URL is a domain name rather than a numeric address, then this URL is sent to domain name system (DNS) server 103 where the domain name is translated to an IPV4 or IPv6 or other address for routing purposes.

Traffic from client 101 to server 301 is routed through the Internet 120 representing transit between POPs (102 and 302) including peering, backhaul, or other transit of network boundaries.

The connection P02 from POP 102 to DNS 103 to look up a number address from a universal resource locator (URL) to get the IPv4 address or other numeric address of target server can be directly accessed from the POP 102, or via the Internet 120. The connection P03 from POP 102 of an ISP to the Internet 120 can be single-honed or multi-honed. There is a connection P04 from the Internet 120 to the ISP's or internet data center's (IDC) internet-facing POP 302. The connection P05 from the POP 302 of the server to the host 301 can be direct or via multiple hops.

The lookups from name to numeric address via domain name systems is a standard on the Internet today and assumes that the DNS server is integral and that its results are current and can be trusted.

Figure 4:
FIG. 4 illustrates an equation to calculate bandwidth delay product (BDP) for a connection segment or path taking into account various connectivity attributes.

FIG. 4 illustrates an equation to calculate bandwidth delay product (BDP) for a connection segment or path taking into account various connectivity attributes. The further the distance between the two points and/or other factors which increase latency impact the amount of data that the line can blindly absorb before the sending device receives a message back from the recipient device about whether or not they were able to accept the volume of data.

In short, the BDP calculation can represent a measure of how much data can fill a pipe before the server knows it is sending too much at too fast a rate.

The Bandwidth 4-000 can be measured in megabits per second (Mbps) and Granularity 4-002 can be unit of time relative to one second. To accurately reflect BDP, the Bytes 4-020 are divided by the number of Bits 4-022 of a system. Latency 4-050 is a measurement of round-trip time (RTT) in milliseconds (ms) between the two points.

So, for example, BDP of the following network path with these attributes-Bandwidth 4-000 of 10 GigE using Granularity 4-022 of one second, on an eight bit system over a path with Latency 4-050 of 220 ms—can be calculated as follows:

$$\frac{10,000,000,000}{1} * \frac{1}{8} * 0.220 = 275,000,000 \text{ bits OR } 33,569.3 \text{ MB}$$

Therefore, on a 10 GigE line, the sending device could theoretically send 33,569.3 megabytes of information (MB) in the 220 ms before a message can be received back from the recipient client device.

This calculation can also be the basis of other algorithms such as one to govern the size of a RAM buffer, or one to govern the time and amount of data that is buffered before there is a realization of a problem such as an attack vector. The throttling down by host server could lead to underutilized pipes but the accepting of too much data can also lead to other issues. The calculation of BDP and proactive management approach to issues leads to efficient utilization of hardware and network resources.

Figure 5:
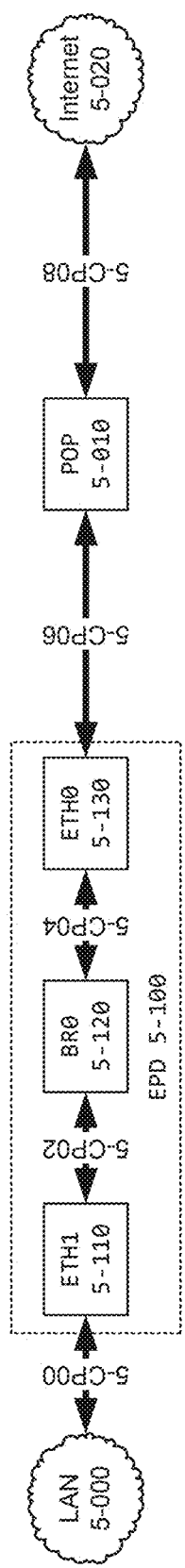
FIG. 5 illustrates the traffic flow path within an end point device (EPD).

FIG. 5 illustrates the traffic flow path within an end point device (EPD). The traffic flows between the LAN 5-000 and the end point device (EPD) 5-100 over connection 5-CP00. End point device (EPD) 5-100 flows to the point of presence (POP) 5-010 over connection 5-CP06. The point of presence (POP) 5-010 is connected to the Internet 5-020 via connection 5-CP08.

Figure 6:
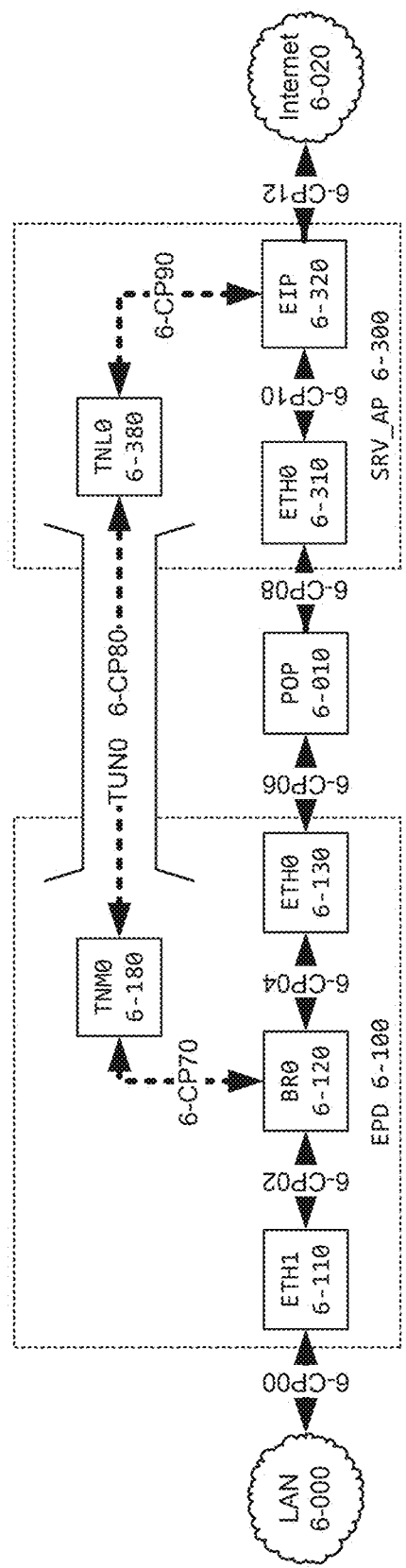
FIG. 6 illustrates an over the top (OTT) tunnel created on top of a regular internet connection.

FIG. 6 illustrates an over the top (OTT) tunnel created on top of a regular internet connection. FIG. 6 is similar to FIG. 5 and additionally shows an access point server (SRV_AP) 6-300. The access point server (SRV_AP) 6-300 includes a tunnel listener TNL0 6-380. The end point device (EPD)

5-100 includes a tunnel manager TMN0 6-180. A tunnel TUN0 6-CP80 is constructed that connects the tunnel manager TMN0 6-180 and the tunnel listener TNL0 6-380. The tunnel is constructed over-the-top (OTT) of the regular internet connection 6-CP06 and 6-CP08.

Figure 7:
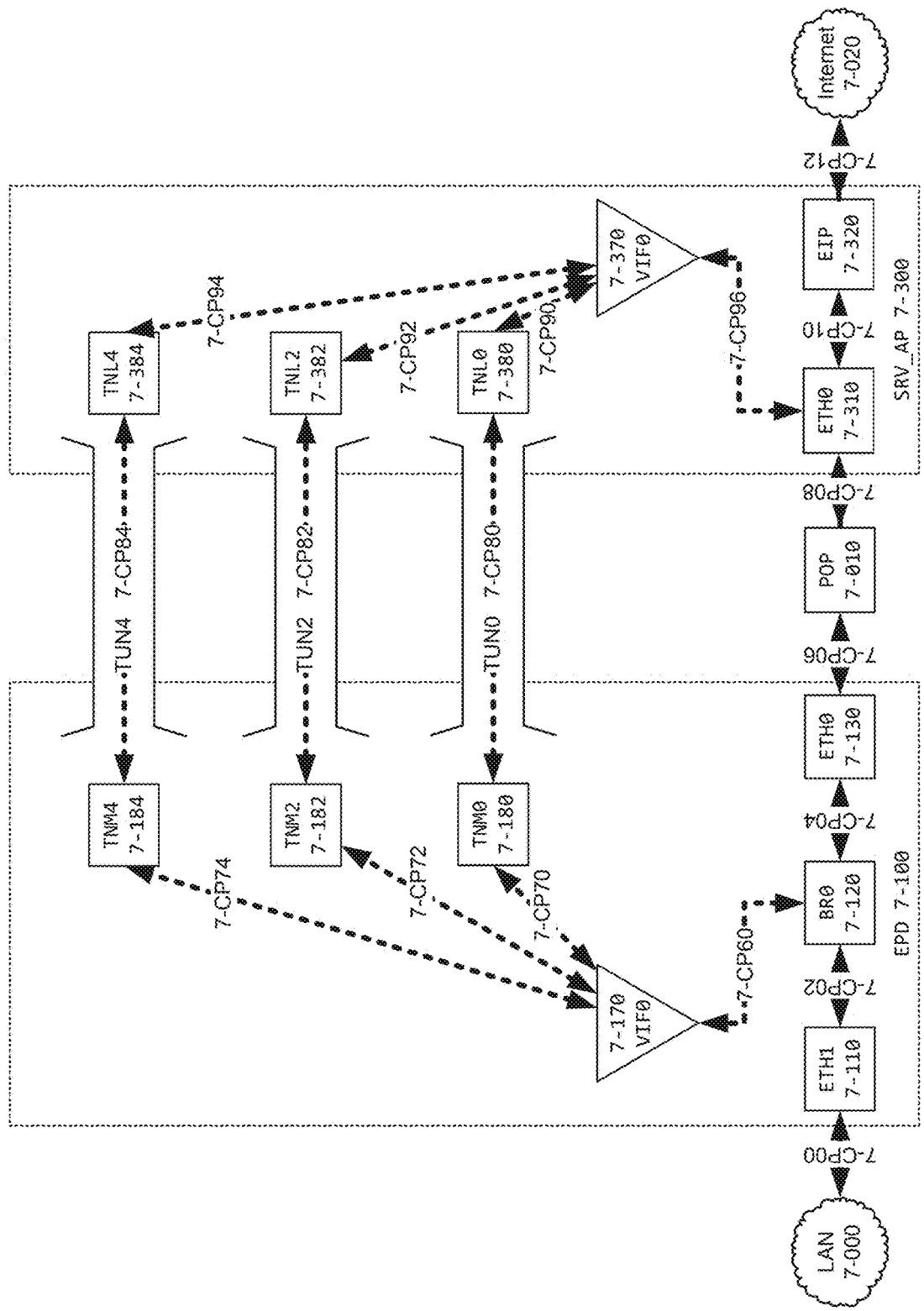
FIG. 7 illustrates a virtual interface for over the top (OTT) tunnels created on top of a regular internet connection.

FIG. 7 illustrates a virtual interface for over the top (OTT) tunnels created on top of a regular internet connection. FIG. 7 is similar to FIG. 6 and additionally includes a virtual interface (VIF) as a hook point on each device EPD 7-100 and SRV_AP 7-300 for multiple tunnels to be built between two. This figure also shows multiple tunnels 7-CP80, 7-CP82, and 7-CP84 between EPD 7-100 and SRV_AP 7-300. A main advantage of the virtual interface VIF0 7-170 and VIF0 7-370 on each device respectively is that this approach enables clean structural attributes and a logical pathway for more complex constructs of tunnels and subsequent routing complexity.

Certain other advantages with regards to timing and flow control will be described in subsequent figures below.

Figure 8:
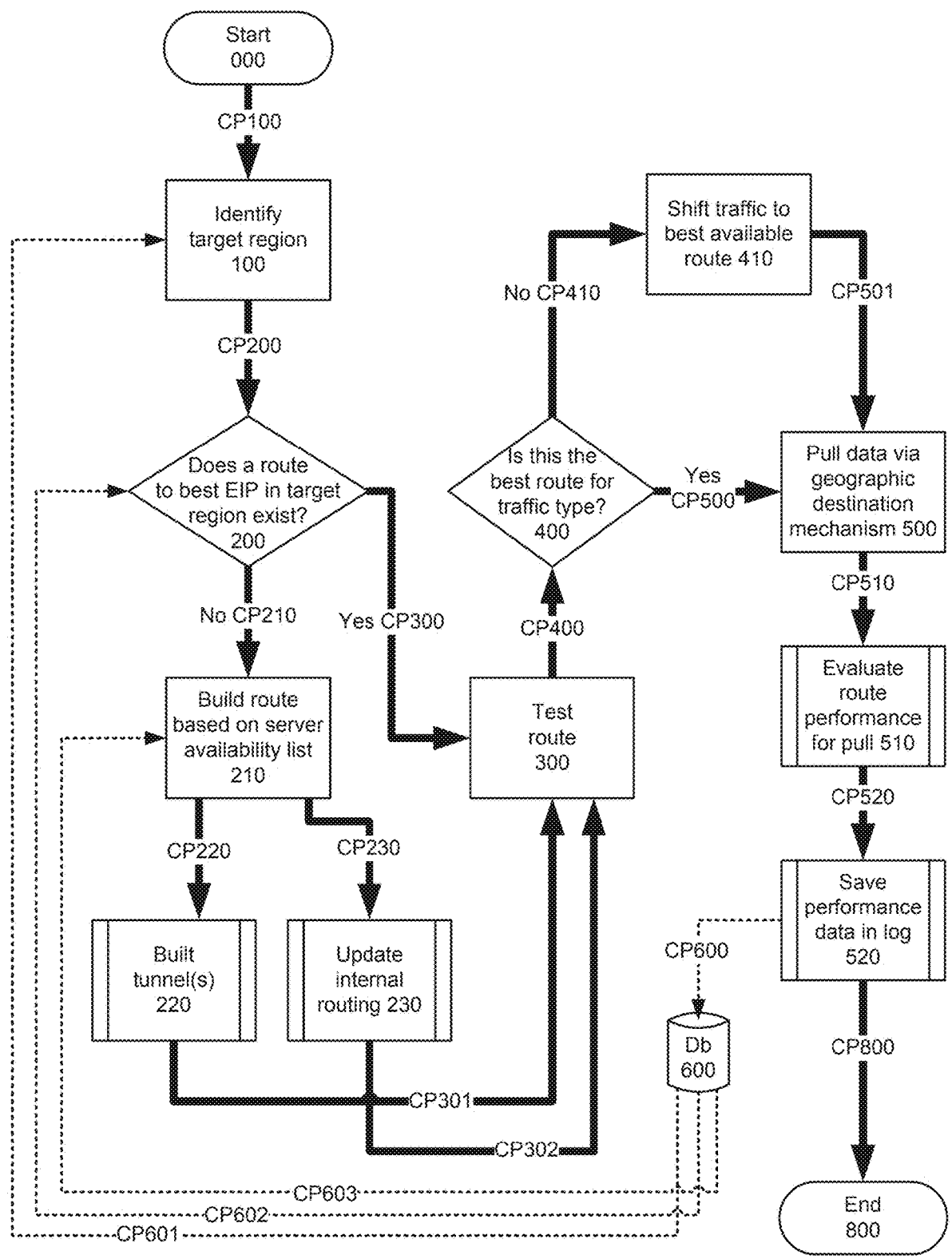
FIG. 8 is a flowchart describing how to determine the best egress ingress point (EIP) for traffic to flow through a global virtual network (GVN) to the internet.

FIG. 8 is a flowchart describing how to determine the best egress ingress point (EIP) for traffic to flow through a global virtual network (GVN) to the internet. Some example routes from a source (SRC) to a destination (DST) through the GVN are shown in Table 1.

While evaluating total path, priority weighting in favor of the GVN over the open internet takes into account the security and optimization of the GVN to supersede certain measures.

Figure 9:
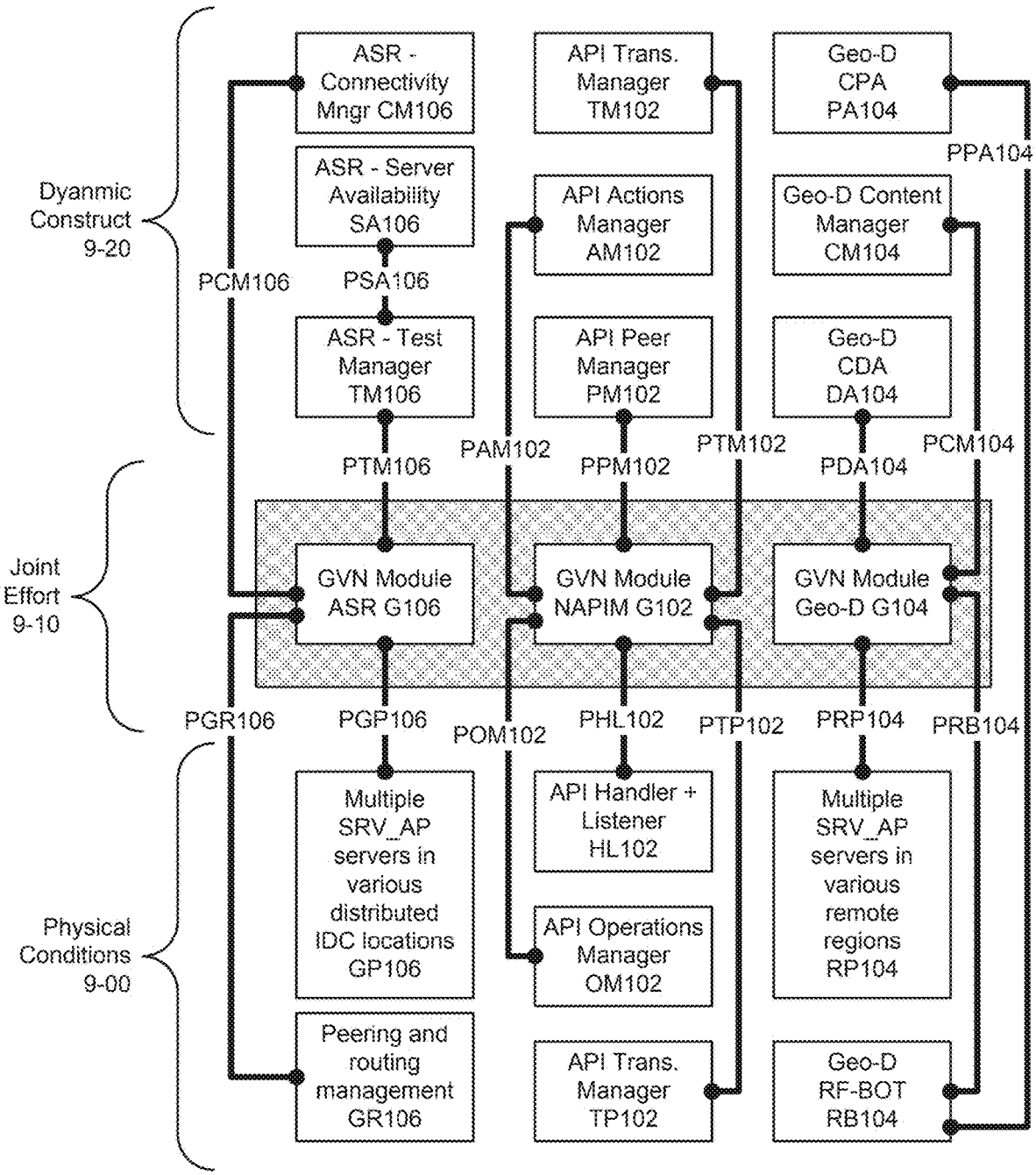
FIG. 9 illustrates the collaborative effort between various modules, mechanisms, technologies and other components of the GVN.

FIG. 9 illustrates the collaborative effort between various modules, mechanisms, technologies and other components of the GVN.

There are three layers of the GVN-layer one is the physical network layer such as the internet on which the GVN is built over the top (OTT) of. Layer three is the GVN network layer that client devices see as a partial or complete path to destination. Layer two is the logic layer between the two.

There are components which interact with the physical conditions 9-00. Dynamic construct modules at 9-20 strive to maintain connectivity of the GVN. The joint effort section described herein links the relevant modules of the GVN to physical 9-00 and dynamic 9-20 elements. For example, in order for the advanced smart routing (ASR) module G106 to properly function, there must be multiple access point servers (SRV_AP) GP106 placed at various locations, with adequate routing and peering GR106. In order for an EPD to be able to select the most appropriate SRV_AP to establish a connection with, it needs information about which

TABLE #1

Example routes through a GVN

| RT_ID | Path from Origin to Destination | Rating |
|---|---|---|
| 1 | Source↔EPD EIP ↔POP↔Internet↔Destination | 0.15 |
| 2 | Source↔EPD↔TUN1↔SRV_AP1 EIP ↔POP↔Internet↔Destination | 0.36 |
| 3 | Source↔EPD↔TUN2↔SRV_AP2 EIP ↔POP↔Internet↔Destination | 0.58 |
| 4 | Source↔EPD↔TUN2↔SRV_AP2↔SRV_AP3 EIP ↔POP↔Internet↔Destination | 0.96 |
| 5 | Source↔EPD↔TUN3↔SRV_AP2↔WAN↔SRV_AP4 EIP ↔POP↔Internet↔Destination | 0.85 |

EPD EIP and SRV_AP2 EIP denote Egress/Ingress Points (EIP) from a device to/from the internet. The two-sided arrow ↔ symbol indicates the routed path between two devices. This can either be directly through the internet, as a network segment OTT the internet as a tunnel or other mechanism (possibly as part of a GVN) or via other network path between devices. The point of origin is on the left and the destination implies the final location where the traffic is to be routed to/from. Paths through the GVN could be structured as a multi-dimensional array or other data pattern to denote the end-to-end path for traffic to take within the GVN.

The rating is a calculated value for a route based on a number of factors. A rating of 0.00 implies an impossible route. A rate of 1.00 implies the most perfect route with highest bandwidth at wire-line speed latency. RT_ID is the route ID number to differential one route from another both for utility, testing and logging purposes. This is utilized to determine the quality of various routes through the GVN. RT_ID is an identification for a specific route from a list of routes. The quality of service (QOS) for each route can include evaluating security, latency, packet loss, jitter, bandwidth, and other factors.

The evaluation of various measures should take into account the total path:

Total Path=GVN to Egress+Egress to destination

SRV_AP's are best. The ASR server availability module SA106 ranks servers for that specific EPD based on information provided by ASR test manager TM106 and when an EPD requires a new tunnel to be established, it utilizes the server availability list SA106 in order to build a new tunnel. Tests are then run on that tunnel via TM106.

As another example, for NAPIM G102 to operate it needs API listeners and handlers HL102 on a host server. On both host client and host server in the NAPIM, an operations manager OM102 is running to handle the preparation, then sending, handling, processing of API requests and responses. The dynamic construct of the NAPIM entails peer management PM102, management of related NAPIM actions AM102, and the transactions at physical TP102 and dynamic TM102.

Figure 10:
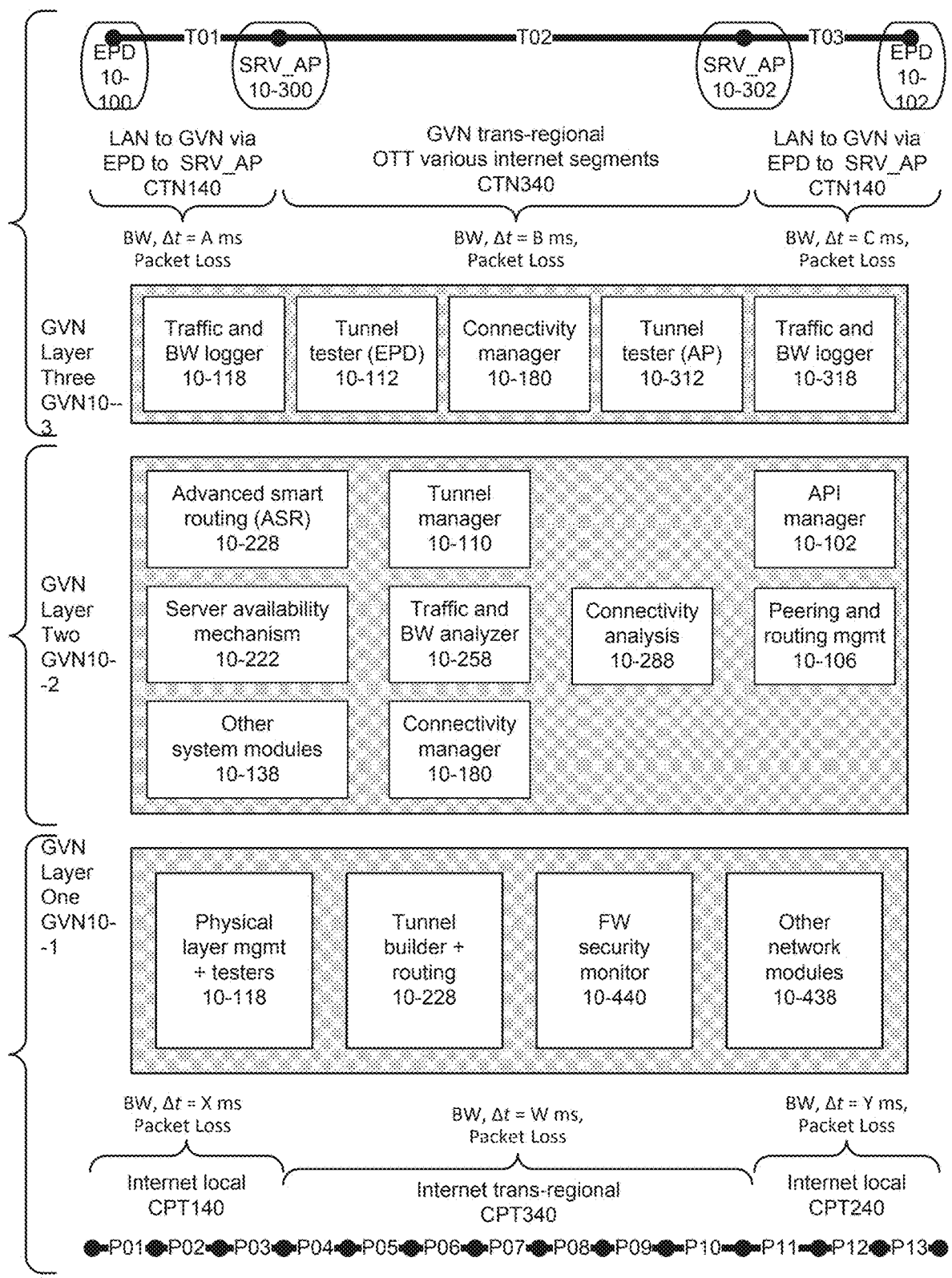
FIG. 10 illustrates layer one, layer 2, and layer 3 operations of a global virtual network (GVN).

FIG. 10 illustrates layer 1, layer 2, and layer 3 operations of a global virtual network (GVN) and compares the network at the base level via paths P01 through P13 to the network through the GVN T01 through T03.

Significant measurements at the base internet level CTN140 are LAN to GVN via EPD 10-100 to SRV_AP 10-300 for which connectivity metrics for bandwidth BW, latency $\Delta t=A$ ms, Packet Loss, and other factors are evaluated. At the other end of the connection, similar measurements BW, $\Delta t=C$ ms, Packet Loss and other factors at CTN142 measure the on-ramping of traffic into the GVN from EPD 10-102. Through the GVN between SRV_AP 10-300 and SRV_AP 10-302 for the GVN trans-regional OTT various internet segments CTN340 measure BW, Δt=B ms, Packet Loss, and other factors are evaluated. Overall path latency through the GVN Layer Three GVN10-3 can be calculated as the sum of the latencies of A+B+C for total in milliseconds.

At GVN Layer Three GVN10-3, ASR and other features govern how and where traffic flows through the GVN. This entails determining the best tunnel to send traffic through based on target region and traffic type, QoS of the segments through the GVN and other factors.

At GVN Layer One GVN10-1, the physical conditions of the base network connectivity are monitored and tested to determine best route options on top of which to build GVN tunnels and pathways through them. GVN pathways can transit through joined tunnels passing through SRV_AP, SRV_BBX and other GVN hardware devices. This can also determine which tunnels to make, to continue using and which to deprecate.

Mechanisms, modules and component parts at GVN Layer Two GVN10-2 help to set up, test, manage and otherwise operate the plumbing between Layer Three GVN10-3 and GVN Layer One GVN10-1. Tunnel testing can be done in Layer Three at the EPD 10-100 and at the SRV_AP 10-300 via its tunnel tester 10-312.

Figure 11:
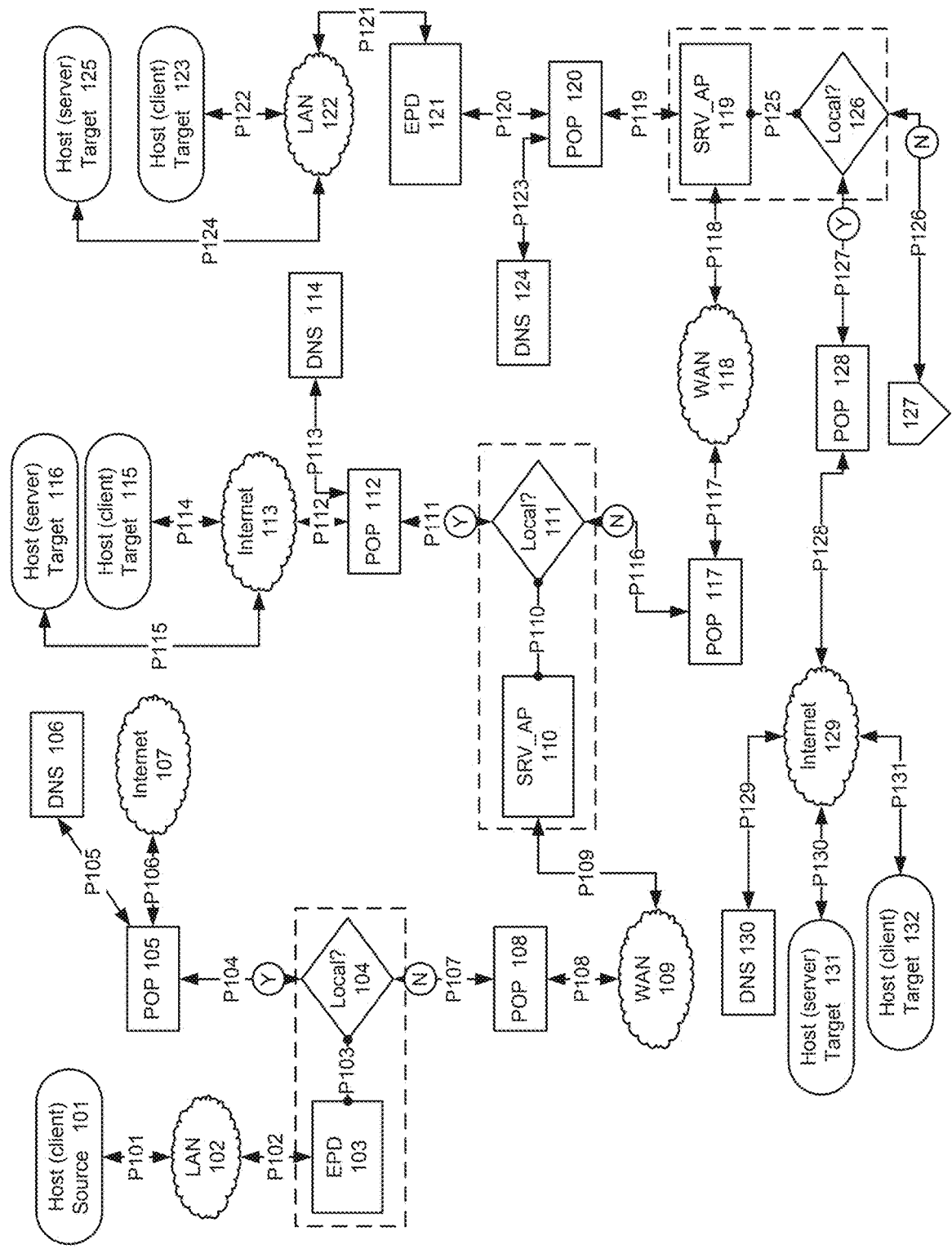
FIG. 11 is a flowchart of Advanced Smart Routing (ASR) within a global virtual network (GVN).

FIG. 11 is a flowchart of Advanced Smart Routing (ASR) within a Global Virtual Network (GVN). From the starting point of a host client 101 device in a local area network (LAN) 102 connected to an end point device (EPD) 103, the GVN offers the EPD a multitude of connection paths to multiple potential termination points. This flowchart is a high level view of the routing logic a packet could take as it transits a GVN utilizing ASR for optimal performance. From the perspective of the host client 101, their traffic will flow through an internet protocol (IP) network with as few number of hops and best possible latency at the third layer of the GVN. The first layer of the GVN is the base internet with automatic configuration of a construct of virtual interfaces, tunnels, routing and other networking policies. The second layer of the GVN is where the algorithms, software and logic to govern operation between layer three and layer one.

The first main routing decision is at a logic gate 104 within the EPOD where traffic either egresses to the local Internet 107 where the EPD is located via path P104 or if it is to go through a secure wrapped and obfuscated tunnel via P107 to the access point server (SRV_AP) 110 offering the best connectivity to the region where SRV_AP 110 is located. Prior to traffic egressing SRV_AP 110, it passes through a routing logic gate 111. Traffic to egress locally to the internet 113 will go via path P111 to either a host client 115 or a host server 116 there. If traffic is not local but rather to be relayed to another region, it will go via path P116 through a tunnel 118 to the next SRV_AP 119.

At SRV_AP 119, three of many possible routing options are illustrated by the paths that traffic can take. There is a logic gate 126 to determine if traffic should remain and egress to the local internet 129 or if it should go through a tunnel via P126 to a SRV_AP in another region 127. Another possibility is illustrated via path P119 which demonstrates a tunnel from SRV_AP 119 to another EPD 121 in a distant region. This is an EPD 103 to EPD 121 bridged via multiple bridged tunnels. A further possibility is for traffic to reach client devices 125 126 in the LAN 122 where EPD 121 is located through the EPD's connection P121.

Figure 12:
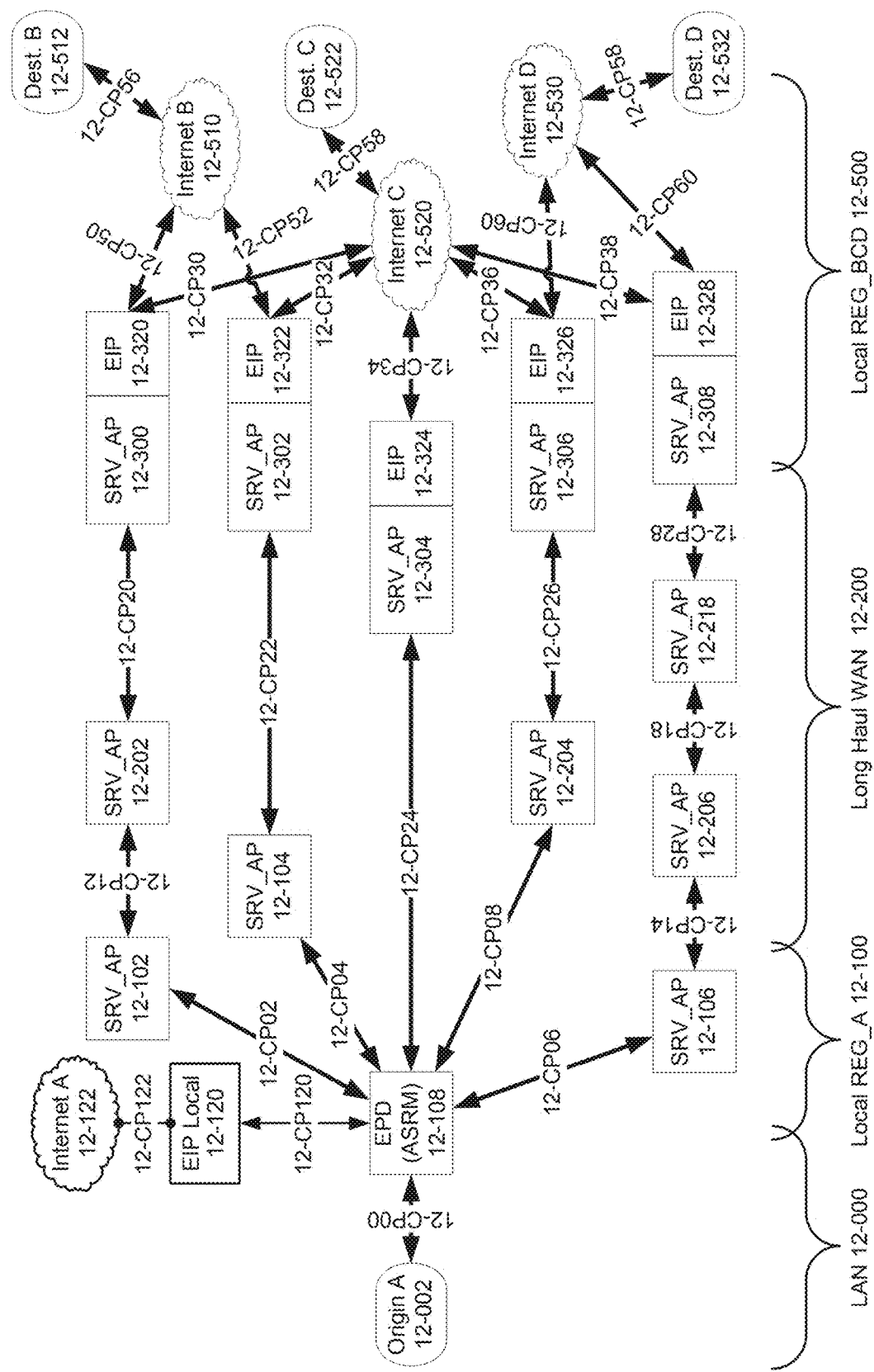
FIG. 12 is a flow chart of the various routes available through a GVN from an origin to a destination.

FIG. 12 is a flow chart of the various routes available through a GVN from an origin C 12-002 to destination S 12-502. There can be many more possible combinations that are not shown or discussed.

Path 12-CP00 from the Origin A Client C 12-002 to the EPD 12-108 can be used to measure the performance from the client through the LAN to the EPD. Matching of best routes is achieved after tests and evaluating real-time data of available paths. GVN ingress from EPD via first hop 12-CP00 to an access point server (SRV_AP) 12-102, 12-104, 12-106, 12-202, 12-204.

Paths from EPD to first SRV_AP can be defined as the ingress point from the EPD into the GVN and measured accordingly. Internal hops from SRV_AP to SRV_AP follow internal routes which always try to maintain the best path connectivity. These could be OTT internet, over backbone, over dark fiber, or other related routing.

Best egress points out of the GVN are also kept track of locally, in that remote region and also holistically for the entire network segment from origin to destination.

Tests can be run on each segment, combinations of segments, and the total network path from end to end taking into account various factors to evaluate. Traffic type and path determination can depend on data attributes and profile QoS requirements. The main path choice is always based on best factors for traffic over path. A function of this mechanism is to match paths between destination and origin to flow for best possible bidirectional route. Traffic for target destination flows via the most ideal egress ingress point (EIP) for that specific destination.

Various database tables can be maintained to support and govern route management in the advanced smart routing mechanism:

A "IP Addresses in this region" table is a registry of IP addresses to keep local and egress into the local internet 12-122 via EIP local 12-120.

A "Geo-D targets and various EIPs" table plots a path through the GVN to the most appropriate EIP 12-320 12-322 12-324 12-326 12-328 in a remote region to reach destinations 12-512 12-522 12-532 via internet in remote regions 12-510 12-520 12-530.

A "Country IP Blocks for regional routing" table can be utilized for routing based on IP addresses in various regions and/or countries or other location granularity.

A "Server_Availability List" can be is compiled for each device via algorithmic analysis of various factors including best servers for that device to utilize as well as on the current state and condition of the various potential servers that it could utilize. Load factors related to capacity, routing, network segment conditions, and other issues which could impact operations are taken into account when allocating servers and listing them on a server availability list created for a specific device.

A "Tunnel Registry" table can be used to keep track of the multiple tunnels between peer pairs.

A "GVN routes" can be used to list the routing for available end-to-end or partial paths for traffic to take via the GVN from one point to another point.

The above information is described as being stored in database tables as one example of storage to assist in this description. It could also be stored as lists in flat files, in memory or on disk, or in various other formats. Some or all of the routing information can be utilized to determine best route for traffic to take by matching destination to EIP via the best path.

Figure 13:
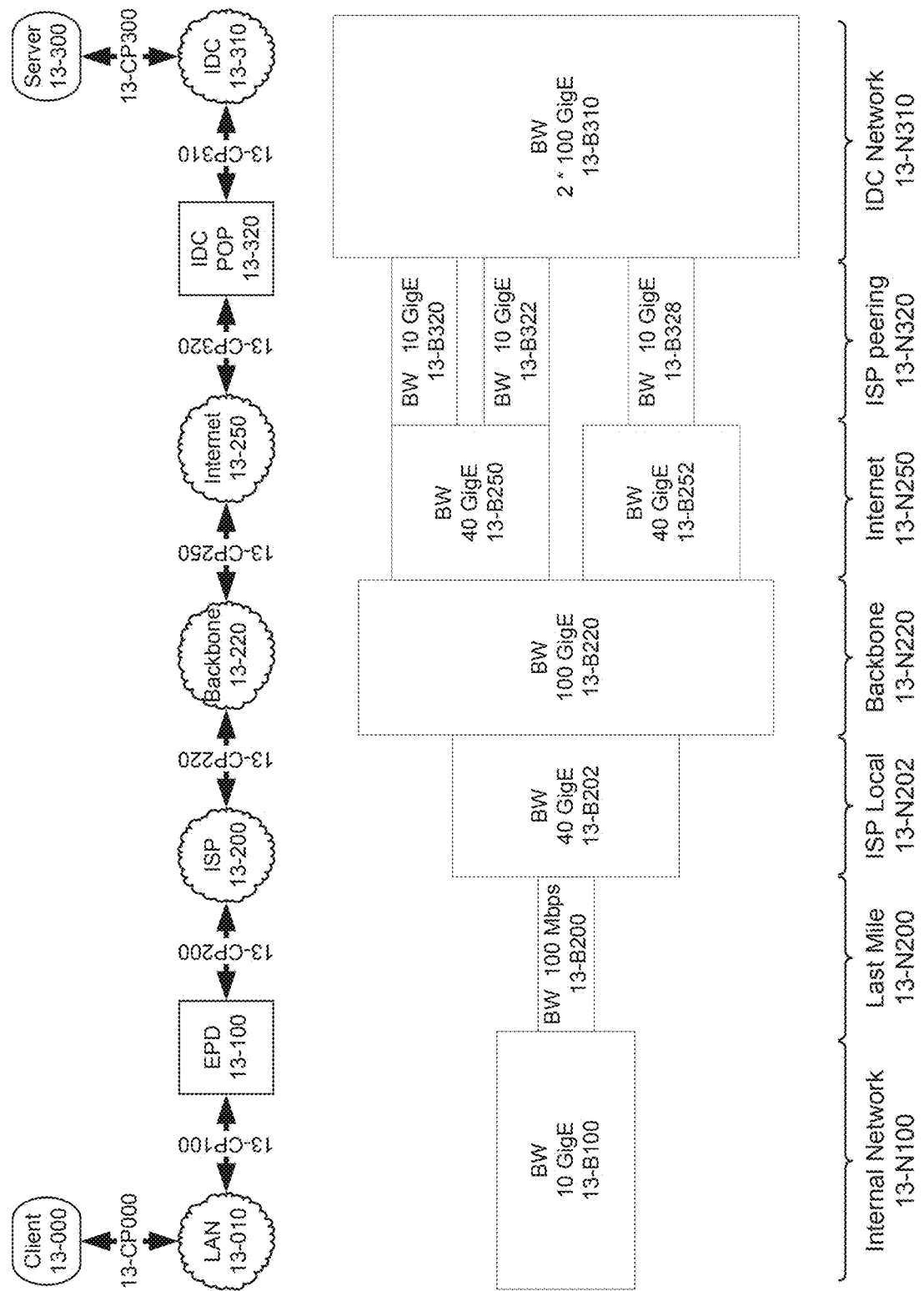
FIG. 13 illustrates the conjoining of various different network segments into an end-to-end path.

FIG. 13 illustrates the conjoining of various different network segments into an end-to-end path. For example, from Client 13-000 to Server 13-300, the traffic transits via a local area network (LAN) 13-010 to an end point device (EPD) 13-100 to an internet service provider's (ISP) 13-200 network to a backbone 13-220 to internet 13-250 in a remote region to an internet data center's (IDC) point of presence (POP) 13-320 into the IDC's internal network 13-310 and then to the server 13-200.

As shown by this example, it is important to understand the characteristics of each segment and how that segment impacts the traffic flow with respect to the complete end-to-end pathway. An internal network or LAN 13-N100 will typically have a reasonable amount of bandwidth (BW) for internal use such as BW 13-B100 which is 10 GigE in size. The bandwidth for an ISP's network 13-N202 will also typically be fairly large as exemplified by BW 13-B202 of 40 GigE. Between those two networks, a last mile connection 13-N200 between the client location and the ISP is a relatively small 13-B200 BW of 100 Mbps. There are numerous drivers behind this but the main one is cost. An ISP will bring a pipe to a neighborhood of a bandwidth of a certain size and then will usually share this amount with many different users to each of their last mile connections. These upstream paths are the beginning segments towards the broader and wider general internet.

A backbone 13-N220 connects ISPs to each other, regions to regions, and more and backbones offer very deep and high bandwidth connectivity such as 13-B220 of 100 GigE. This could represent the carrying capacity of a strand of fiber between two points, and/or the size of the switch's capacity rating or other factors.

The internet 13-N250 in this figure is represented by dual pipes of BW 13-B250 and 13-B252 each at 40 GigE. This is an example of a multi-honed connectivity in an internet. There may be many other large pipes at the core of an internet connected together.

ISP peering 13-N320 between the internet 13-N250 and an IDC network 13-N310 is represented again by multi-honed connectivity BW of 10 GigE each for 13-B320, 13-B322, and 13-B328. This represents dedicated last mile for that data center. There may be many more communication links for an IDC.

The internal IDC network 13-N310 will typically have very high BW 13-B310 distributed amongst various internal networks which each is rated to a certain speed such as 100 GigE. The notation 2*100 GigE represents that this is a network two times 100 GigE BW.

Figure 14:
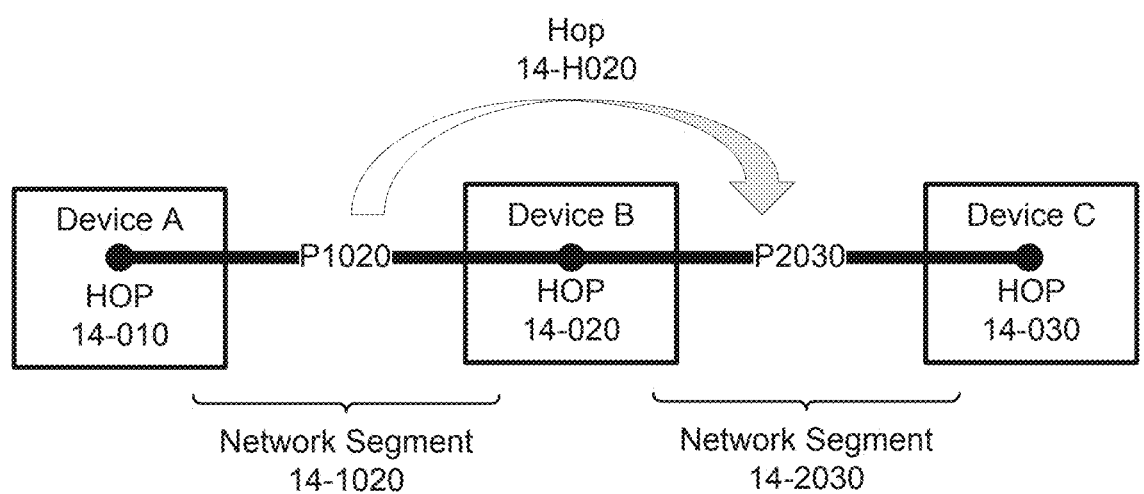
FIG. 14 illustrates a hop between two network segments.

FIG. 14 illustrates a hop between two network segments. The hop 14-H020 through Device B 14-020 is a connection between two network segments 14-1020 and 14-2030 which are paths to Device A 14-010 and Device C 14-030 respectively.

There are several factors which influence the flow of traffic through a hop including the bandwidth of the two network segments, the physical capacity for carrying traffic through Device B 14-020, the current level of traffic flowing through it and corresponding congestion, and other factors.

Figure 15:
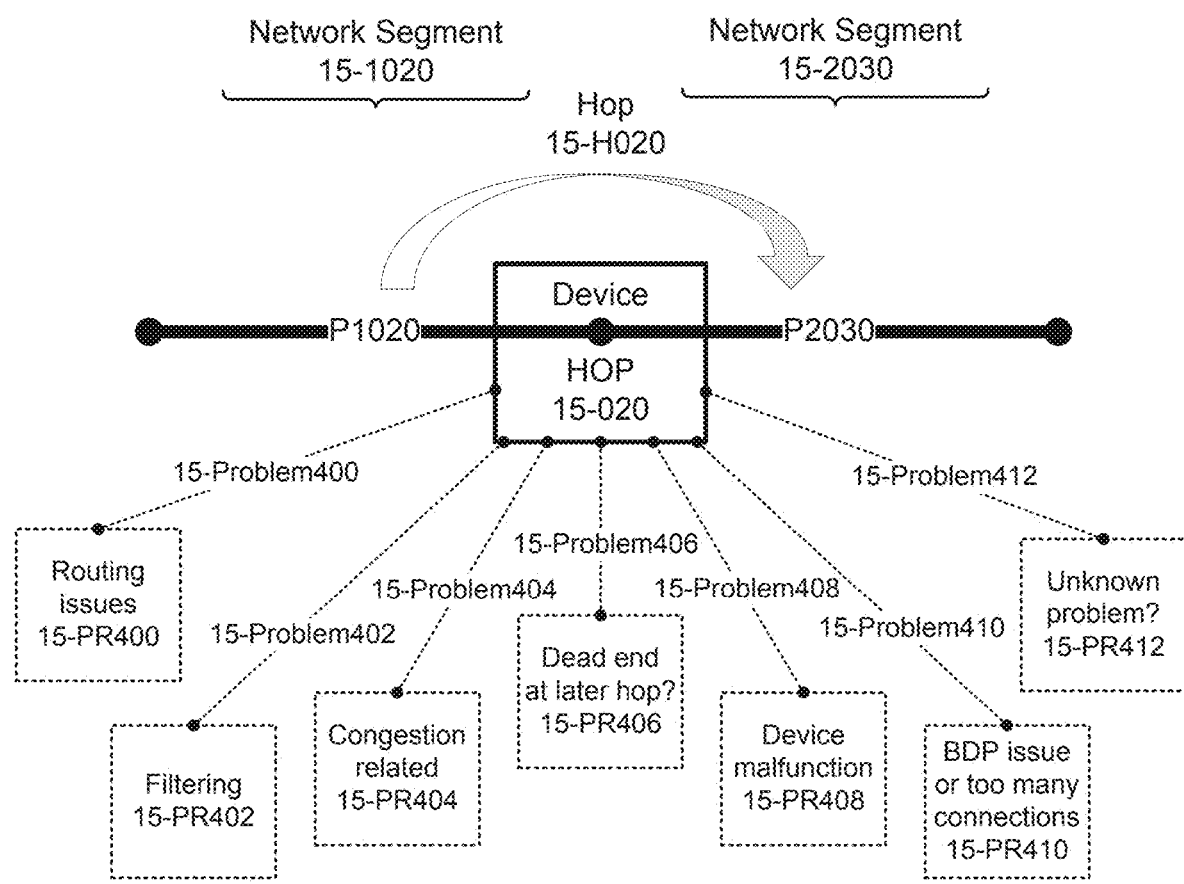
FIG. 15 illustrates potential problems which can occur within a device at a hop between two network segments.

FIG. 15 illustrates potential problems which can occur within a device 15-020 at a hop between two network segments P1020 and P2030. A problem 15-Problem 400 such as routing issues 15-PR400 may add too many hops to a path, and/or increase latency due to a circuitous path. There are other routing problems 15-Problem406 such as a dead end at later hop 15-PR406 which can influence which segment that traffic should flow down if there is a choice after a hop.

Another problem 15-Problem 402 such as filtering 15-PR402 on the Device 15-020 could significantly slow down the traffic transiting through the hop 15-H020. Some kinds of filtering may block a traffic type entirely or firewall operations such as deep packet inspection (DPI) require time and resources adding to the latency through a hop.

Congestion related 15-PR404 problems 15-Problem404 have to do with the volume of traffic as measured by bandwidth or could also be related to the problem of too many concurrent connections established by various streams of data through the hop 15-H020, a combination of both, and/or other factors.

Other problem 15-Problem408 issues such as device malfunction 15-PR408 can cause unpredictable and detrimental drags on traffic through the hop 15-H020.

Problems 15-Problem410 such as BDP related issues 15-PR410 occur when one segment is larger than another segment. If inbound traffic from the larger segment enters Device 15-020 the smaller segment cannot accept the entirety of the volume. The device may try buffering the excess traffic in RAM to be sent when the data flow abates. If the RAM or other buffer completely fills up, the result will be packet loss.

There can also be other problems 15-Problem412 which have a direct impact on the efficiency of traffic flow through a hop, however these may be unknown problems 15-PR412 and as such the only viable remedy may be to route traffic around that hop.

Other problems may be possible and occur through a hop. The key point is that the result of problems through a hop are high latency, packet loss, constricted bandwidth and other effects which adversely affect traffic flow. A follow-on consequence of packet loss through a hop is the perverse result of sending devices resending dropped packets which can cause a cascading effect due to even more packets trying to get through an already oversaturated hop.

Figure 16:
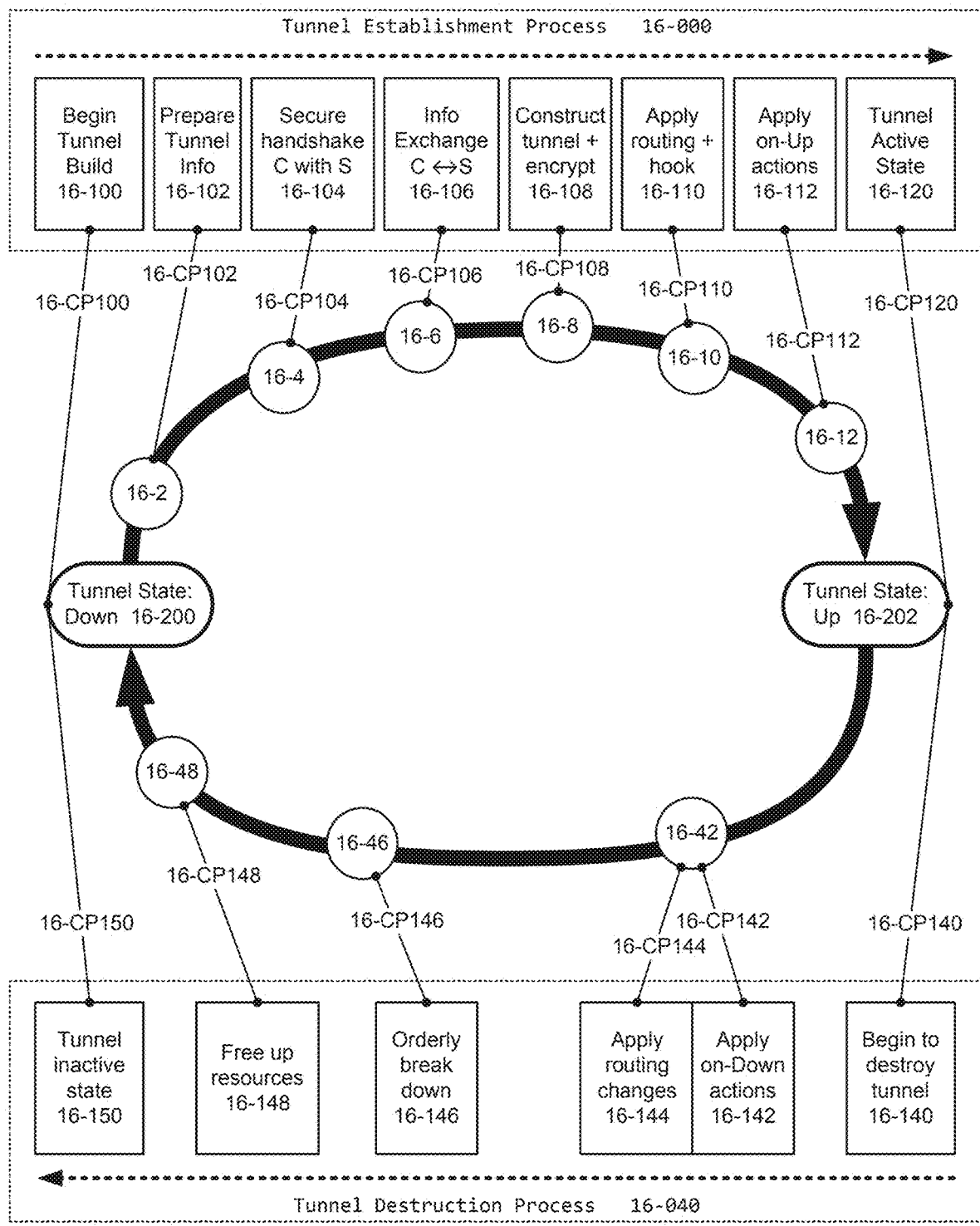
FIG. 16 illustrates the lifecycle of a tunnel.

FIG. 16 illustrates the lifecycle of a tunnel between an initiating client device and a listening server device to build a tunnel between the two. The terms client and server are used for descriptive purposes and may reflect the roles of the devices described or devices may exist within a peer to peer (p2p) relationship with one peer behaving like a client and the other peer behaving like a server.

The tunnel establishment process 16-000 steps from Tunnel State: Down 16-200 through to Tunnel State: Up 16-202. It begins with the first step Begin Tunnel Build 16-100. Prepare Tunnel Info 16-102 begins with the client device gathering information about the server to which it desires to build a tunnel with. If a peer pair relationship exists, and if the information is current, then the client device will use that information. If there does not exist a peer pair relationship, or if there is no tunnel information which could be used by the devices to build a tunnel between them, or if the peer pair relationship info or tunnel info are stale, then an API call to a SRV_CNTRL (e.g. SRV_CNTRL 17-200 in FIG. 17) can be utilized by each device to gather relevant peer pair and tunnel information.

The next step, Secure handshake C with S 16-104, is initiated by the client with call to the server. The initial server check may validate a fingerprint and identifiers of client may verify that it is entitled to interact with the server. A TLS handshake may be used for each device to tell the other who it is and to exchange keys with which to use to create an encrypted connection between them so that they can talk with each other. During regular tunnel establishment, there is risk that the tunnel can be sniffed and interfered with such as by the deliberate injecting of a TCP_RST reset packet sent to break the flow of traffic between the two tunnel peers.

The next step, Info Exchange C↔S 16-106, includes information specific to the building of the tunnel, including credentials, keys, network parameters, configuration settings, and other information. The settings between both sides must match or there may be problems with tunnel building.

The next step, Construct tunnel+encrypt 16-108, will use the information about the tunnel to construct the encrypted tunnel and to prepare it to send traffic. The traffic begins to flow here.

The next step, Apply routing+hook 16-110, is where routes are applied to the tunnel determining which traffic should go through the traffic and which traffic should stay within the client device to be handled by the next internal interface there.

The next step, Apply on-Up actions 16-112, can include on up triggers to execute scripts, subroutines, or other actions to log tunnel up event in a database, to check routes, and do other housekeeping such as testing, applying routes, and if IP forwarding is required to automatically set that up, or to take other actions.

At a certain point after the tunnel is constructed at the step Construct tunnel+encrypt 16-108, the tunnel is ready and able to carry traffic.

Depending on the size and complexity of the routing table applied at the Apply routing+hook 16-110 step, a relatively significant amount of time may pass between the start and finish of the route building.

Since traffic may already be flowing through the tunnel during route building, an unpredictable, systemic behavior affecting traffic flow may occur. Some traffic may go through the tunnel while other traffic may not go through. Leakage is therefore an unintended consequence of this period of time during route building leading to potential security issues, potential for lost packets in a stream, as well as other issues. For example, the reciprocal host device in a stream may get confused on where to send the traffic back to since the start of the stream was flowing from an edge IP address on the first device which is suddenly changed to the IP address on edge of the server device once the tunnel is up.

When a tunnel goes down, it suddenly drops sending all traffic out of the tunnel and inbound tunnel traffic cannot find the end point of the tunnel, which no longer exists, and new tunnel build process has to wait for cleanup of routes and for the tunnel destruction process 16-040 of the first tunnel to complete. Furthermore, the end result is an issue of gaps in the protections afforded by the tunnel as well as unstable routing leading to broken connections. The new tunnel needs time to build before it can be ready to carry traffic dependably.

The Tunnel Destruction Process 16-040 describes the steps in order from Tunnel State: Up 16-202 back to Tunnel State: Down 16-200. The causes for a tunnel to break may be an intentional clean stop order or an unintentional non-clean stop due to a broken underlying connection, a poor connection with too high latency or too much packet loss, or if there are not enough system resources to maintain the tunnel, or other reason(s).

The Apply on-Down actions 16-142 step execute scripts such as capturing temp log files and saving their data in database tables, in log files, or other forms of permanent storage. An entry into a database log can note the tunnel down event. This step can also communicate via API with ASR managers and tunnel managers to notify state change of the tunnel. Each device can take actions independently or in collaboration with other devices according to need.

The next step, Apply routing changes 16-144, removes routes from the tunnel as well as removal of the tunnel's entrance and exit route entries. Until routes are flushed, then traffic can be effectively blocked as if the tunnel is no longer up but traffic routed to it, then there is nowhere for the traffic to go. Once routes are removed, traffic can flow around the old tunnel.

The orderly break down 16-146 and free up resources 16-148 steps complete the removal of the tunnel.

Figure 17:
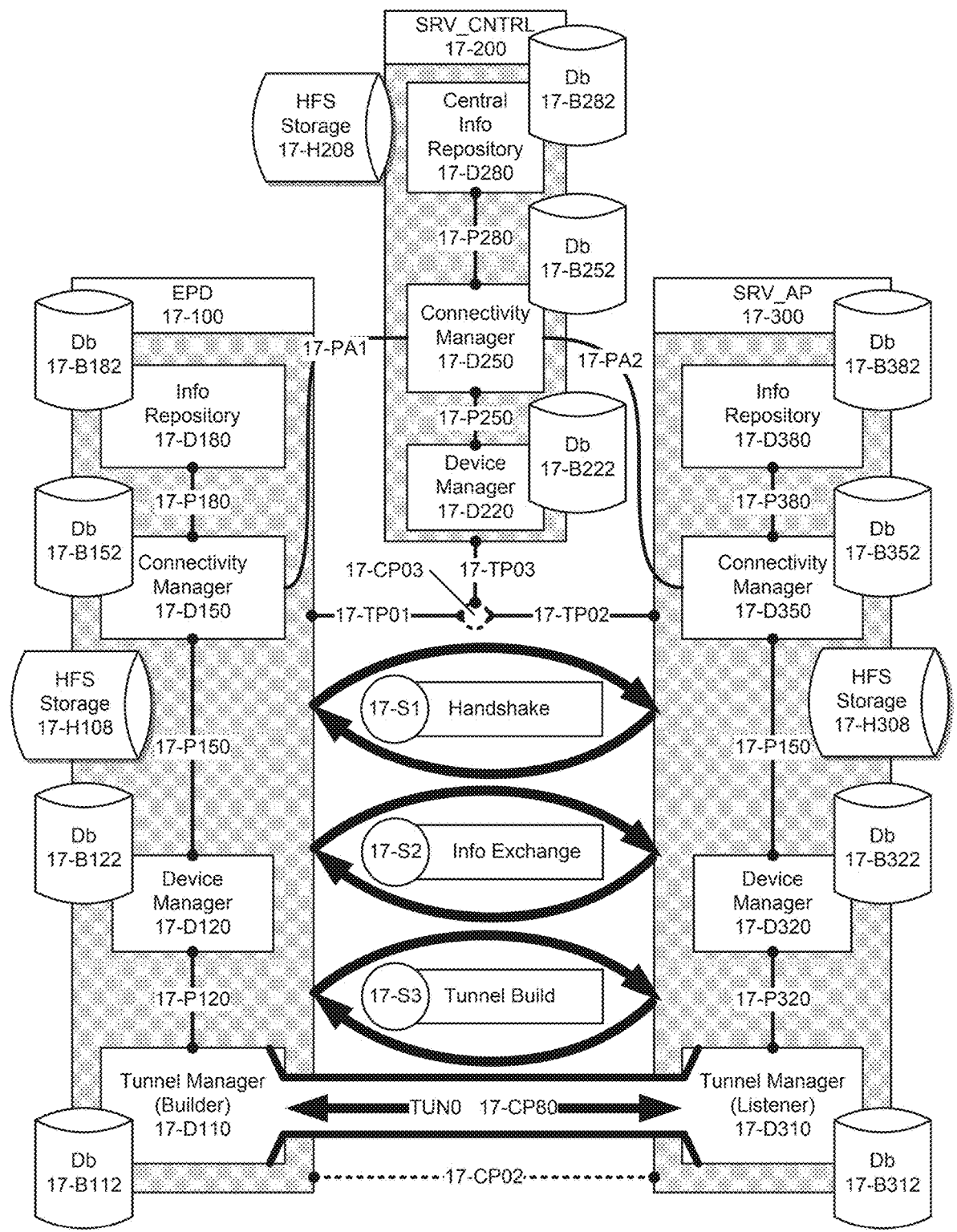
FIG. 17 illustrates the relationship and interactions between an end point device (EPD), a central control server (SRV_CNTRL), and an access point server (SRV_AP) when building a tunnel between the EPD and the SRV.

FIG. 17 illustrates the relationship and interactions between, an end point device (EPD) 17-100, a central control server (SRV_CNTRL) 17-200, and an access point server (SRV_AP) 17-300 when building of a tunnel TUN0 17-CP80 between the EPD 17-100 and SRV_AP 17-300.

The steps to build TUN0 17-CP80 include 17-S1 Handshake, 17-S2 Info Exchange, and 17-S3 Tunnel Build. In order for the Tunnel Manager (Builder) 17-D110 on EPD 17-100 to build the TUN0 17-CP80, it needs certain information about the SRV_AP 17-300 which it can connect with to build the tunnel, information about the tunnel, and more. In order for the Tunnel Manager (Listener) 17-D310 on SRV_AP 17-300 to accept the handshake 17-S1 from EPD 17-100's Tunnel Manager (Builder) 17-D110, to negotiate information exchange 17-S2, and then to build the tunnel 17-S3, it also requires similar information. For example, the port and IP address assignment on SRV_AP 17-300 should be unique to prevent conflicts. In addition, certificates, credentials such as password, and supporting information for advanced tunnel features such as wrapping and/or capping also need to be known by both peers when building a tunnel.

For non-stable, dynamically changing information used for tunnel building, a client device such as an end point device (EPD) 17-100 will need to share info with a server such as an access point server (SRV_AP) 17-300 prior to the Tunnel Manager (Builder) 17-D110 being able to interact with the Tunnel Manager (Listener) 17-D310 on an SRV_AP 17-300.

Tunnel security involves not just the aspects and attributes of the actual tunnel while up but also covers various stages during a tunnel life cycle. There exists a need to share and to protect keys, credentials, configuration, and other settings. By each device collaborating with an SRV_CNTRL 17-200 to share information pertinent to the other, this can protect the sending, generation, publishing, updating, and more handling of the information. Handshake and key exchange can be protected via encryption and also via capped connections. While up, the tunnel may be protected by encryption and also obfuscation via a cap.

Figure 18:
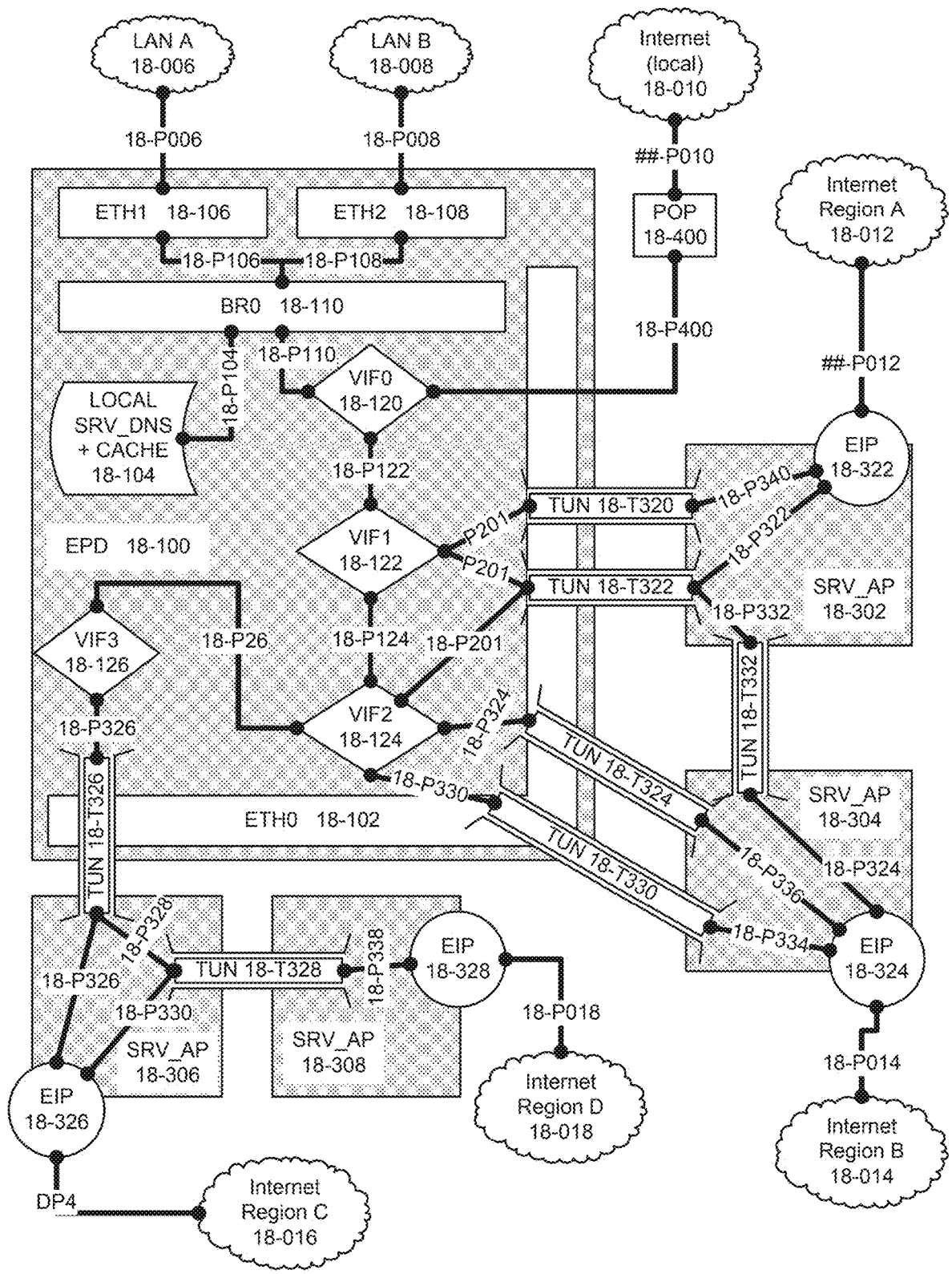
FIG. 18 illustrates the logical organization of interfaces and virtual interfaces within an end point device (EPD) to support multiple tunnels.

FIG. 18 illustrates the logical organization of interfaces and virtual interfaces within an end point device (EPD) 18-100 to support multiple tunnels. The interfaces ETH0 18-102, ETH1 18-016, and ETH2 18-108 are directly bound to the physical network interface cards (NIC) of the EPD 18-100. In this example, ETH0 18-102 is connected to a last mile uplink connection to the local internet 18-010 via paths 18-P400 to the ISP's POP 18-400 and 18-P010 to the internet.

Figure 19:
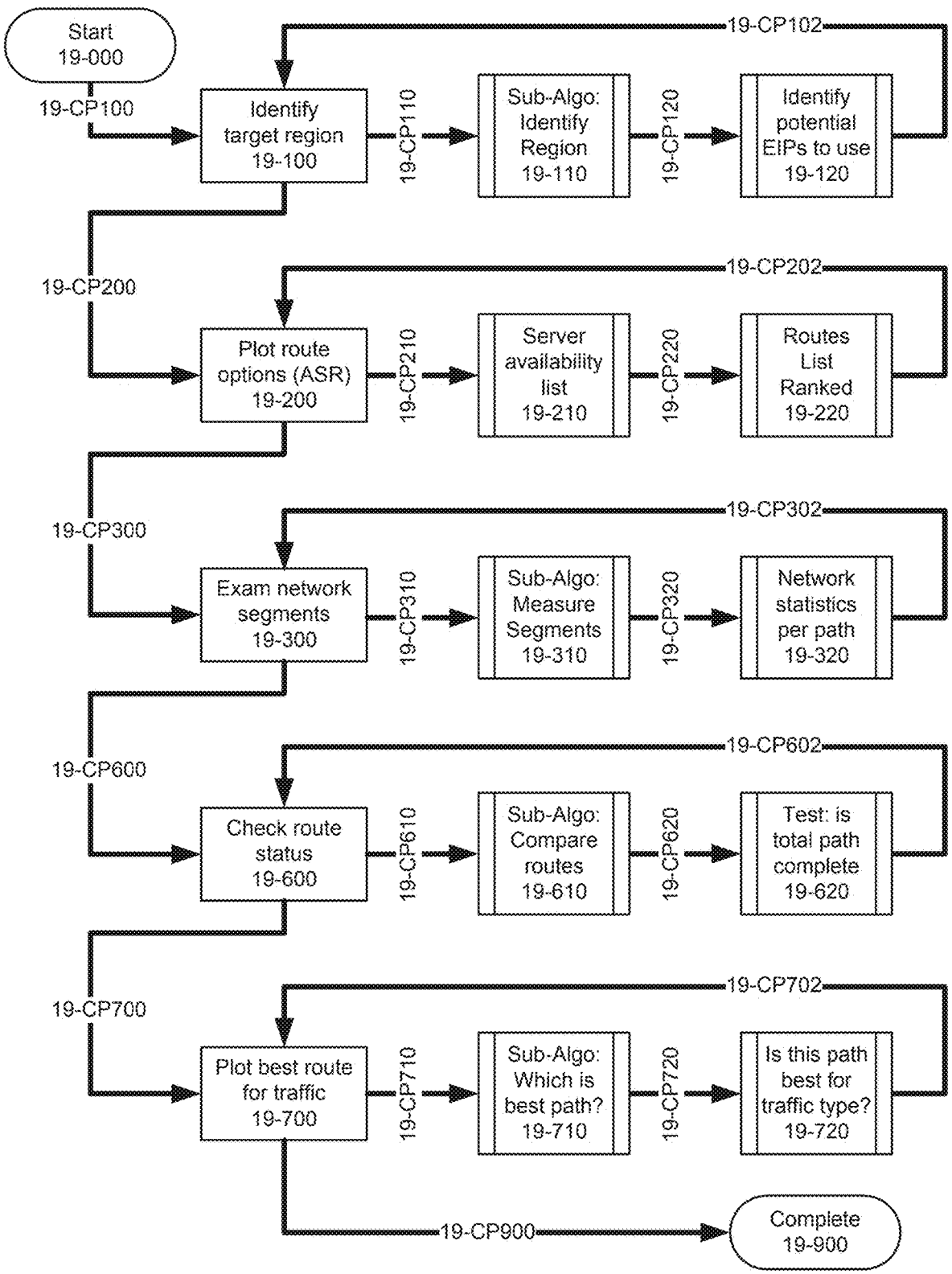
FIG. 19 is flowchart that describes the logic of algorithms which power advanced smart routing (ASR) within a global virtual network (GVN).

FIG. 19 is flowchart that describes the logic of algorithms which power advanced smart routing (ASR) within a global virtual network (GVN). The first process is to Identify target region 19-100 with its corresponding sub-processes identify region 19-110 and identify potential EIPs to use 19-120. This sets up the subsequent processes to hone in on the target egress ingress point (EIP) to utilize.

The next process, Plot route options (ASR) 19-200, utilizes sub processes server availability list 19-210 and routes list ranked 19-220 to determine the most optimal server(s) with which to build tunnels if they do not exist.

The next process, Examine network segments 19-300, utilizes sub processes measure segments 19-310 and network statistics per path 19-320 to evaluate the viability of a path to be used to send the type of traffic required. For example, for very small sized data which requires the fastest path, then the shortest distance and lowest latency are of most importance and low bandwidth may be tolerated. Conversely for huge sized data which is not time sensitive in terms of delivery of the first bit, the path offering the highest bandwidth is optimal because although first bit delivery is slower than the other path, last bit arrival is expected to happen sooner due to the higher bandwidth.

The next process, Check route status 19-600, utilizes sub processes Compare routes 19-610 and Test: is total path complete 19-620 to ensure the deliverability of data down that path.

The last process, Plot best route for traffic 19-700, utilizes sub processes sub-algo: which is best path? 19-710 and Is this path best for traffic type? 19-720 to determine and set the best route end-to-end.

Each process and sub process are utilized to ensure that each type of traffic is carried most optimally by the tunnel best suited for that traffic type.

Figure 20:
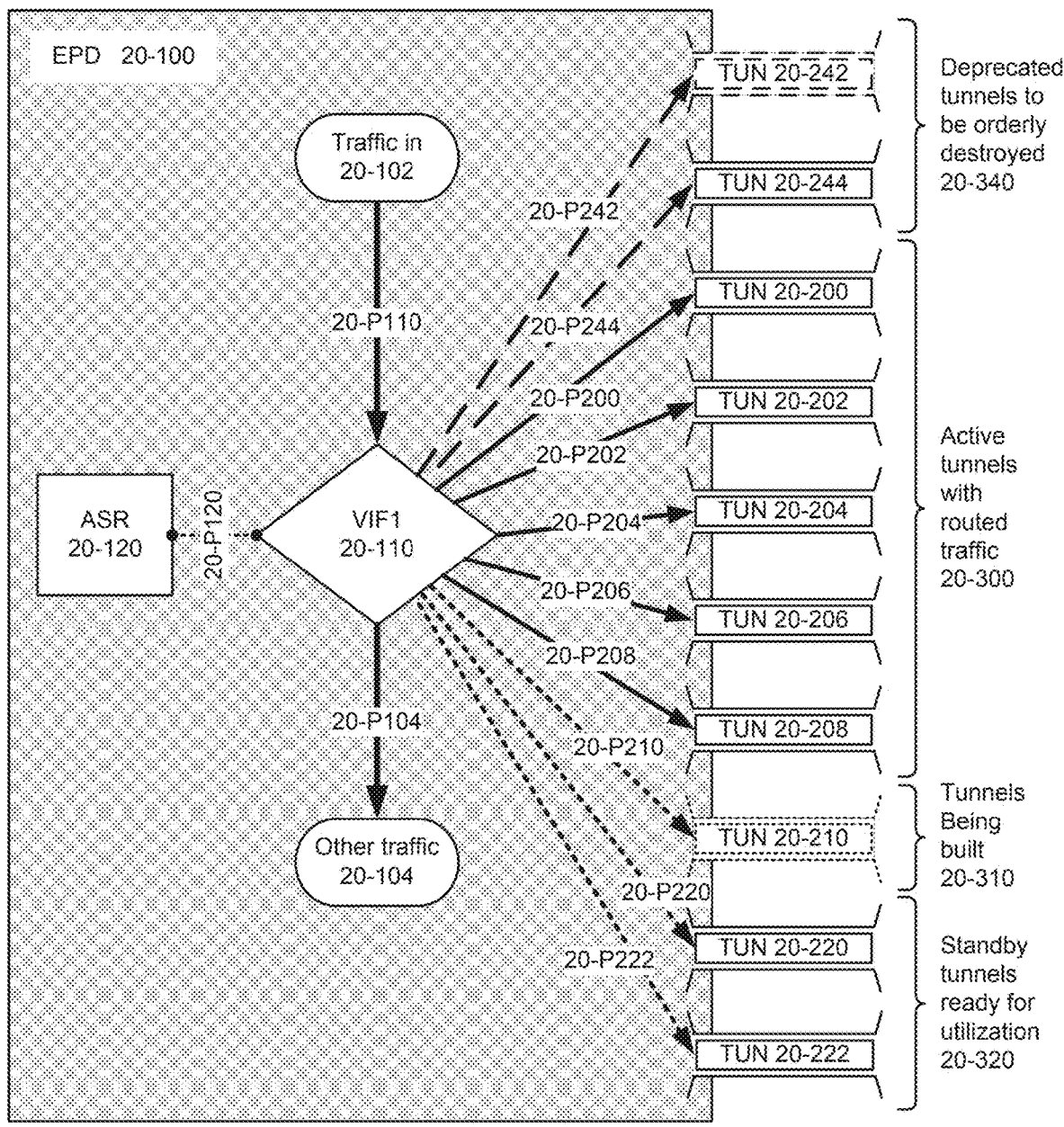
FIG. 20 illustrates the functionality of a virtual interface VIF with a traffic path and the advantages which it offers.

FIG. 20 illustrates the functionality of a virtual interface VIF1 20-110 with a traffic path and the advantages which it offers. Where FIG. 18 illustrated the logical virtue of VIF as hook points for multiple tunnels to various regions, this figure further describes a practical approach to organizing not just interfaces but also the various active tunnels and groupings of tunnels by tunnel life cycle event types. The main tunnel life cycle event types are: Deprecated, Active, Being Built, and Standby.

Deprecated tunnels to be orderly destroyed 20-340 is where tunnels which had been built and either used or not used and are no longer to be used, are destroyed.

Active tunnels with routed traffic 20-300 are where healthy tunnels are up and connected, able to push traffic to one or more access point servers (SRV_AP). A key advantage of having multiple active tunnels connected to a VIF is that an instantaneous switch of traffic from one tunnel to another tunnel can be made without any lost or leaked data.

Tunnels being built 20-310 is where new tunnels are being built between the EPD 20-100 and an SRV_AP.

Standby tunnels ready for utilization 20-320 is where built tunnels are up and functional between the EPD 20-100 and an SRV_AP, but are not in a production state actively handling traffic. Tunnels in standby mode have periodic tests run on them to assess their viability and their operational state. They also are kept viable by pings or regular sending of keep alive traffic.

The life cycle of tunnels attached to the VIF are that new tunnels get built as needed, these new tunnels are put in standby and tested. When an active tunnel experiences a problem and needs to be deprecated and destroyed, a standby tunnel can be turned active to replace it. Deprecated tunnels are destroyed in an orderly manner freeing resources for future new tunnels to utilize.

Figure 21:
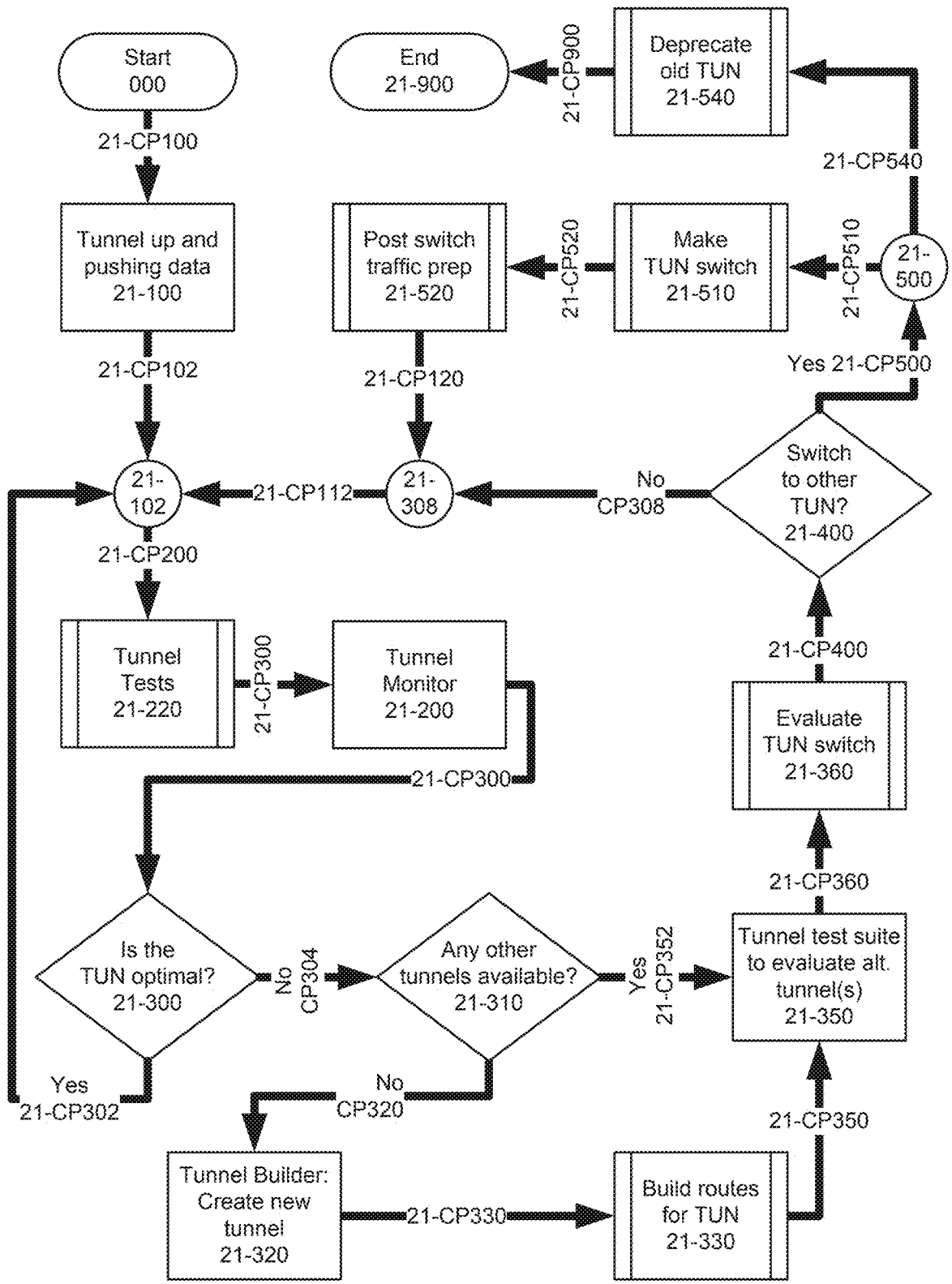
FIG. 21 is a flowchart describing the algorithm governing when the flow of traffic should be switched from one tunnel to another tunnel.

FIG. 21 is a flowchart describing the algorithm governing when the flow of traffic should be switched from one tunnel to another tunnel. This assumes that at some point, the tunnel was viable. The step tunnel up and pushing data 21-100 is followed by a junction point 21-102 to Tunnel Tests 21-220. The Tunnel Monitor 21-200 is followed by a check is the TUN optimal? 21-300. If it is optimal, the path Yes 21-CP302 leads back to the junction point 21-102.

If the traffic is not optimal, the logic flows via path No CP304 to a check any other tunnels available? 21-310 to check if there is another tunnel available. If another tunnel does not exist, the logical path No CP320 leads to Tunnel Builder: Create new tunnel 21-320 and once up, the process build routes for TUN 21-330 is executed. Alternatively, if a tunnel does exist, then logical path Yes 21-CP352 leads or path for newly created tunnel from 21-320 are sent to step tunnel test suite to evaluate alt. tunnel(s) 21-350. The process evaluate TUN switch 21-360 compares the quality of service (QOS) for both tunnels.

The decision gate Switch to other TUN? 21-400 evaluates where or not it is worthwhile to switch the flow of traffic via Make TUN switch 21-510 or to keep the traffic flowing through the current TUN via path No CP308.

Parameters governing switch logic include tunnel tolerance which may be set by user preference, or algorithmic analysis of current conditions, or other factors. Tunnel condition logs can be used for comparison of current and historical metrics and can help to make most efficient contextual switch decision making. Metrics of tunnel state also can be used for comparison of sets of tunnels relative to each other.

Type and nature of current traffic flowing through the tunnel such as the volume of traffic, the likelihood that a switch would break the flow of traffic, and other factors are also considered when deciding whether or not to switch to another tunnel.

Figure 22:
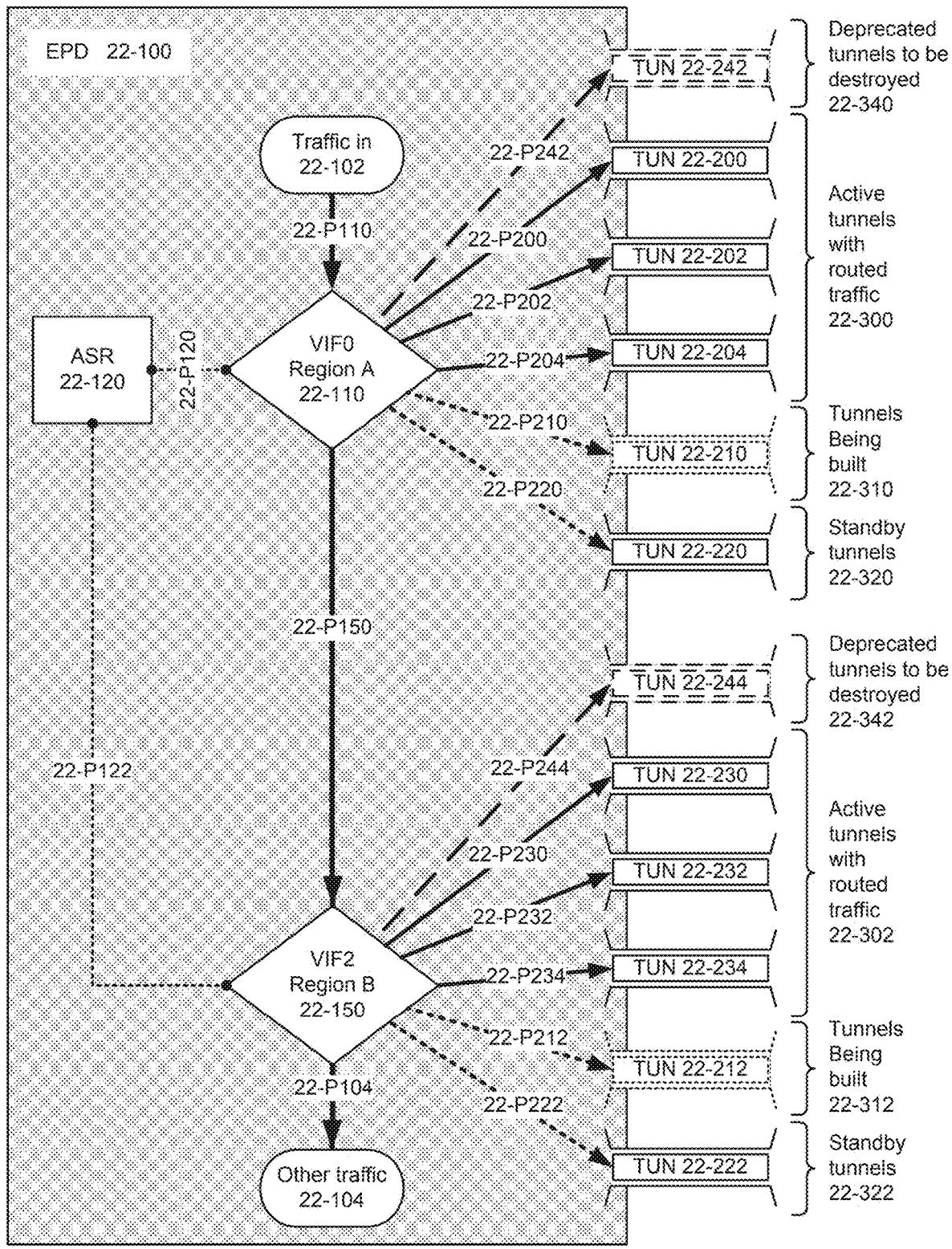
FIG. 22 illustrates the logical structure of two virtual interfaces (VIF) connected sequentially along a path.

FIG. 22 illustrates the logical structure of two virtual interfaces VIF connected sequentially along a path, each with routes applied to send traffic down tunnels for a specific region. In this example, VIF0 for Region A 22-110 traffic and VIF2 for Region B 22-150 traffic.

Each virtual interface has tunnels at various TUN life cycle stages as described in FIG. 20 above. The utilization of virtual interfaces can offer significant efficiency gains and there are advantages to building tunnels bound for one region on one specific VIF and tunnels for another region on another VIF. For example, time consuming processes such as route building can be done on the VIF, ahead of the TUN, so that when new tunnels are built and/or existing ones are already available, then traffic for the target region can be instantaneously switched from one tunnel to the other one. This also simplifies routing tables and resource management by applying them in one place, on the VIF rather than having to apply them to each and every individual tunnel.

Figure 23:
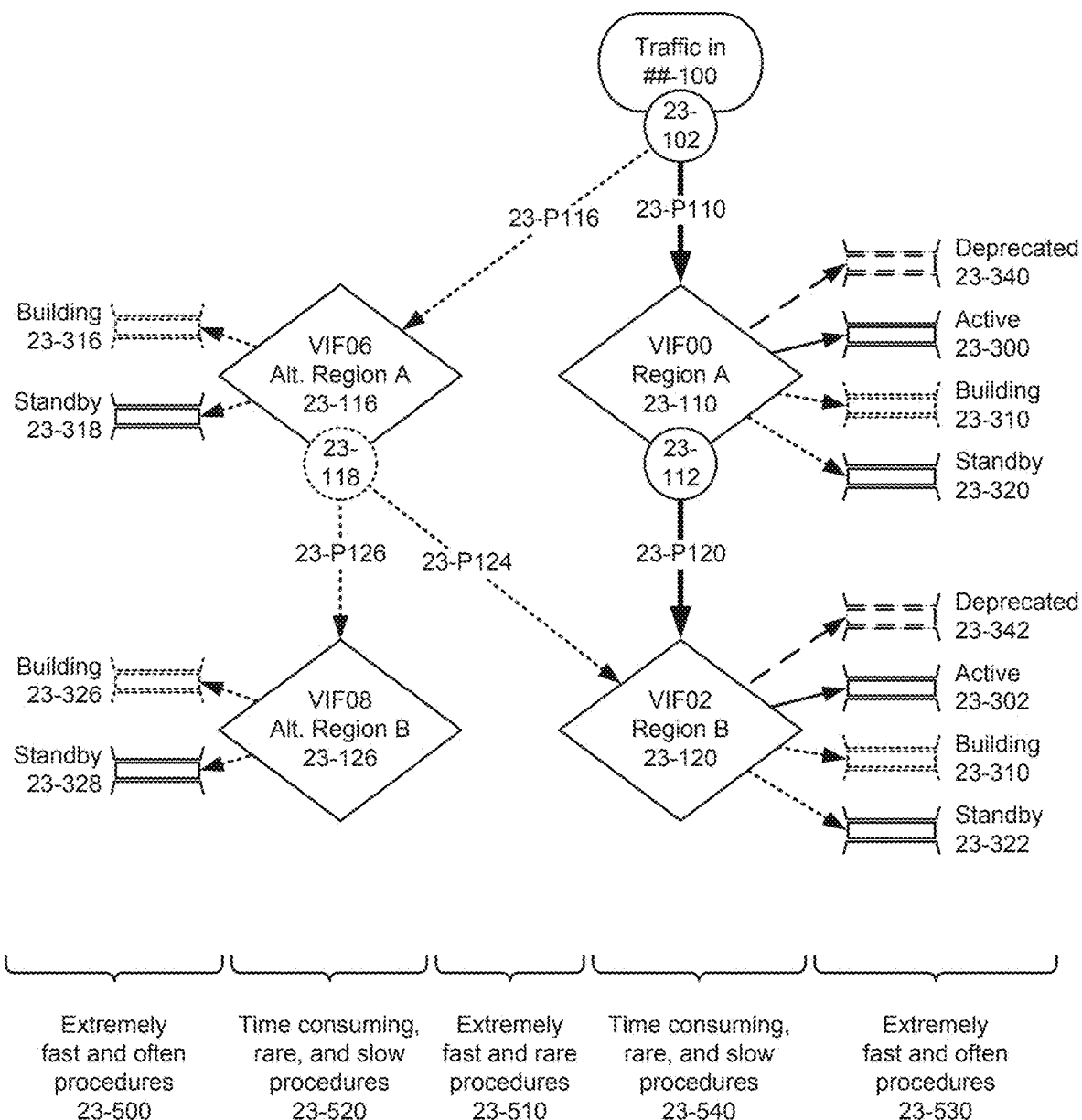
FIG. 23 illustrates that time required for various tunnel (TUN) and virtual interface (VIF) processes.

FIG. 23 illustrates that time required for various tunnel (TUN) and virtual interface (VIF) processes. The logical structure describes a path where traffic enters at Traffic in 23-100 to junction point 23-102. Two active VIF are connected via paths 23-P110 and 23-P120. VIF00 Region A 23-110 links to tunnels destined for region A and VIF02 Region B 23-120 links to tunnels destined for region B.

Two standby VIFs and corresponding tunnels are VIF06 Alt. Region A 23-116 and VIF08 Alt. Region B 23-126. The difference between VIF00 and VIF06 is that the alternative standby VIF06 has only building 23-316 and standby tunnels Standby 23-318.

For example—time consuming, rare, and slow procedures 23-540 and 23-520 of building virtual interfaces, adding routes, and related processes take a lot of time but do not happen very often.

And since tunnel routing has been shifted upstream to the VIF, the tunnel operations are relatively extremely fast and often procedures 23-530 and 23-500.

When one virtual interface such as VIF00 Region A 23-110 becomes unviable, then the logical flow of traffic 23-P110 can be shifted to path 23-P116 to a standby VIF VIF06 Alt. Region A 23-116 in operation with tunnels to that VIF's target region up and ready. The shift from one VIF to another is an extremely fast and rare procedure 23-510.

Figure 24:
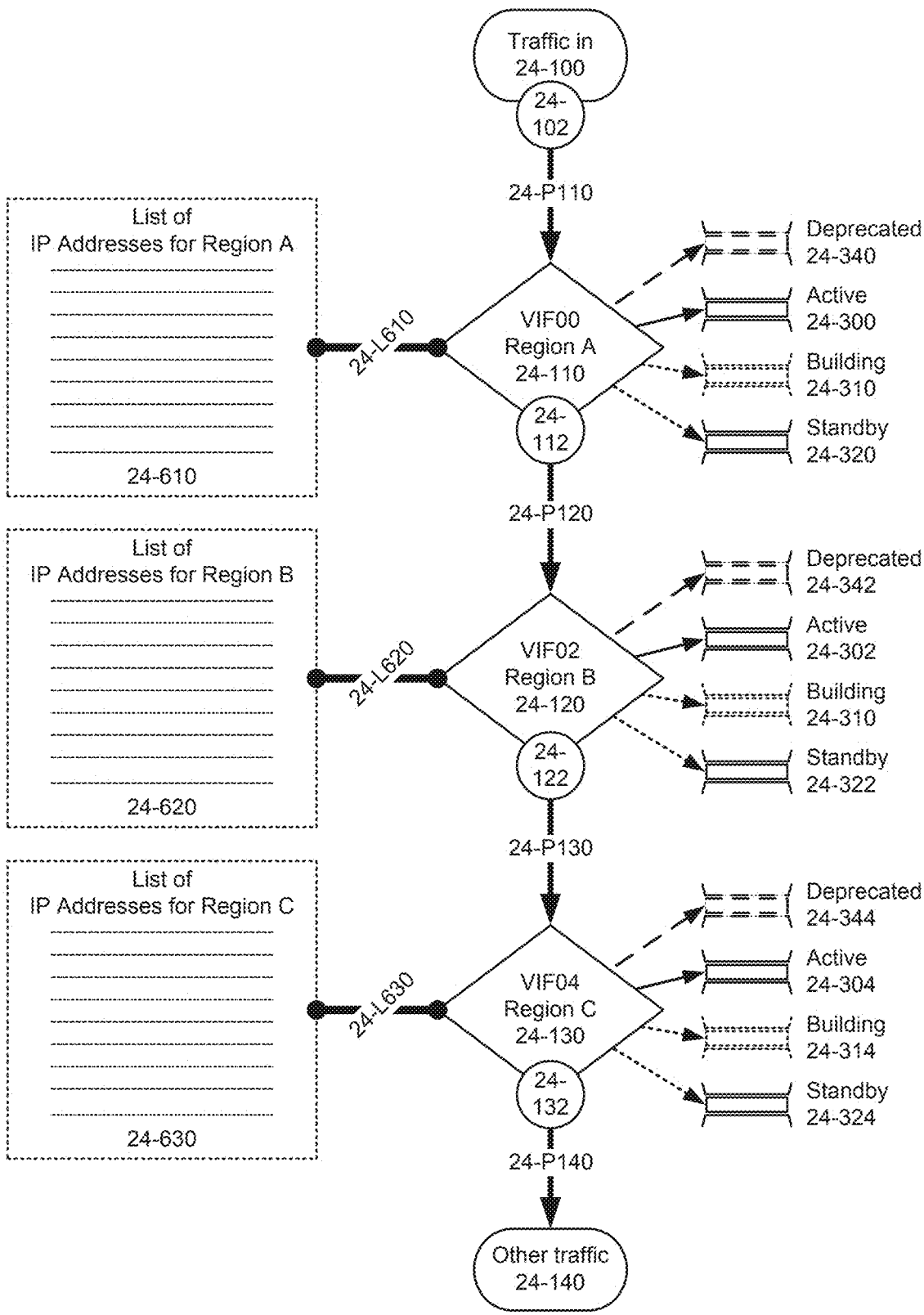
FIG. 24 illustrates the logical structure of multiple VIFs arranged sequentially within a traffic path between traffic in and other traffic.

FIG. 24 illustrates the logical structure of multiple VIFs arranged sequentially within a traffic path between traffic in 24-100 and other traffic 24-140. Traffic for region A is sent down Active 24-300 tunnels attached to VIF00 Region A 24-110 when the IP address of the target destination host device matches an address on a list of List of IP Addresses for Region A 24-610. The IP address list can include single IP addresses, ranges of IP addresses, notational description of a range such as CIDR, or other way to define location address of a host. The list 24_610 acts like a funnel sending all matches down tunnels, and the remaining unmatched traffic to the next leg in the logical sequence via a link point between VIF's such as 24-112 to path 24-P120 to VIF02 Region B 24-120.

Traffic at VIF02 Region B 24-120 is then checked against a List of IP Addresses for Region B 24-620. If there is a match, then traffic is sent down an Active 24-302 tunnel. If no match, then the traffic continues along sequential path via 24-122 to the next VIF and so on.

If there is no match for traffic for Region A, Region B, or Region C, then it continues along the sequential path to Other traffic 24-140 where it can either egress on the open internet, be captured in a buffer, blackholed, or otherwise routed.

Figure 25:
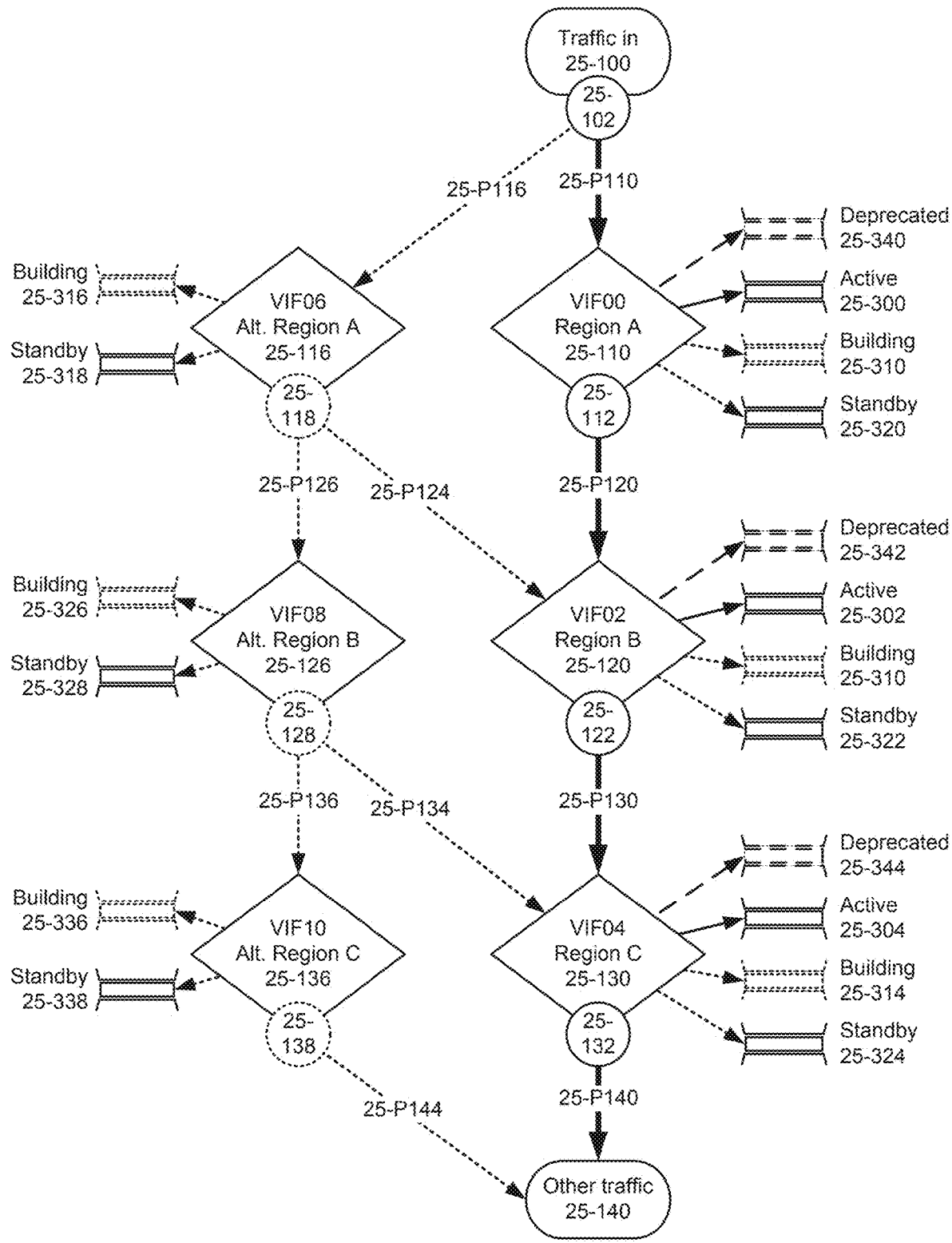
FIG. 25 illustrates the logical structure of three virtual interfaces and their various tunnels to three different regions.

FIG. 25 illustrates the logical structure of three virtual interfaces and their various tunnels to three different regions VIF00 Region A 25-110, VIF02 Region B 25-120, and VIF04 Region C 25-130. In addition, this figure show the corresponding standby, alternative virtual interfaces and standby tunnels VIF06 Alt. Region A 25-116, VIF08 Alt. Region B 25-126, and VIF10 Alt. Region C 25-136. Furthermore, this figure also shows the flow of traffic past the VIFs at Other traffic 25-140 if there is no match of IP addresses for any of the target regions.

FIG. 26 illustrates timelines for various tunnel (TUN) and virtual interface (VIF) related operations.

Total Time: Regular Tunnel—to be built or rebuilt 26-180 outlines the time and steps required to build and bring up a tunnel TUN0 26-100.

Total Time: VIF to be built or rebuilt and at least one TUN to be added 26-280 outlines the time and steps required to build and bring up a virtual interface VIF0 26-200 and attach a first tunnel ready to push traffic.

Total Time: Tunnel on VIF—to be built or rebuilt 26-380 outlines the time and steps required to build a subsequent tunnel TUN2 26-300 on to a VIF.

Total Time: Tunnel on VIF—switch traffic to 26-880 outlines the time and one step required to switch traffic from one tunnel to another tunnel TUN8 26-800 attached to a VIF.

Total Time: Tunnel on VIF—to be destroyed 26-380 outlines the time and step required to deprecate a tunnel TUN4 26-400.

This figure is not to scale but shows the relative the time advantages of building tunnels on to virtual interfaces with routing applied to the VIF upstream from the TUNs.

Figure 27:
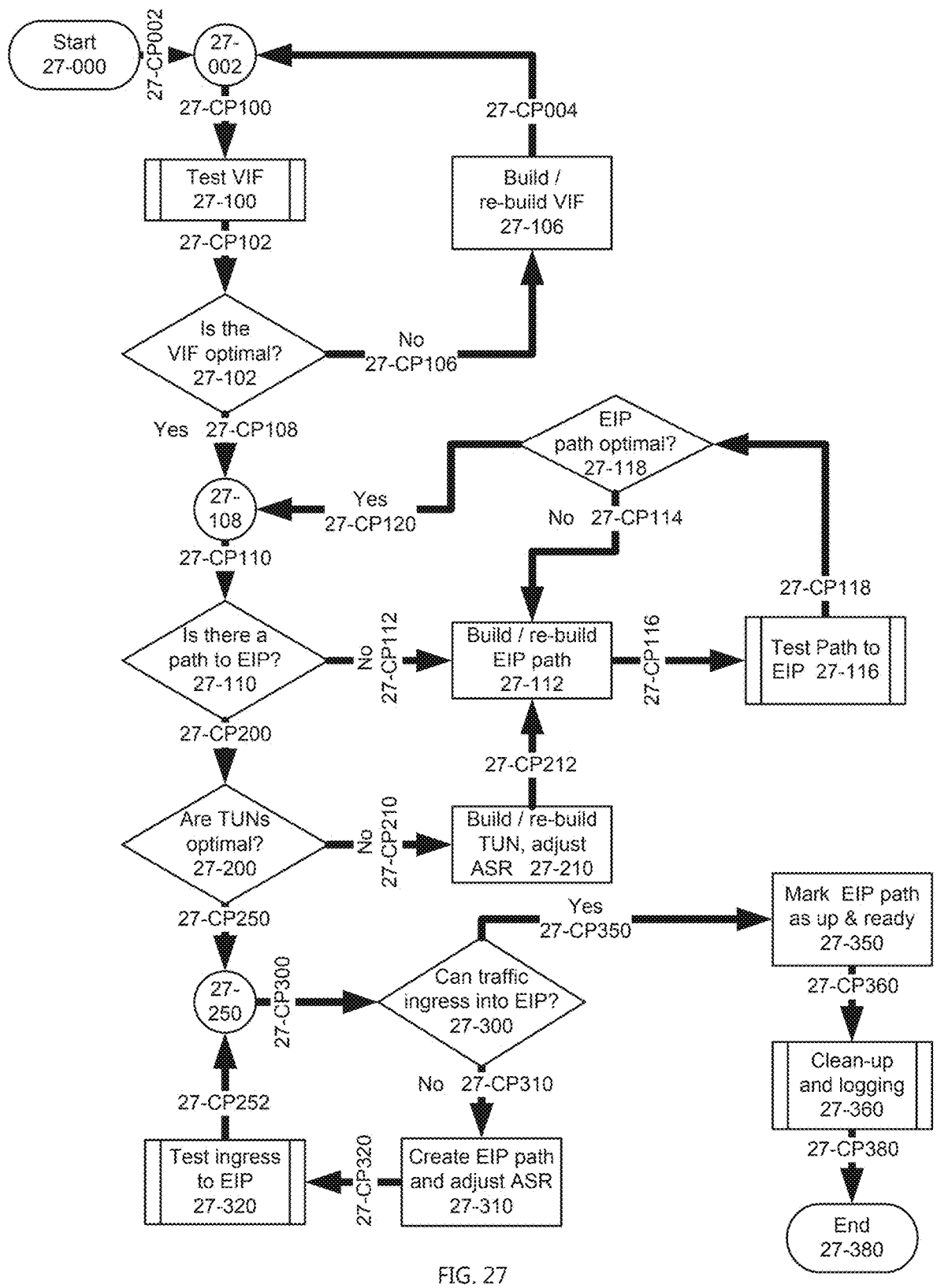
FIG. 27 is a flowchart that describes the algorithm governing the decision-making process of whether or not to switch from one virtual interface to another virtual interface.

FIG. 27 is a flowchart that describes the algorithm governing the decision-making process of whether or not to switch from one virtual interface to another virtual interface. Specifically, the algorithm can check if the current VIF is optimal, if there is a path to the target EIP, and if TUNs are optimal to decide if it is better to use the current VIF or switch to an alternative.

Figure 28:
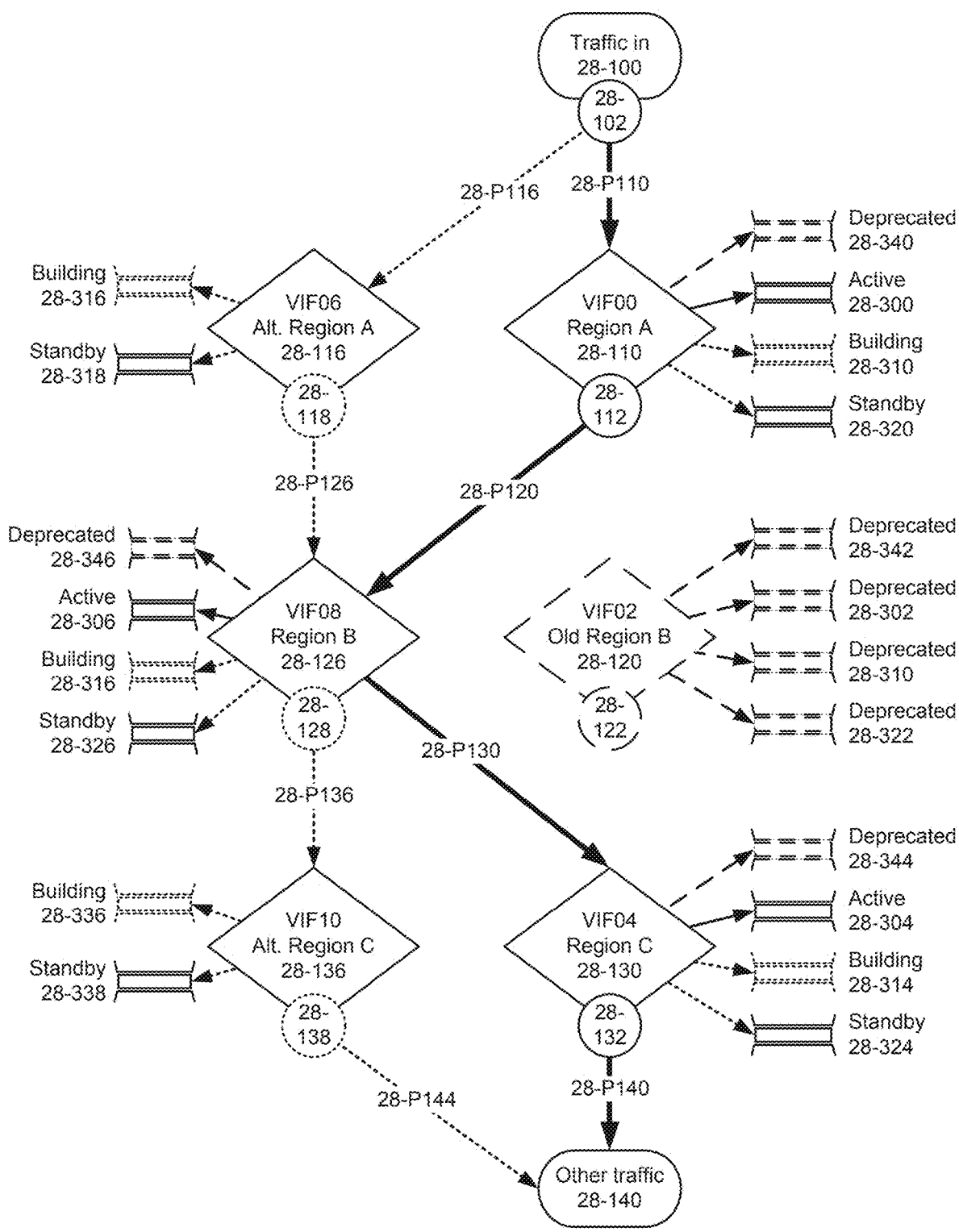
FIG. 28 illustrates the logical structure of three virtual interfaces and their various tunnels to three different regions.

FIG. 28 illustrates the logical structure of three virtual interfaces and their various tunnels to three different regions. FIG. 28 is similar to FIG. 25 and illustrates the switch from VIF02 Old Region B 28-120 to its standby VIF08 Region B 28-126.

For the VIF08 to be activated, the flow of traffic has to be routed via 28-P120 to it. And from VIF08 Region B 28-126 to VIF04 Region C 28-130 via path 28-P130.

As noted in FIG. 23 above, the switch between VIF's is an extremely fast and rare procedure 23-510. Once the decision to shift traffic is made via algorithm as described in FIG. 27, then the shift of traffic is unimpeded and fast.

Figure 29:
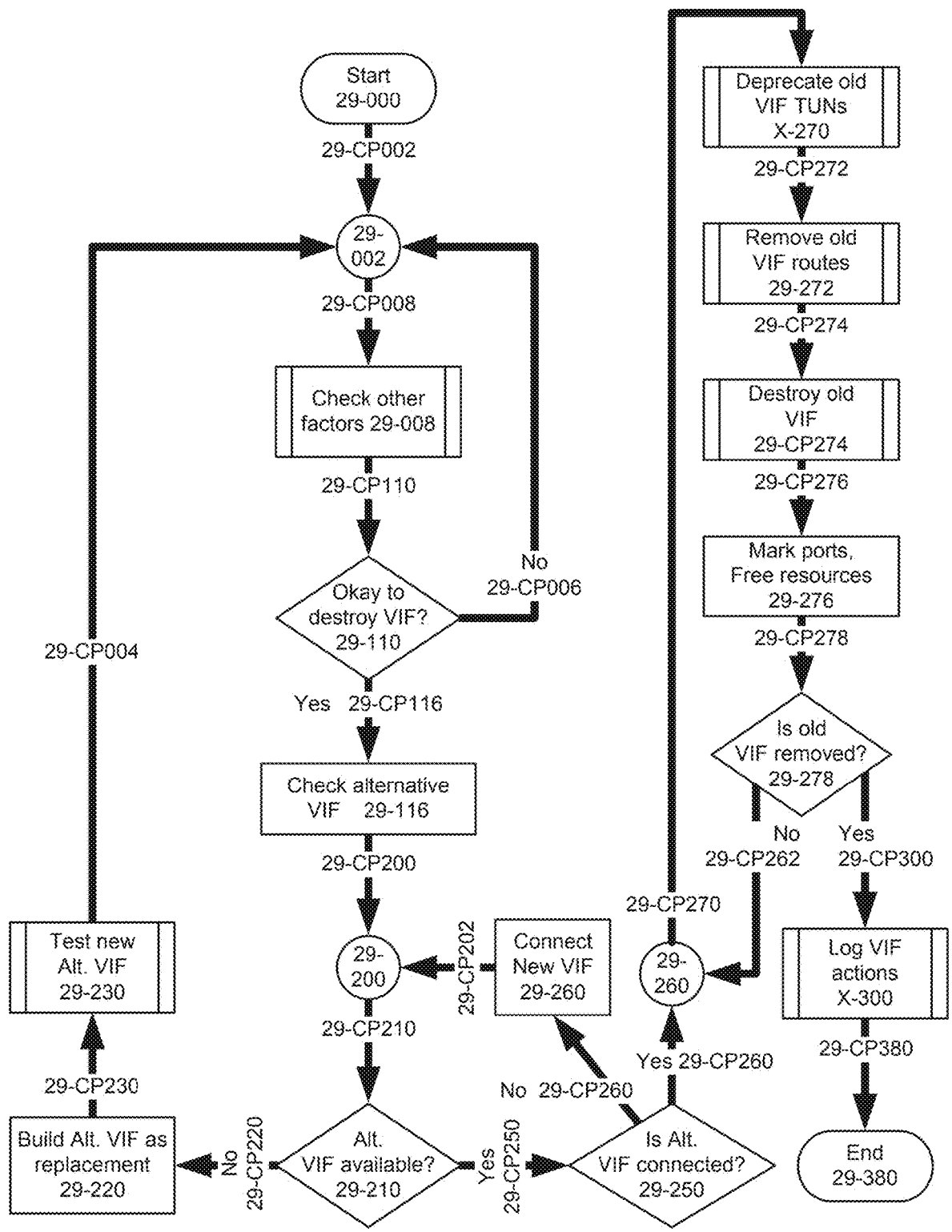
FIG. 29 is a flowchart that describes the algorithm governing the orderly destruction of a virtual interface (VIF).

FIG. 29 is a flowchart that describes the algorithm governing the orderly destruction of a virtual interface (VIF). At the beginning of this process, before any action is taken, other factors are checked at step 29-008 to ensure that the problem is with the VIF and not with some other factor. For example, if base internet connectivity goes down and can't push traffic, there is very little point in destroying a virtual interface and rebuilding the VIF because without a base internet connection, the VIF will not be able to send or receive traffic.

It also ensures that an alternative VIF is available 29-116 and that this alternative VIF is available 29-210, connected 29-250 and if so via path 29-CP260, then the process of destroying the VIF begins at 29-260. A final check is made to ensure that the VIF has actually been removed 29-278.

If an alternative VIF is not available 29-210, the logic flows via path 29-CP220 to a process to build 29-220 and to test the new VIF 29-230.

Figure 30:
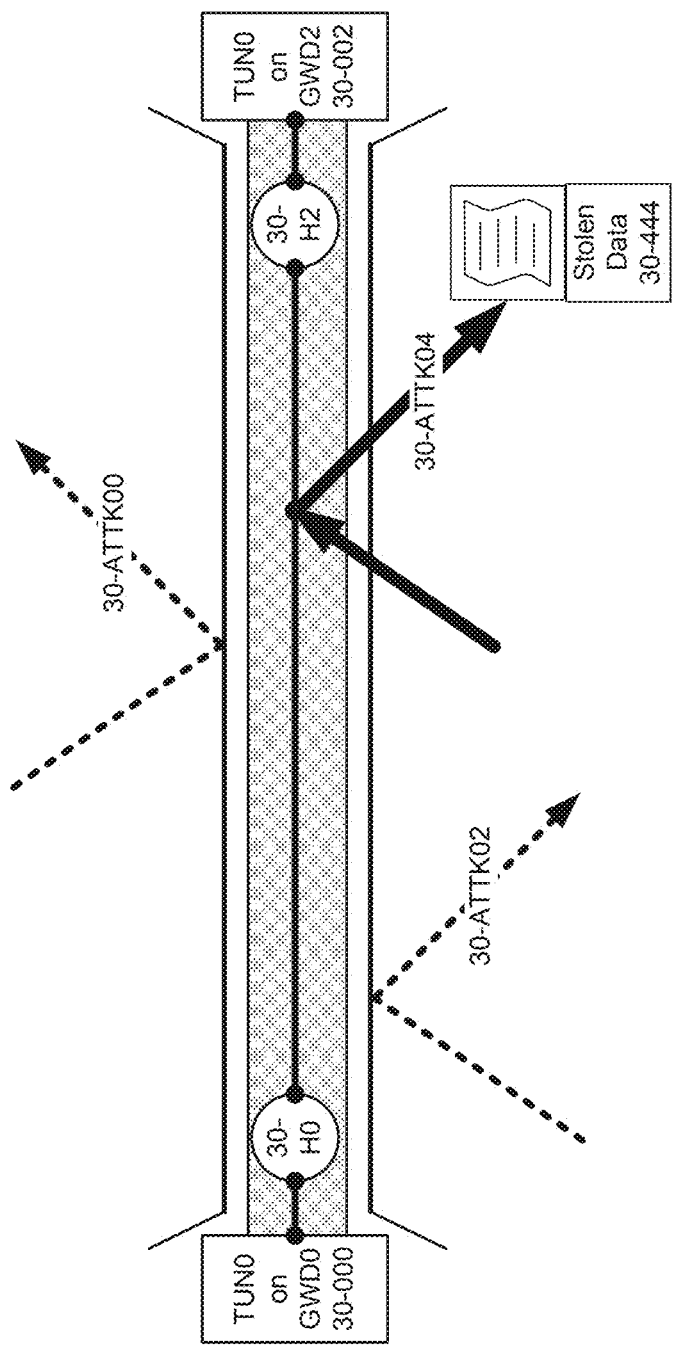
FIG. 30 illustrates how an encrypted tunnel protects data.

FIG. 30 illustrates how an encrypted tunnel protects data. TUN0 on GWD0 30-000 to GWD2 30-002 encrypts packets on GWD0 30-000 and decrypts them on GWD2 30-002. And for traffic in the other direction, packets are encrypted on GWD2 30-002 and decrypted on GWD0 30-000. If packets are intercepted in the middle, the encryption renders the payload of the tunnel packet as unreadable as illustrated by 30-ATTK00 and 30-ATTK02. However, if the packets are intercepted and their encryption is broken, then there is a risk that Stolen Data 30-444 is readable and able to be stolen.

Figure 31:
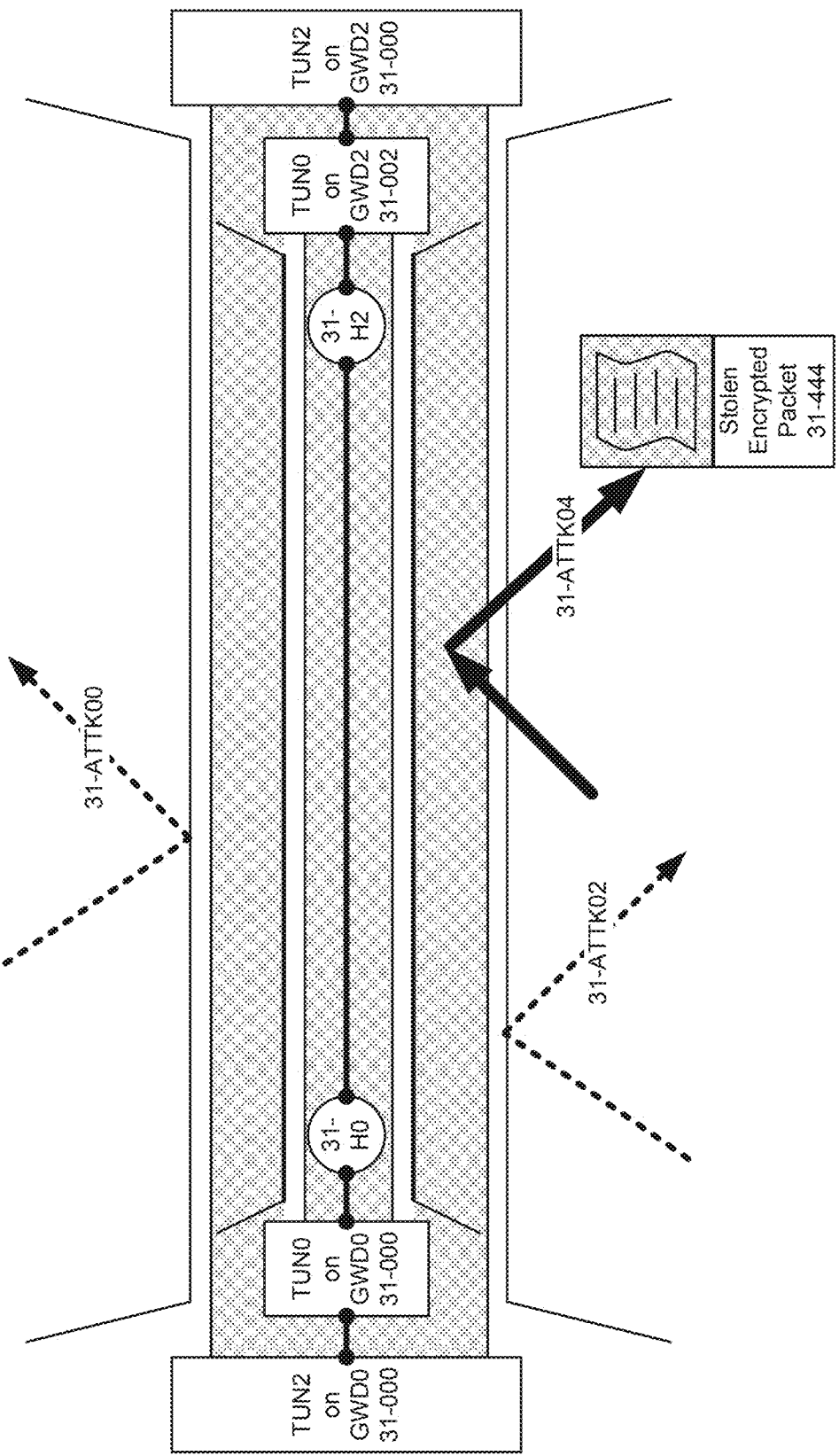
FIG. 31 illustrates the security afforded by one tunnel wrapped in another tunnel.

FIG. 31 illustrates the security afforded by one tunnel TUN0 wrapped in another tunnel TUN2. The differentiating factor between this figure and FIG. 30 is that all three attempts at data packet interception 31-ATTK00, 31-ATTK02, and 31-ATTK04 result in failure. Even though attempt 31-ATTK04 in this figure is a successful breach of the outer tunnel, the payload it steals is still encrypted 31-444.

Figure 32:
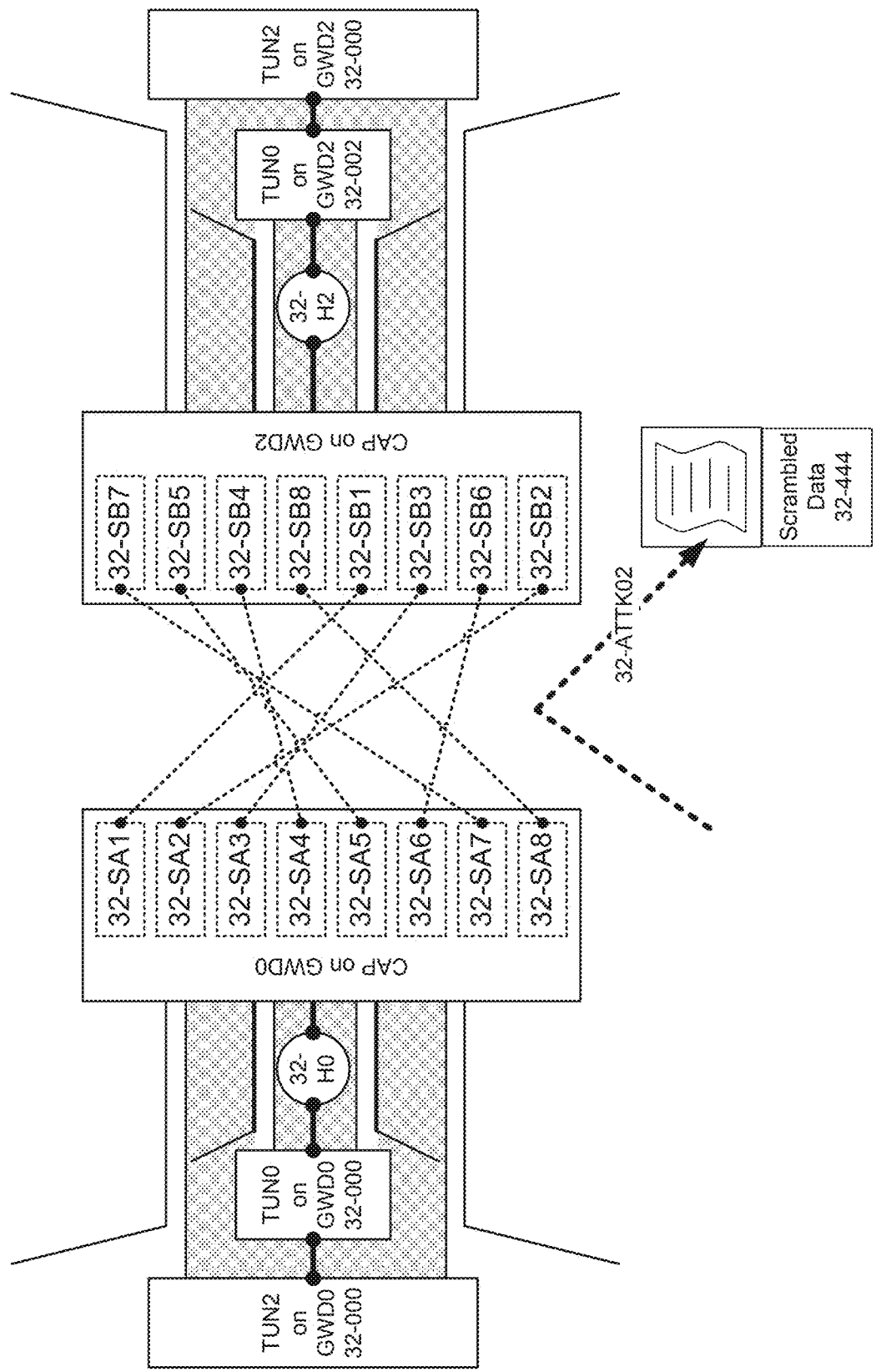
FIG. 32 illustrates wrapped and capped tunnel.

FIG. 32 illustrates wrapped and capped tunnel. In the logical network path, the CAP is closest to the NIC. The CAP scrambles and unscrambles payloads at the bits-per-byte level.

In this example, 32-ATTK02 results in the interception of Scrambled Data 32-444. The scrambler for the CAP can be based on exclusive disjunction using rotating keys and other logic to scramble the data payloads.

Figure 33:
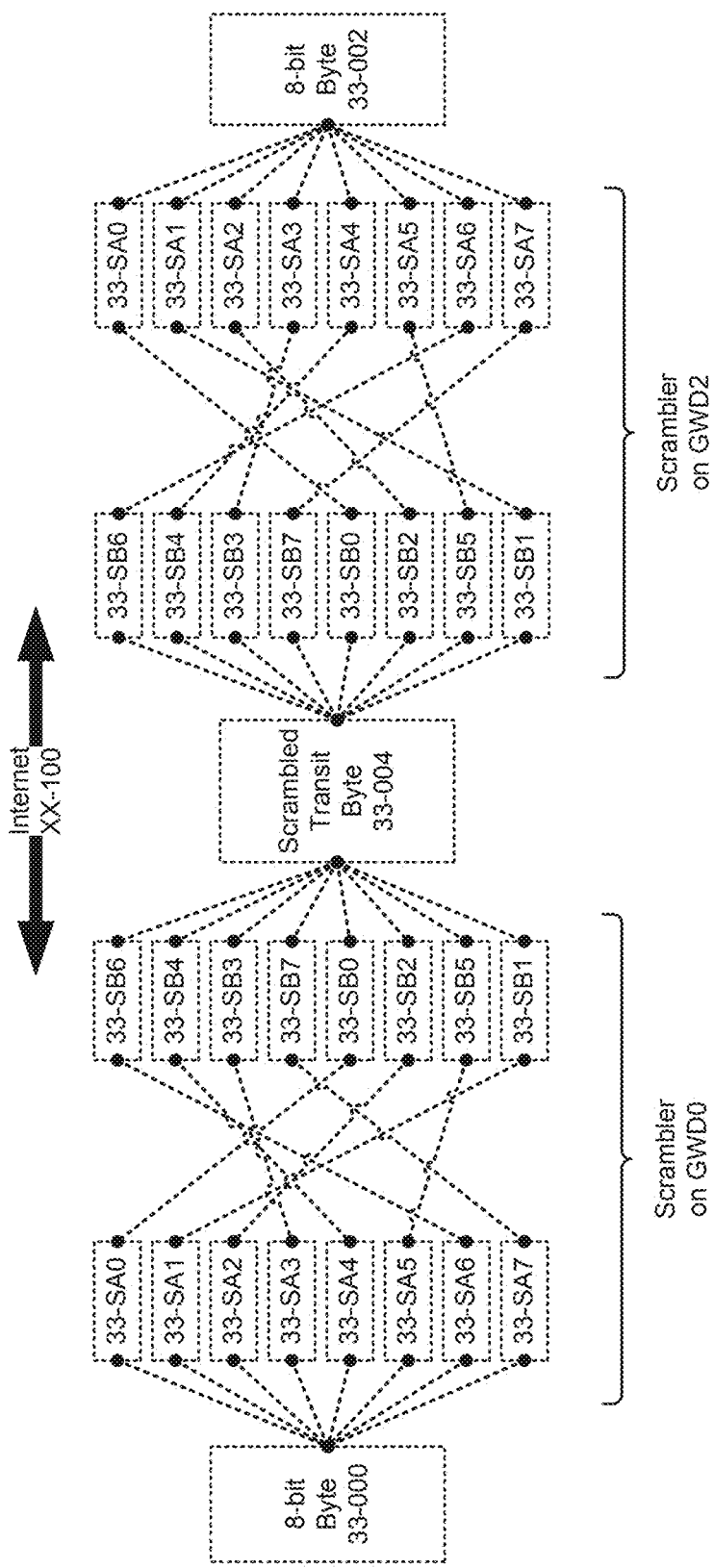
FIG. 33 illustrates an 8-bit byte scrambler on two gateway devices.

FIG. 33 illustrates an 8-bit byte scrambler on two gateway devices GWD0 and GWD2. It shows how traffic's payload bits are scrambled and descrambled per byte. The scrambling is dynamic and random protecting the Scrambled Transit Byte 33-004.

Figure 34:
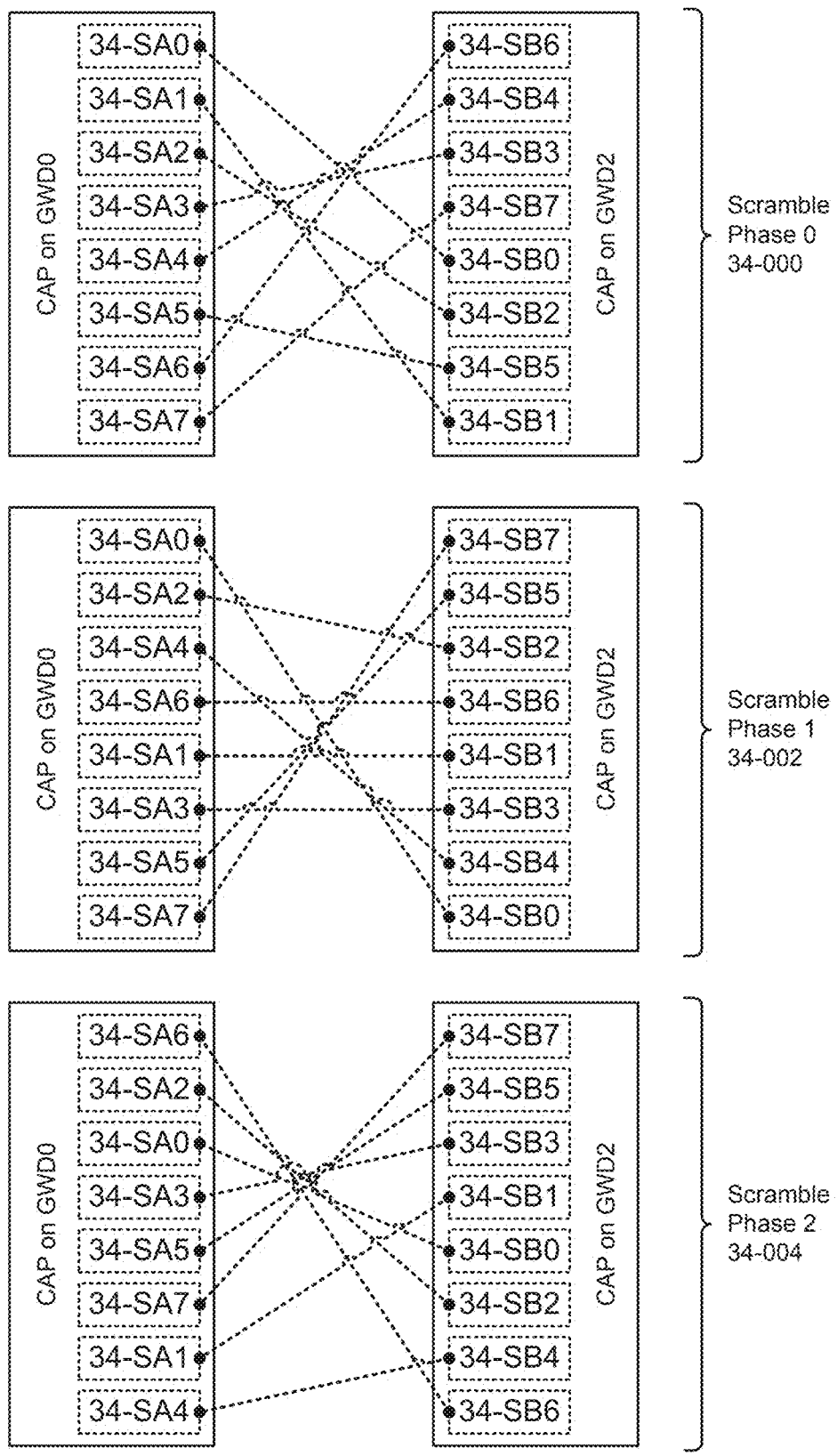
FIG. 34 illustrates three different scramble phases for bit-scrambled bytes of a CAP.

FIG. 34 illustrates three different scramble phases for bit-scrambled bytes of a CAP. While there are only 256 potential combinations of scrambled bits for an 8-bit system, a rotating key based on time or ticks or other factors offer more protection.

Figure 35:
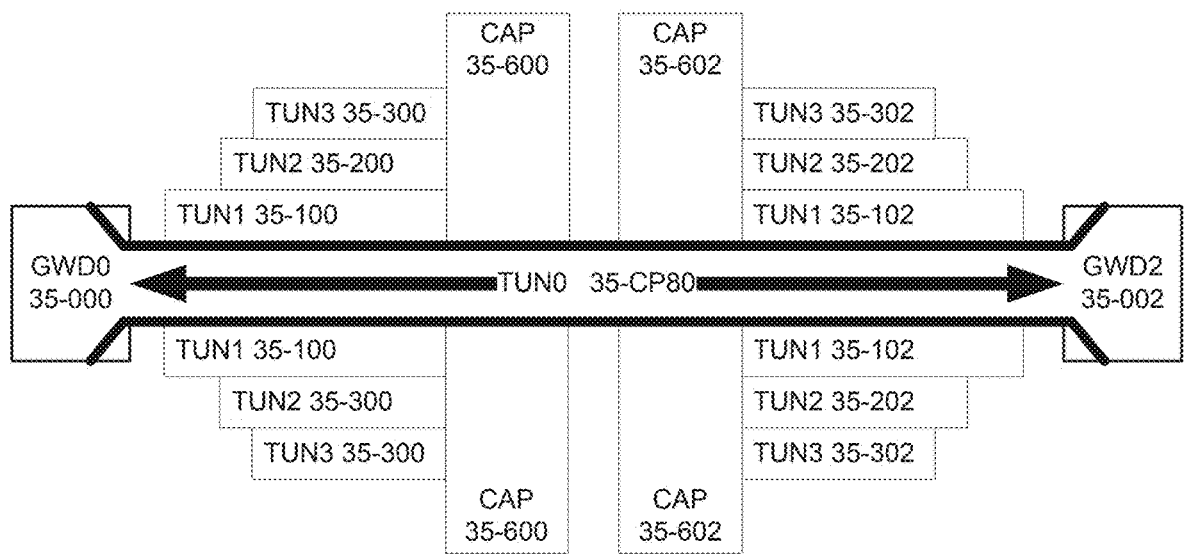
FIG. 35 illustrates an internal tunnel through a series of wrappings and then a CAP.

FIG. 35 illustrates an internal tunnel through a series of wrappings and then a CAP. The local flow from GWD0 35-000 enters the first tunnel TUN1 35-100, then into TUN2 35-200, and on into TUN3 35-300, and then scrambled by CAP 35-600. When traffic enters GWD2 35-002 it flows into CAP 35-602 to be descrambled, then from TUN3 35-302 out to TUN2 35-202 out to TUN1 35-102 and then to 35-002.

This figure also describes packet bloat due to the extra layers of security which has the effect of reducing the payload's carry size.

Figure 36:
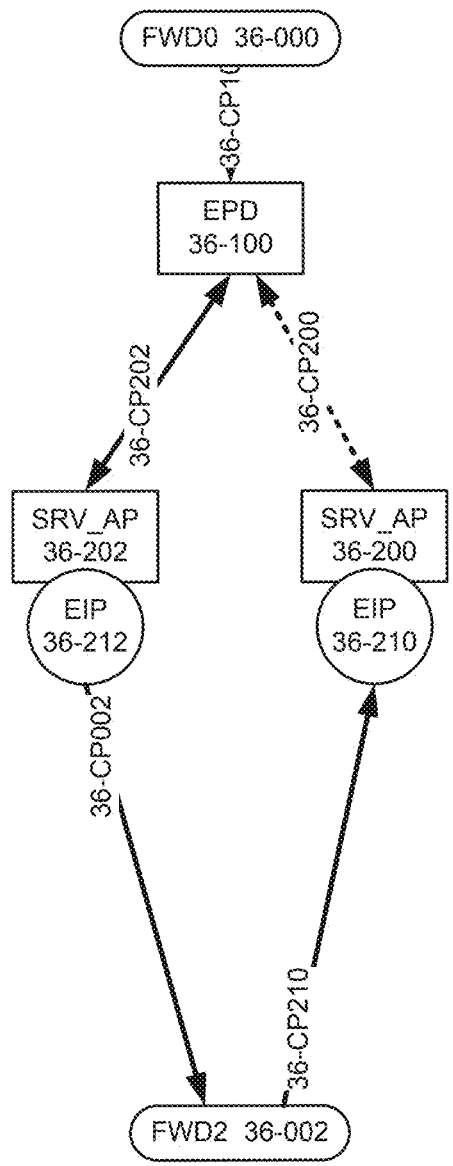
FIG. 36 illustrates firewall-to-firewall tunnel traffic during a tunnel failover.

FIG. 36 illustrates firewall-to-firewall tunnel traffic during a tunnel failover. Firewall-to-firewall tunnel traffic through end point device (EPD) 36-100 can flow through one tunnel 36-CP202 to an access point server (SRV_AP) 36-202 or from the EPD to SRV_AP 36-200 via tunnel 36-CP200 to device FWD2 36-002. The active tunnel was 36-CP200 but it went down in the midst of pushing traffic with failover shifting traffic to TUN 36-CP202. Traffic from SRV_AP 36-200 egressed via egress ingress point EIP 36-210 to path 36-CP210. Traffic from SRV_AP 36-202 egresses via EIP 36-212 to FWD2 36-002 via path 36-CP002. However, although the EPD knows how to route traffic to the new SRV_AP and the FWD2 36-002 receives traffic it may still try to send it to path 36-CP210. This can cause the internal tunnel from FWD0 to FWD2 to be broken.

Figure 37:
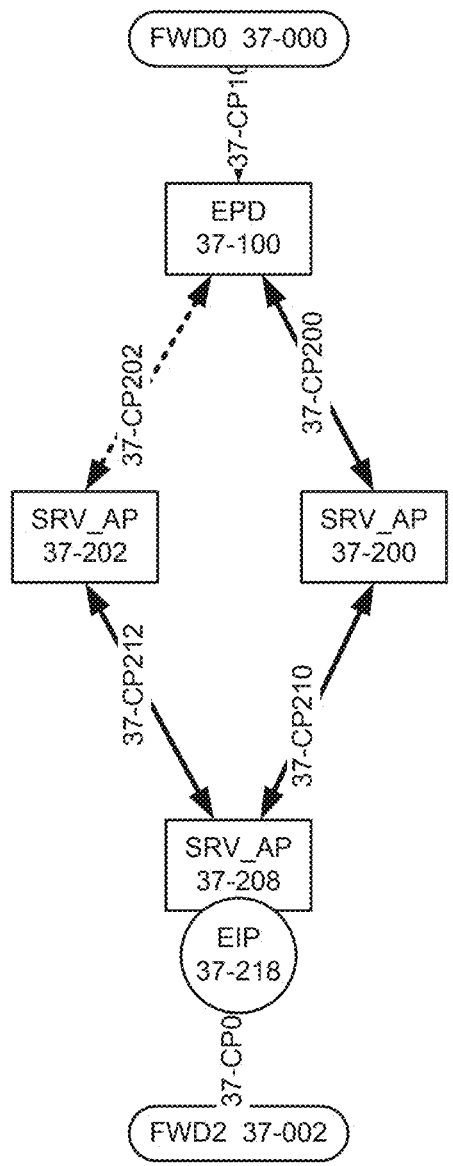
FIG. 37 illustrates firewall-to-firewall tunnel traffic during a tunnel failover.

FIG. 37 illustrates firewall-to-firewall tunnel traffic during a tunnel failover. FIG. 37 is similar to FIG. 36, with the addition of a structure to keep the routing between devices intact even after internal tunnel shifts to different network paths. EPD 37-100 allows for dynamic switch from one TUN 37-CP200 to another 37-CP202. When traffic egresses via EIP 37-218, the FWD2 37-002 can find the EPD regardless of which internal tunnel pathway is utilized.

Figure 38:
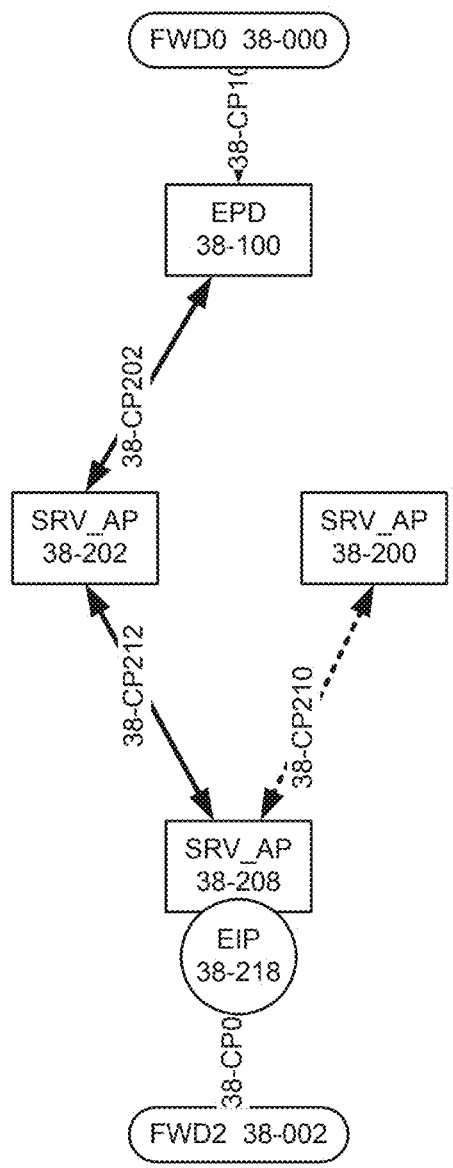
FIG. 38 illustrates firewall-to-firewall tunnel traffic during a tunnel failover.

FIG. 38 illustrates firewall-to-firewall tunnel traffic during a tunnel failover. FIG. 38 illustrates the uninterrupted traffic flowing after the shift from the old TUN 38-CP200 (not shown) to 38-CP202. This is attributable to the fact that the FWD2 38-002 is able to find the return path back as the IP address it knows for the EIP 38-218 on SRV_AP 38-208 remains the same regardless of a shift of internal traffic routing.

Figure 39:
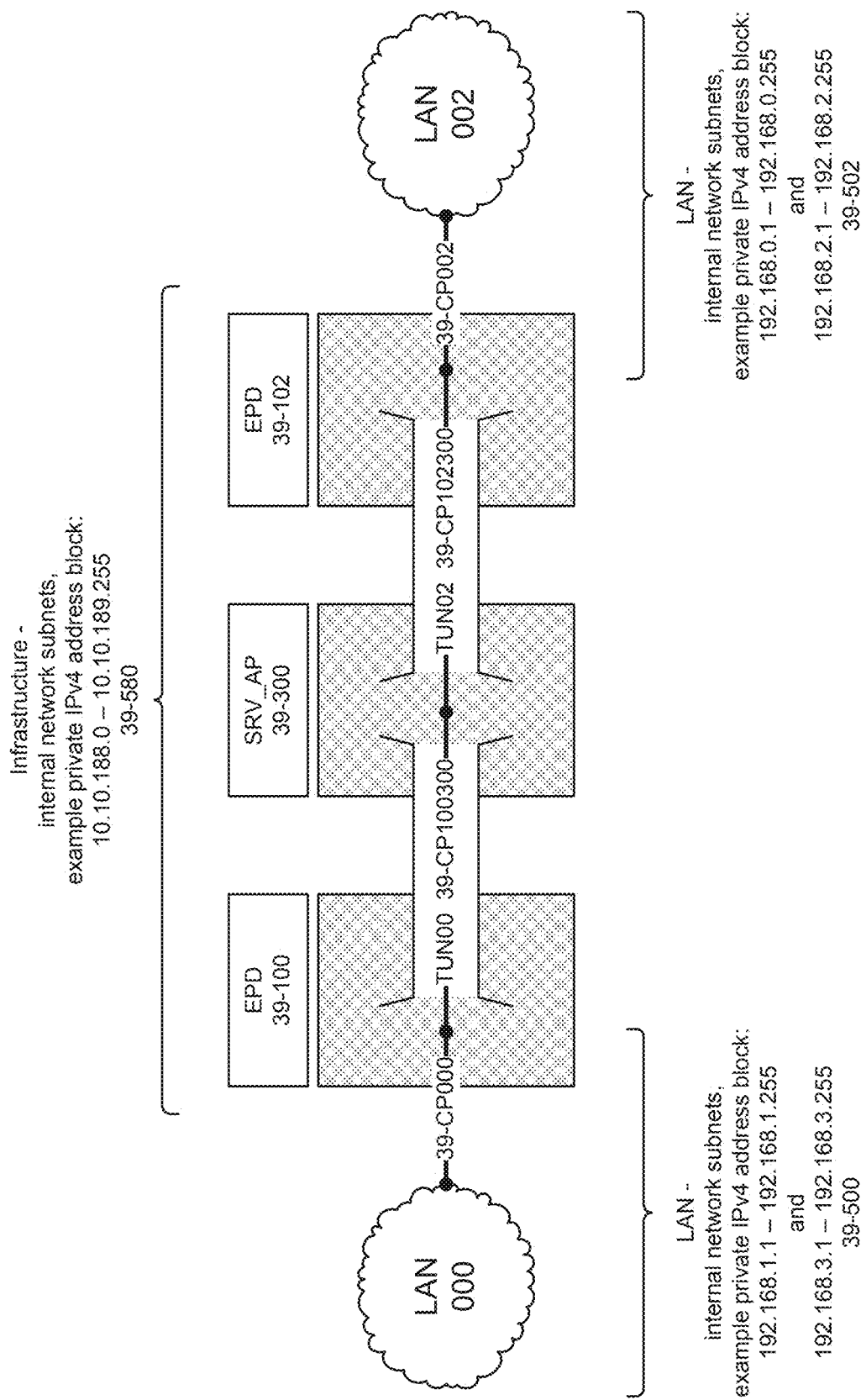
FIG. 39 illustrates the linking of two or more local area networks (LANs) into a wide area network (WAN).

FIG. 39 illustrates the linking of two or more local area networks (LANs) LAN 000 LAN 002 into a wide area network (WAN). Unique subnets are required to avoid conflicts. Automation and device to device communication enable dynamically mapped networks and can prevent IP conflicts due to overlapping subnet ranges.

This mechanism can be used both to calculate IP addresses, IP address range assignments and other factors which can be used either by automated systems, or can be the basis of messaging to network administrators for them to make manual configuration or to take other actions.

Figure 40:
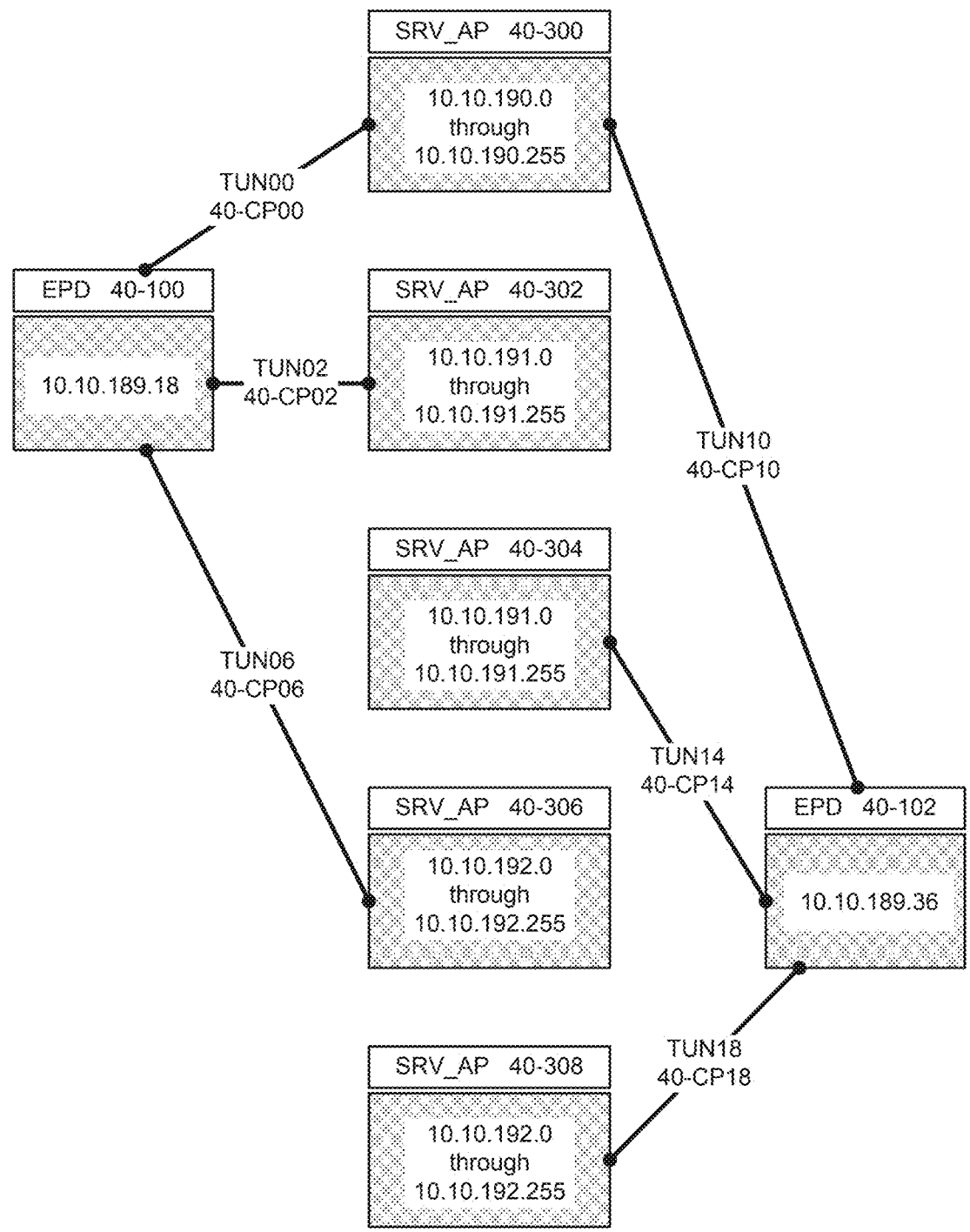
FIG. 40 illustrates the importance of a server availability list and how IP addresses and ranges are assigned for various devices.

FIG. 40 illustrates the importance of a server availability list and how IP addresses and ranges are assigned for various devices. Although IPv6 offers a huge range of possible IP addresses, the IPV4 standard has a finite amount of both public and private IP addresses. This has an influence on which EPDs can connect with which SRV_APs.

In this figure, EPD 40-100 builds tunnels with SRV_APs 40-300, 40-302 and 40-306. EPD 40-102 builds tunnels with SRV_APs 40-300, 40-304, and 40-308.

This example demonstrates how the internal IP range 10.10.191.0 through 10.10.191.255 can be used on two SRV_APs 40-302 and 40-304, and IP range 10.10.192.0 through 10.10.192.255 can be used on both SRV_AP 40-306 and 40-308.

Therefore, for example, 10.10.191.18 can but used by EPD 40-100 to build a tunnel to SVR_AP 40-302 and at the same time 10.10.191.18 can also be used by EPD 40-102 to connect with SRV_AP 40-304.

EPD 40-100 and EPD 40-102 do not have to directly interact with each other to avoid conflicts because the server availability list published for each EPD in coordination with the TUN manager will assign IP address (internal and external) combinations for EPDs to connect with SRV_APs without any conflicts.

Figure 41:
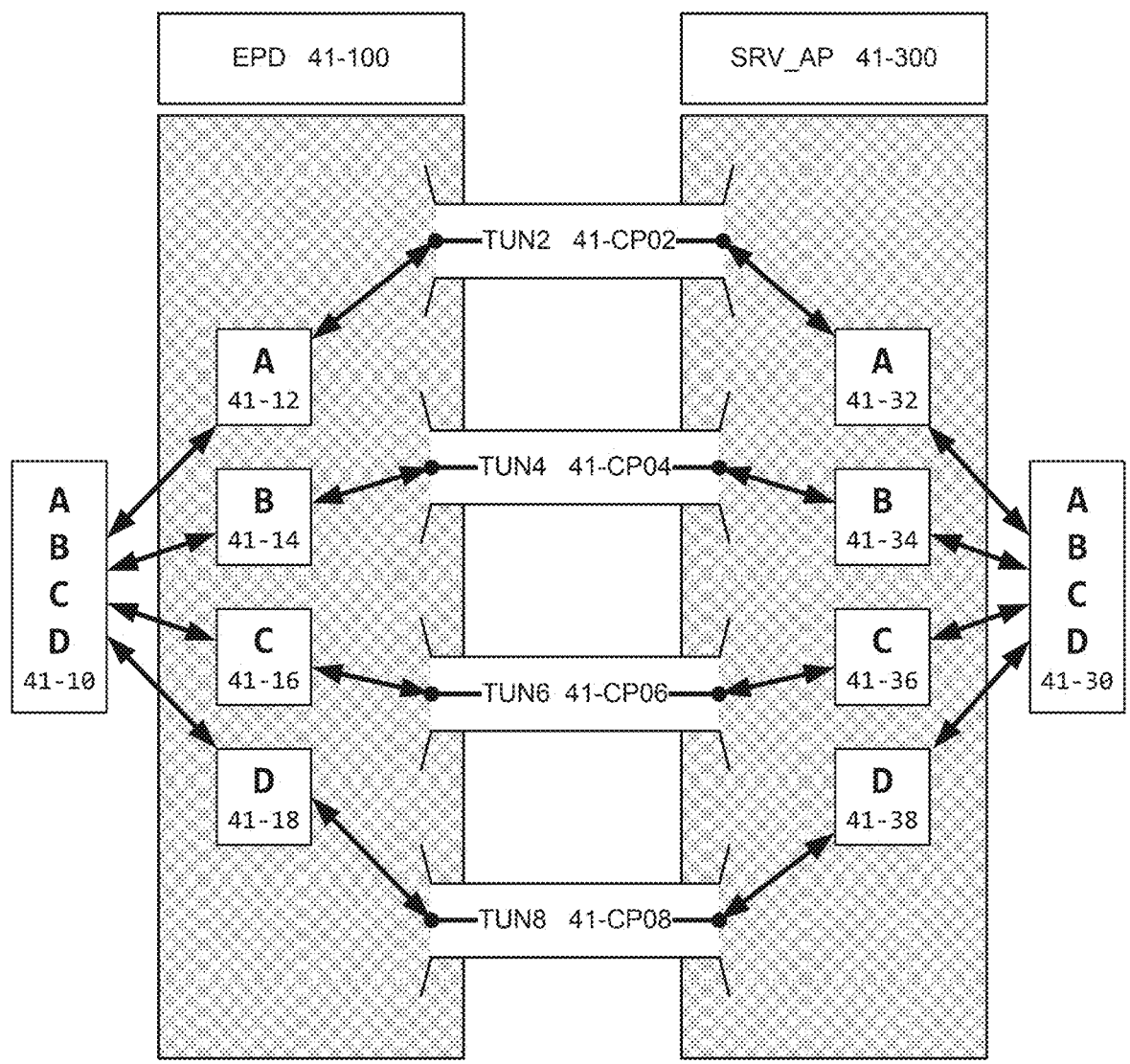
FIG. 41 illustrates multiple parallel unique streams between devices.

FIG. 41 illustrates multiple parallel unique streams between devices. This example shows multiple parallel unique streams down four tunnels used to concurrently send data between an EPD 41-100 and an SRV_AP 41-300. Streams A, B, C, and D are sent separately and recombined on the other end. This multi-streaming is effective and efficient assuming that the base connectivity is of good quality. A, B, C, and D are presented as an example. The actual number of parallel streams can be dynamic based on the carrying capacity of the line. This has a dependency on a clean line.

Figure 42:
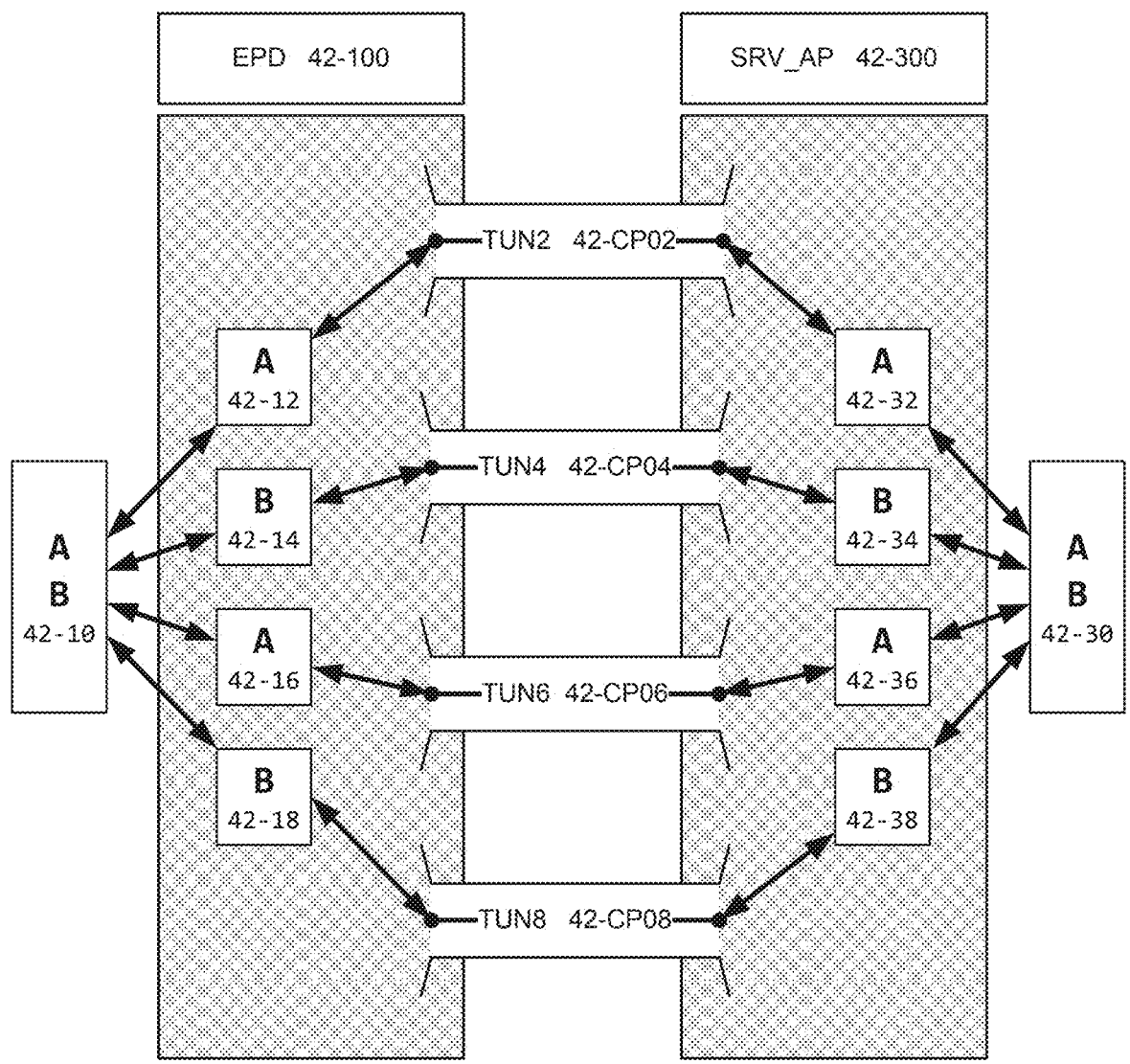
FIG. 42 illustrates multiple parallel non-unique streams between devices.

FIG. 42 illustrates multiple parallel non-unique streams between devices. This example shows two separate duplicate streams so that two A's and two B's are transmitted concurrently. If one or the other A packet is lost and does not arrive, the other is still received. This is a key feature of stormy weather mode to keep data flowing during times of packet loss.

Sending parallel streams consumes more traffic and bandwidth. However, during periods of unstable network connectivity, the traffic still gets through due to the redundancy. So, in the event that a user has a 20 Mbps last mile connection, if there is a high amount of packet loss on a single stream the user experience (UX) may be less than ideal due to timeouts, broken video streams, and other undesirable effects.

If a stream is duplicated, the effective size of the last mile pipe is reduced to 10 Mbps or less, however the data will get through improving UX. As an extension of this, for example if duplication of a stream is quadrupled, the bandwidth reduction is decreased fourfold. So, a 20 Mbps condition could be reduced to 5 Mbps or less, however, the link will continue to perform.

Figure 43:
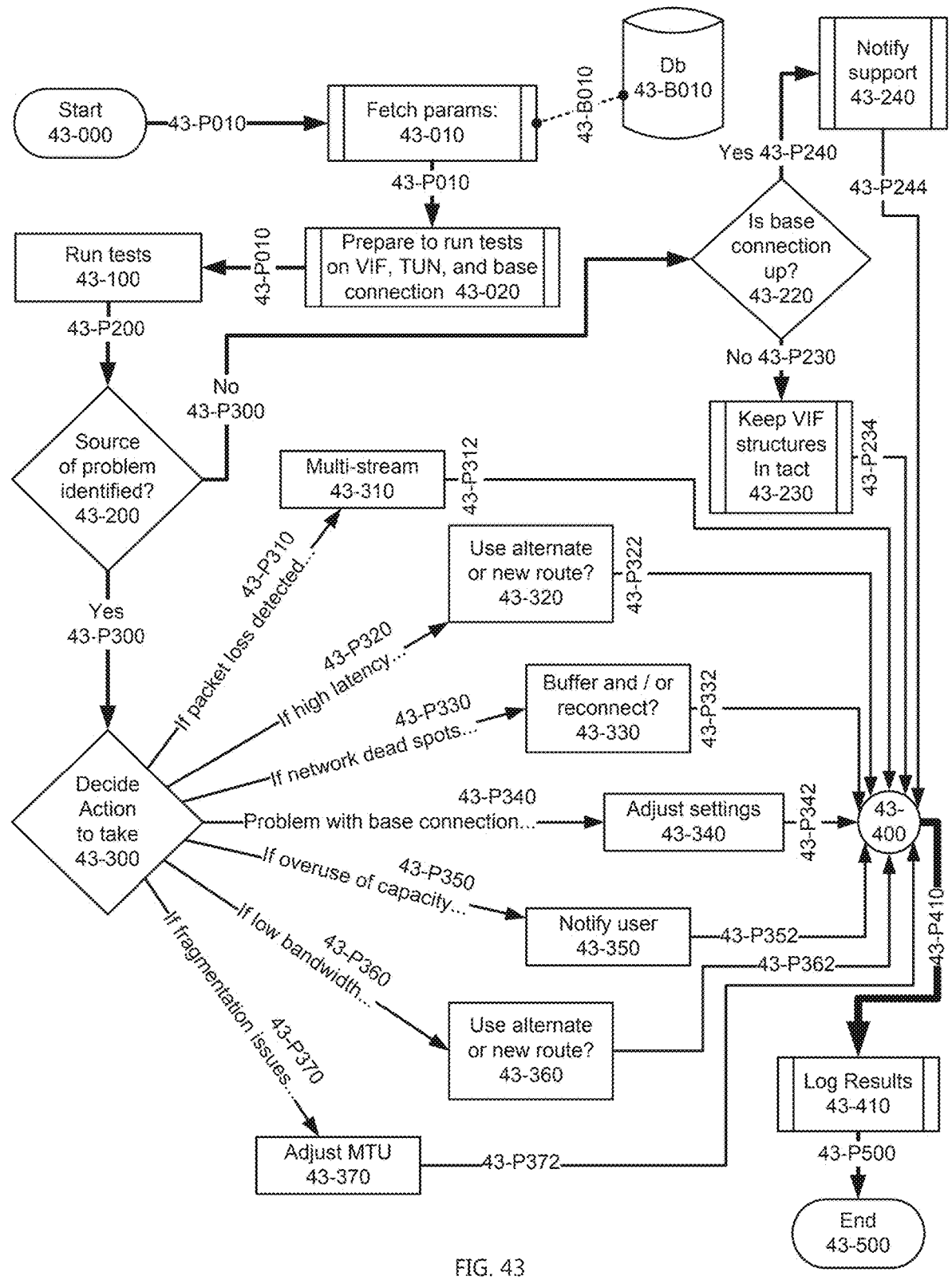
FIG. 43 illustrates the logical framework and algorithmic structure for stormy weather mode (SWM)

FIG. 43 illustrates the logical framework and algorithmic structure for stormy weather mode (SWM). The step fetch params 43-010 sets up the analysis based on the attributes of the base connection and other factors. When dealing with packet loss 43-310, duplicate streams can be utilized to avoid loss and the need for subsequent retransmission.

If during periods of micro-outages 43-P330, the SWM can recognize the situation, and keep the VIFs and TUNs up. Traffic may be buffered, connectivity kept alive, and when the outage is over, an orderly catch up with the stream by gently releasing content from the buffer.

The key to stormy weather mode taking action is to correctly understand the conditions and to take appropriate remedial actions.

Figure 44:
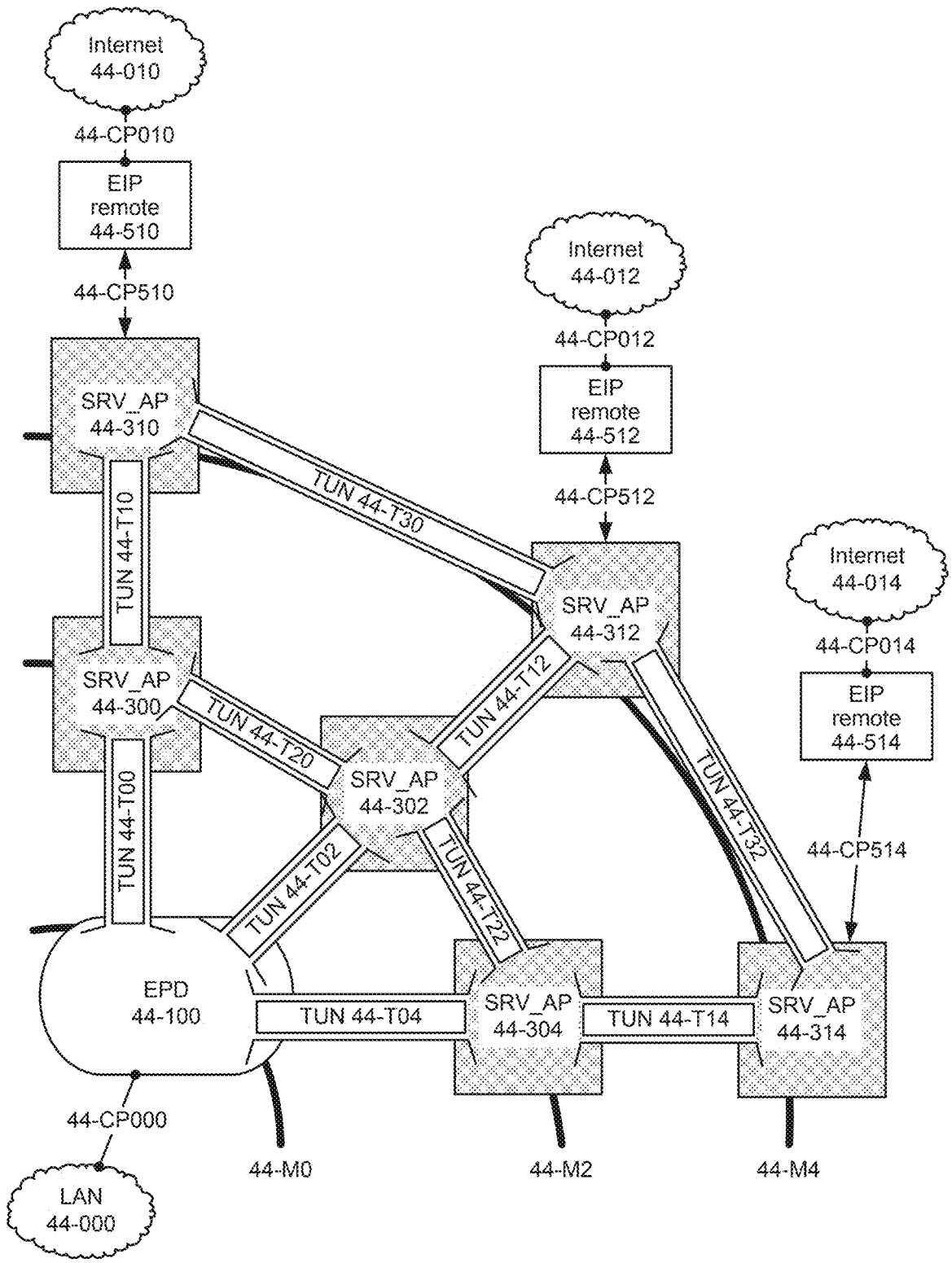
FIG. 44 illustrates multiple tunnels between devices within a global virtual network (GVN) across multiple regions.

FIG. 44 illustrates multiple tunnels between devices within a global virtual network (GVN) across multiple regions. The EPD is in one location 44-M0. SRV_APs in region 44-M2 include SRV_AP 44-300, SRV_AP 44-302, and SRV_AP 44-304. SRV_APs in region 44-M3 SRV_AP 44-310, SRV_AP 44-312, and SRV_AP 44-314. Advanced smart routing (ASR) is used to manage routing over the multiple tunnels and paths between the EPD and the various SRV_AP devices. ASR can mitigate the risk of looping, wrong geographic destination routing, ASR remote redirect backtrack, broken links between SRV_APs, regions, and other problems.

Figure 45:
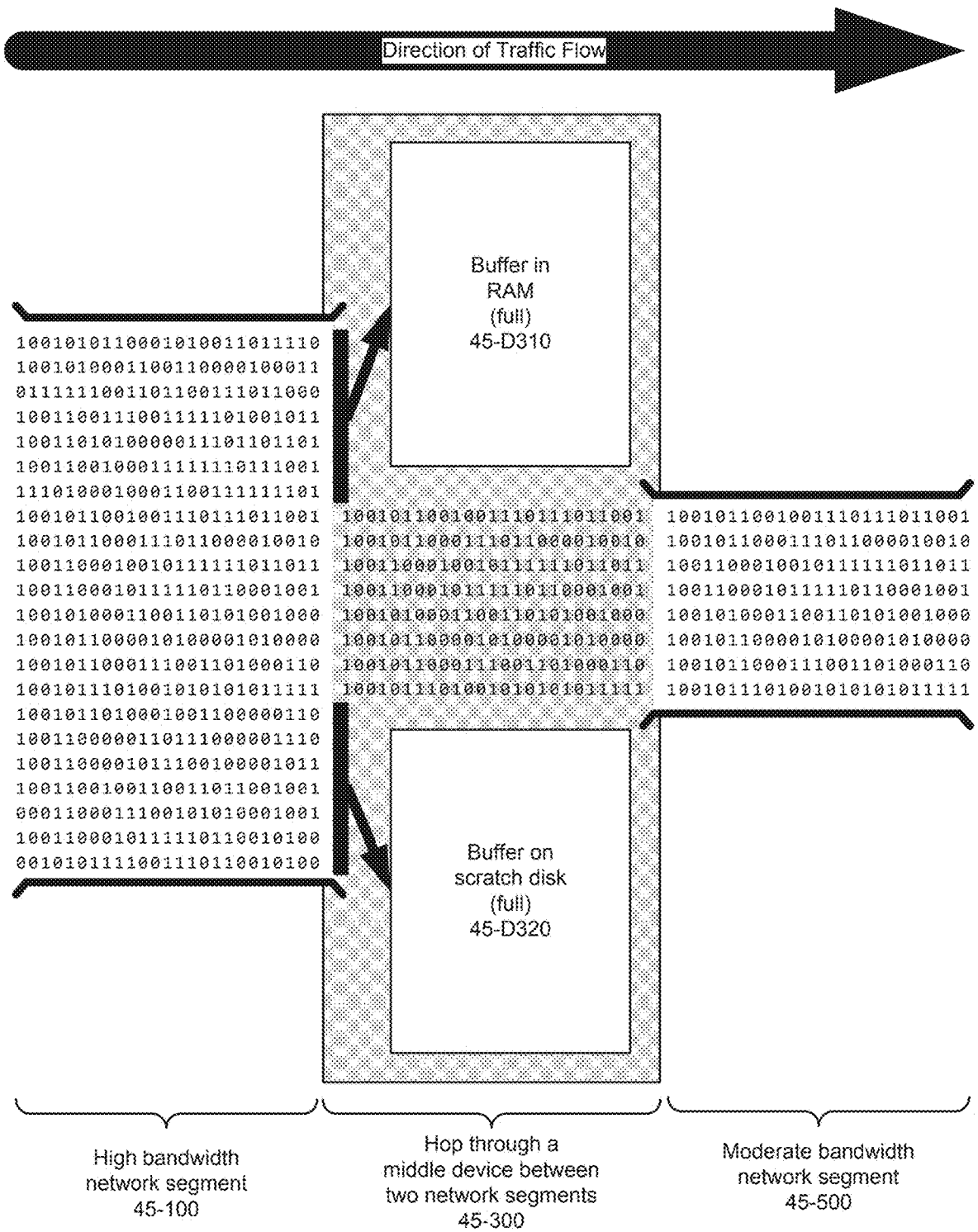
FIG. 45 illustrates potential problems with bottlenecks through a hop between two network segments.

FIG. 45 illustrates potential problems with bottlenecks through a hop between two network segments. During the serving of a file from a server to a client, certain algorithms govern the bandwidth of the transfer based on the end-to-end line carrying capacity. Should the burst of traffic be too high, the server throttles back on the bandwidth to enable the most efficient transfer mitigating loss due to congestion. This may result in the server being a good and responsible citizen with respect to pipe use but this can also result in an overly aggressive governing of bandwidth significantly slowing the transfer well below the actual end-to-end line carrying capacity. When a server begins to serve a stream of data or a file, it will blast many packets per second based on what it assumes to be the high bandwidth of a network segment 45-100. The server is connected to this large pipe network segment.

If the data stream is constricted at 45-300, it forces the server to aggressively throttle down the stream slowing transfer, and due to the need to retransmit the lost packets, the server may reduce rate of transfer overly aggressively slowing down the total process.

Figure 46:
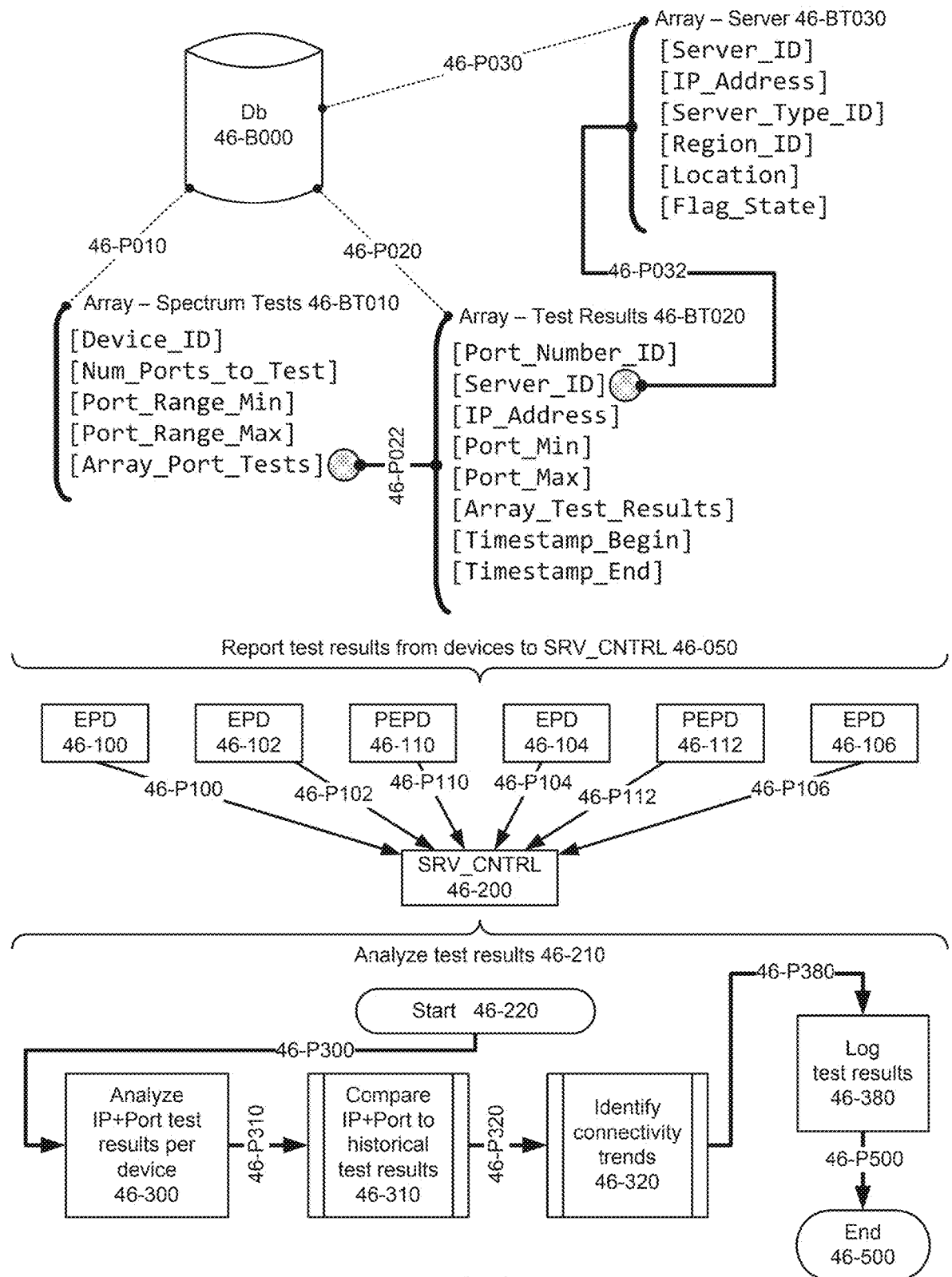
FIG. 46 illustrates the organizing and reporting of information on the SRV_CNTRL.

FIG. 46 illustrates the organizing and reporting of information on the SRV_CNTRL. This information includes an analysis of ports per IP address to each SRV_AP, the quality of service (QoS) and rates each port over time. This information can be used to compare group of ports to each other and to identify patterns over time and in intersecting series/sets.

Figure 47:
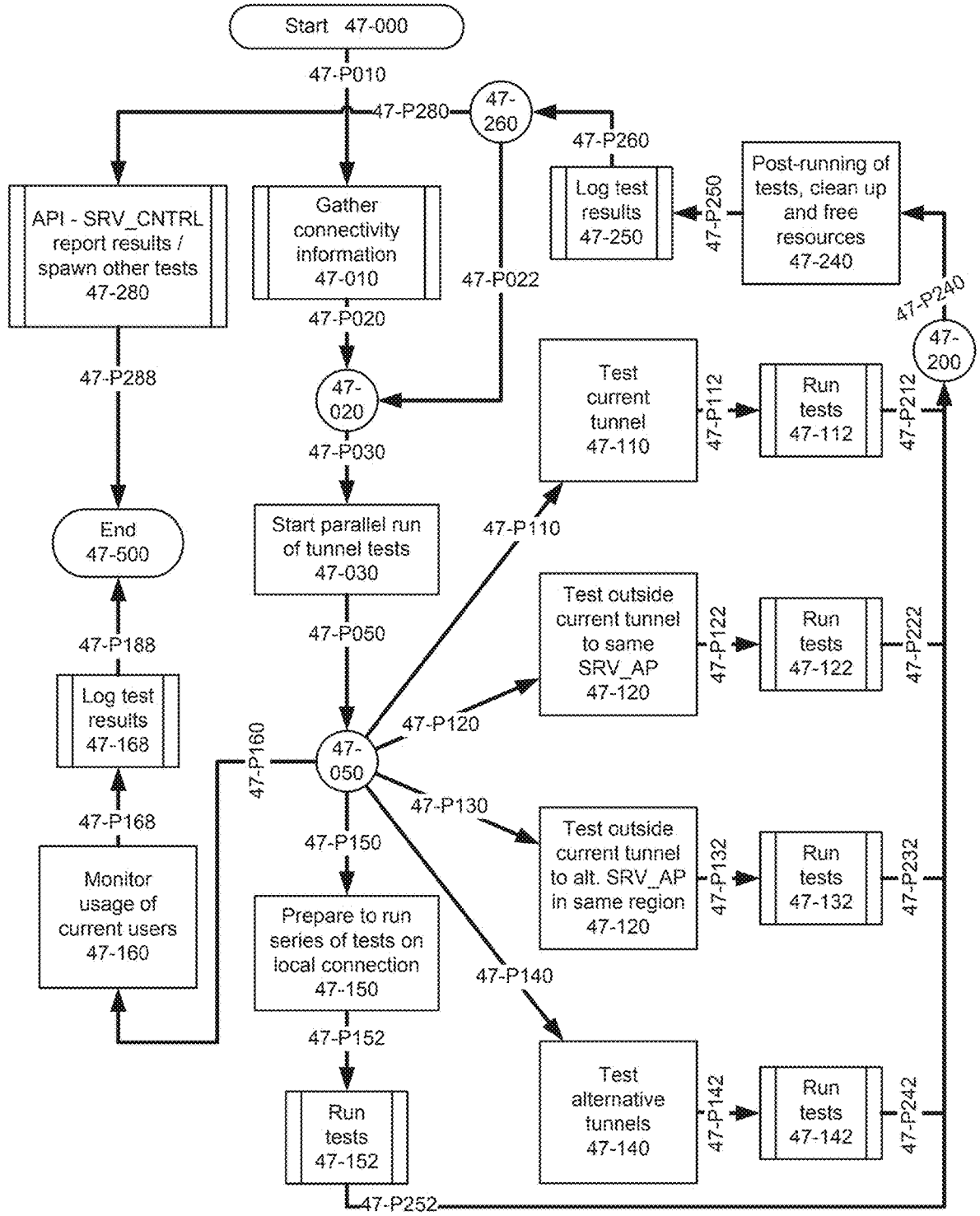
FIG. 47 is a flowchart that describes the logic used for tunnel tests.

FIG. 47 is a flowchart that describes the logic used for tunnel tests. There are tests done on the current tunnel 47-110, tests done on the base connection outside the tunnel 47-120, tests outside tunnel to an alternative SRV_AP 47-120, and tests run on TUNs to alternative SRV_APs in the same region 47-140. By comparing the tests to each other, comparisons of QoS between base connection and tunnel, alternative tunnel, and more can be ascertained.

Figure 48:
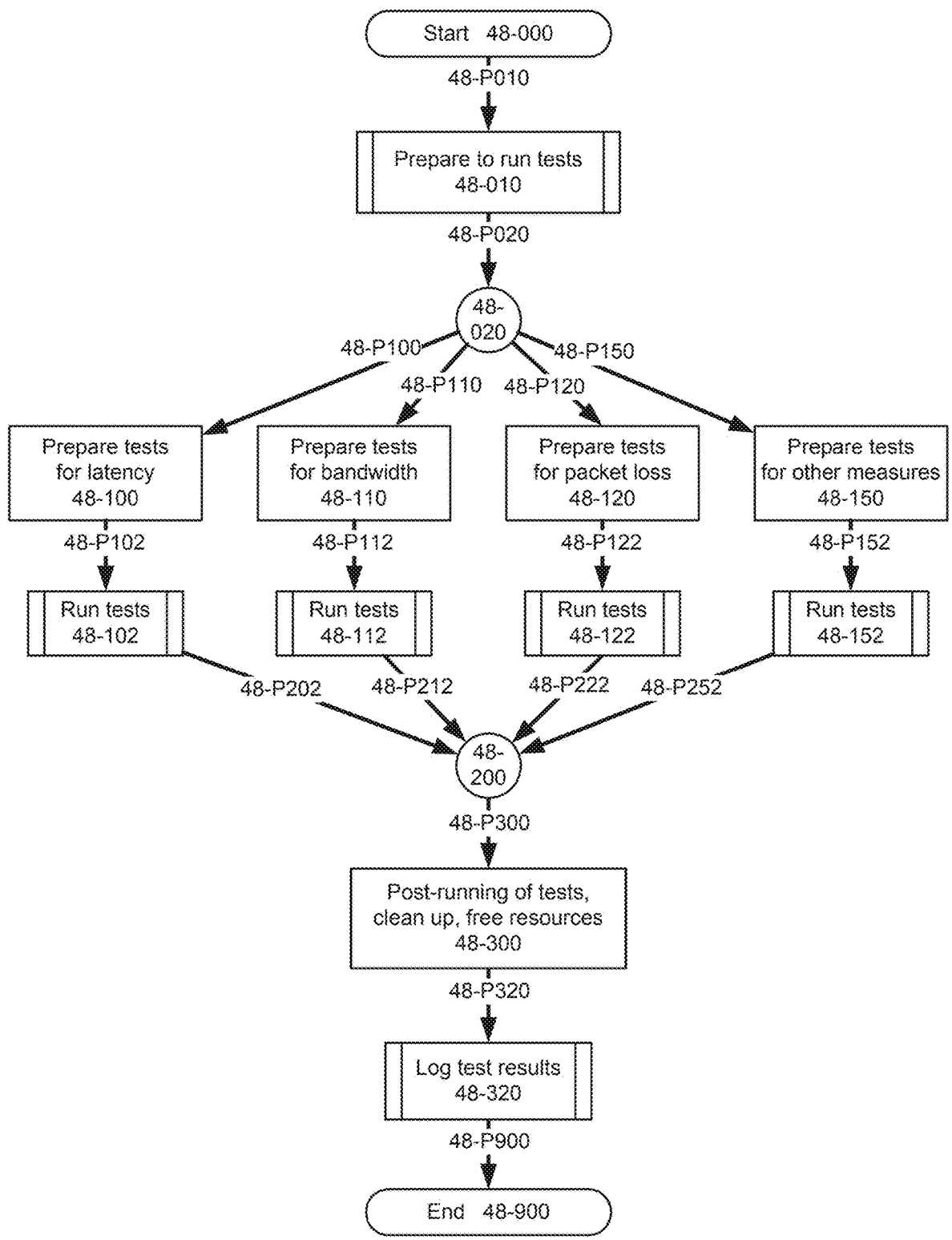
FIG. 48 illustrates the running of parallel tunnel tests to measure latency, bandwidth, packet loss, and other factors.

FIG. 48 illustrates the running of parallel tunnel tests to measure latency 48-100, bandwidth 48-110, packet loss 48-120, and other factors 48-150.

After testing, other processes are run at post-running of tests to clean up, and free resources 48-300. At the end of testing, log test results 48-320 saves pertinent information.

Figure 49:
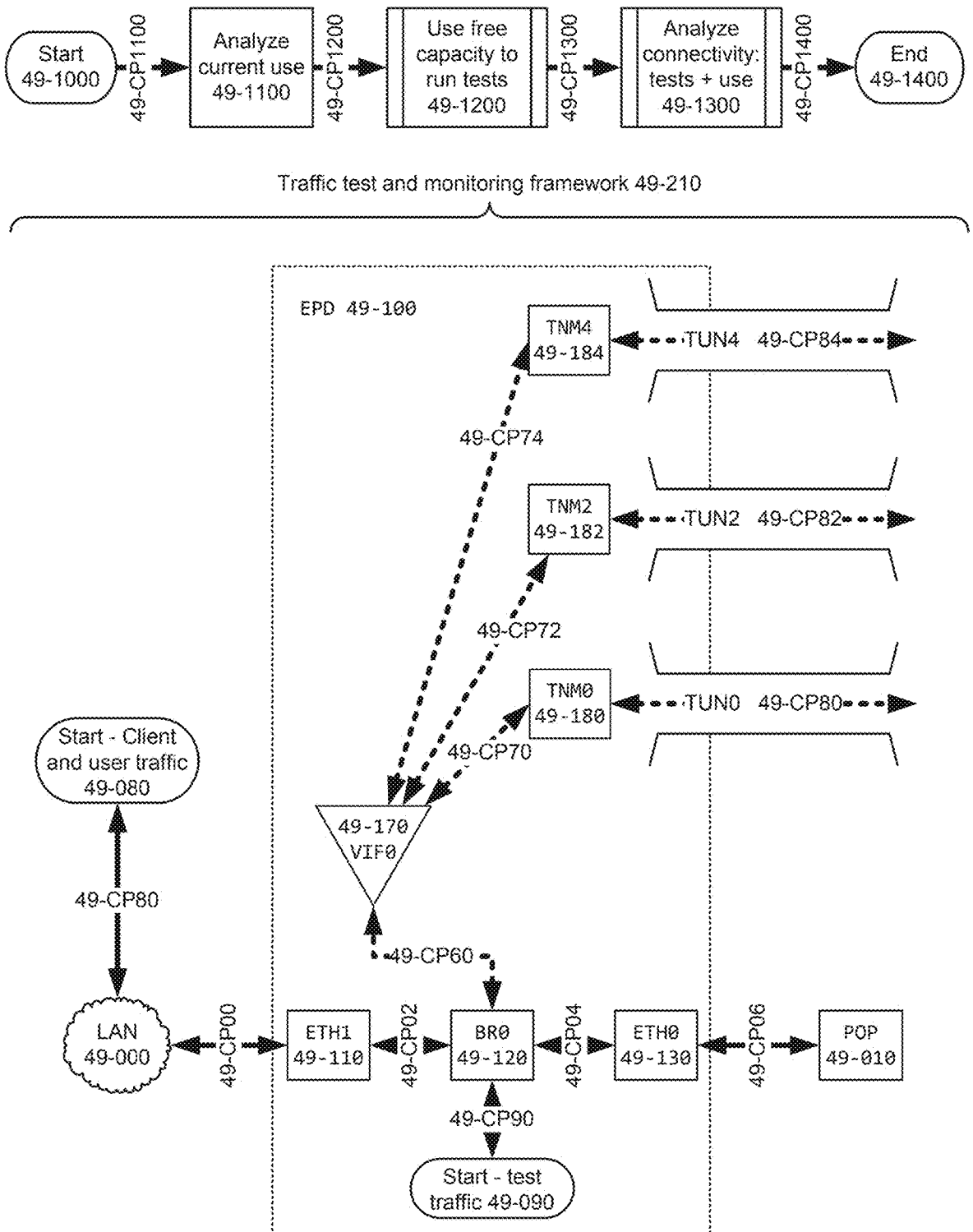
FIG. 49 illustrates running connectivity tests without interfering with current user tunnel usage.

FIG. 49 illustrates running connectivity tests without interfering with current user tunnel usage. Before any testing cycles begin, analyze current use 49-1100 examines the current usage of the connectivity by users, by type of traffic as well as which traffic stays local and which transits via a tunnel.

The next step allocates and uses free capacity to run tests 49-1200 so that the tests do not steal bandwidth from users which could have a detrimental effect on their UX.

At the analyze connectivity 49-1300 step, both the connectivity tests and real user usage are taken into account in aggregate and individually to analyze connectivity.

Tests run during work hours when a "production" network is busy will be run in a manner where they do not affect work flow. Test runs during off hours may not provide accurate information of a broader network under load because they can't detect individual congestion issues which occur when multiple parties are also using network resources.

Tests run on a busy network may interrupt workflow and while necessary to diagnose problems, if run too often and given right to monopolize too many resources, then the test could become a contributing factor to the problem.

Total network usage can be measured by analyzing traffic down path 49-CP306.

Local only traffic may be ascertained by totaling all tunnel traffic and subtracting that sum from the traffic through 49-CP306 with the remainder being local traffic.

Figure 50:
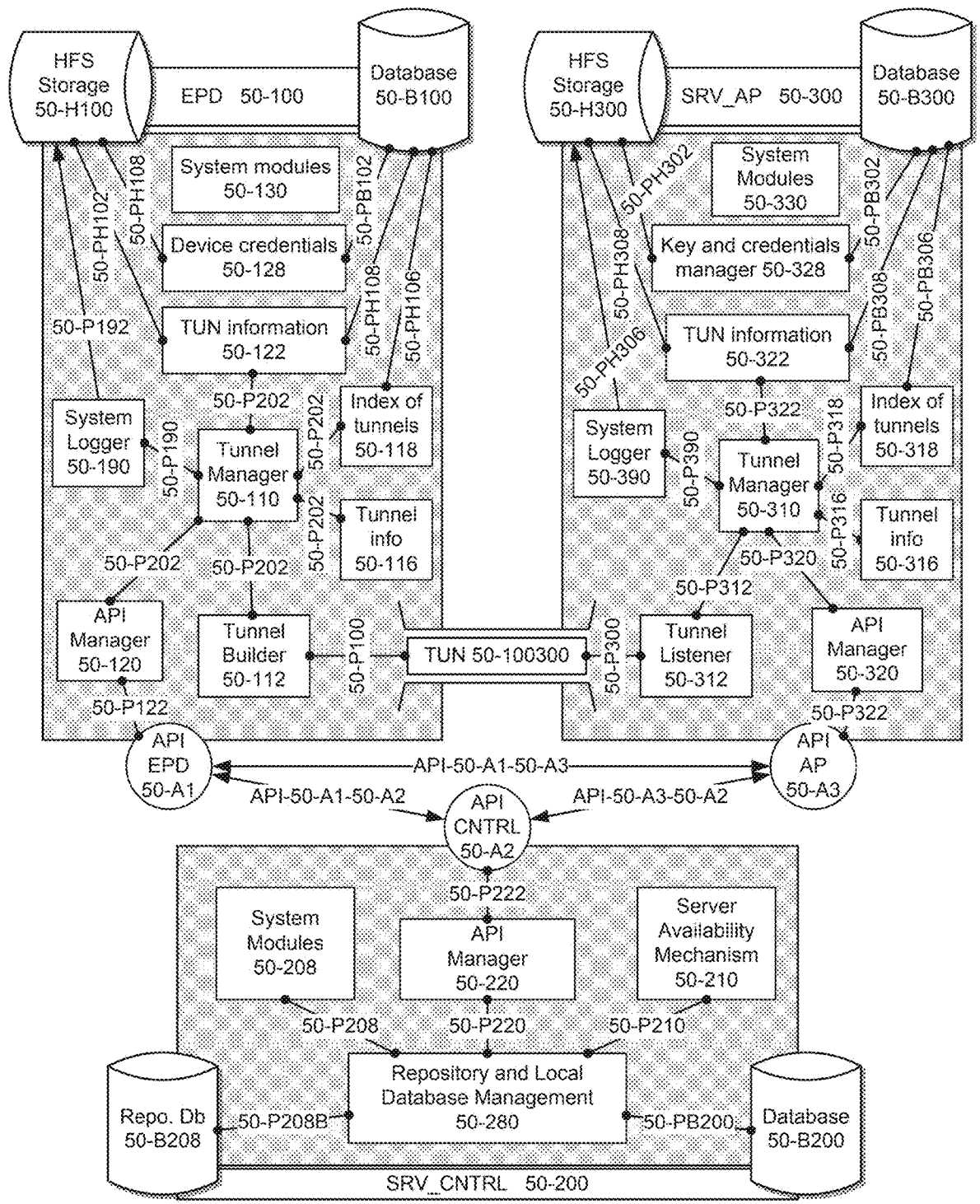
FIG. 50 illustrates interaction between three devices which collaborate in the process of tunnel building.

FIG. 50 illustrates interaction between three devices which collaborate in the process of tunnel building. The three devices are an end point device (EPD) 50-100, an access point server (SRV_AP) 50-300 and a central control server (SRV_CNTRL) 50-200. This figure shows the logical structure of the devices, the key components running on each device, as well as the API framework for communications between them.

In order for tunnel TUN 50-100300 to be built, certain information about the tunnel, about the peers in the pairing, and other information can be shared by the API.

Information about which SRV_AP 50-300 an EPD 50-100 should connect with is available via a server availability list which is generated on the SRV_CNTRL 50-200.

The tunnel is initiated on the EPD 50-100 by the Tunnel Builder 50-112. It is governed by the Tunnel Manager which in turn gathers information from Tunnel Info 50-116 for settings, Index of tunnels 50-118, and save tunnel information 50-122.

The tunnel listener 50-312 operates on the SRV_AP 50-300 and is governed by the tunnel manager 50-310. Information on each device can be stored in RAM, in a database 50-B100, 50-B300, and 50-B200, or on a disk 50-H100 or 50-H300, or other form of storage (not shown).

Figure 51:
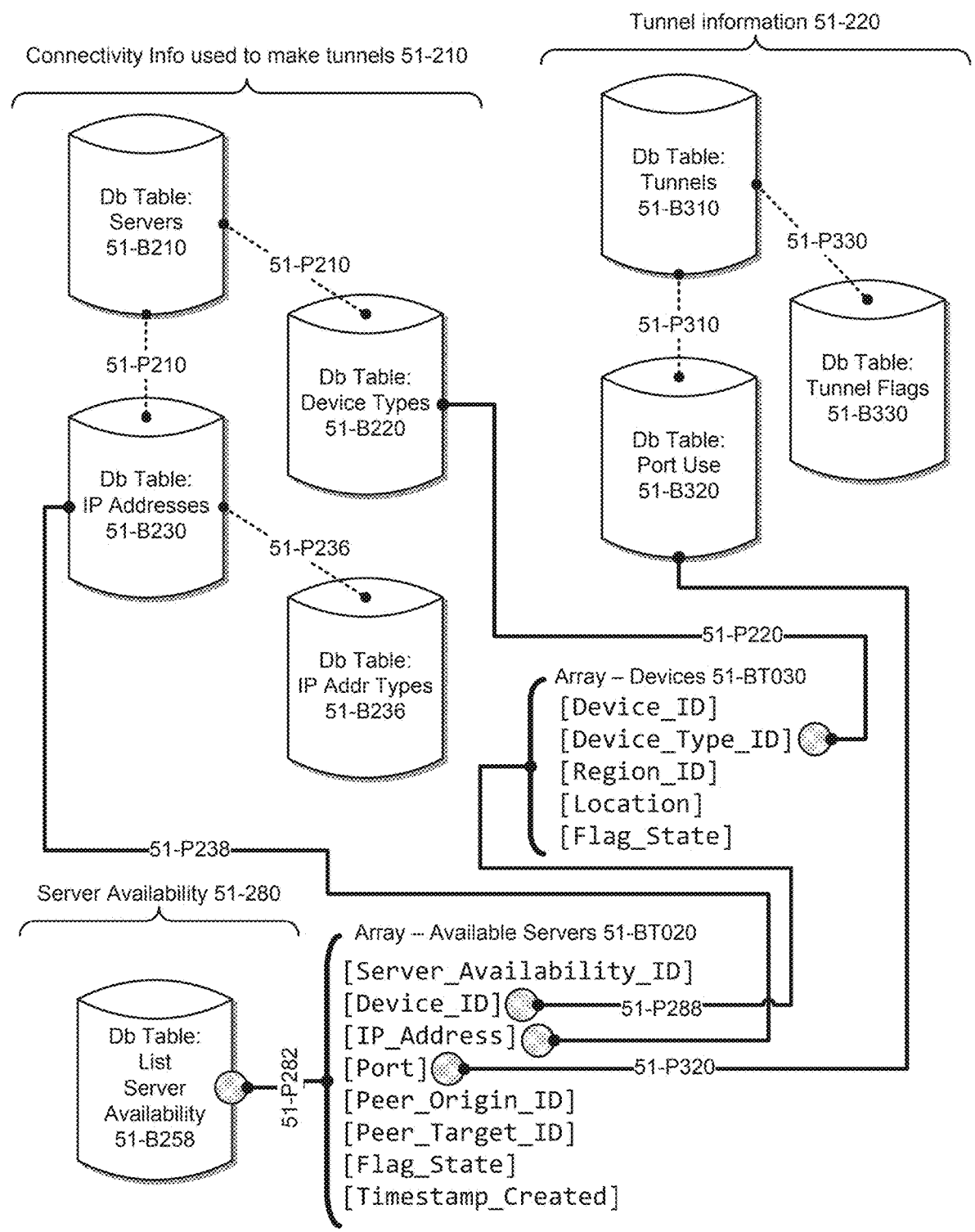
FIG. 51 illustrates the relationships between various database tables used to store connectivity information.

FIG. 51 illustrates the relationships between various database tables used to store connectivity information. The connectivity information is used to make tunnels 51-210, tunnel information 51-220, and Server Availability 51-280. More tables may be used, and the fields and relationships indicated are for example only and can differ depending on use within various systems.

Figure 52:
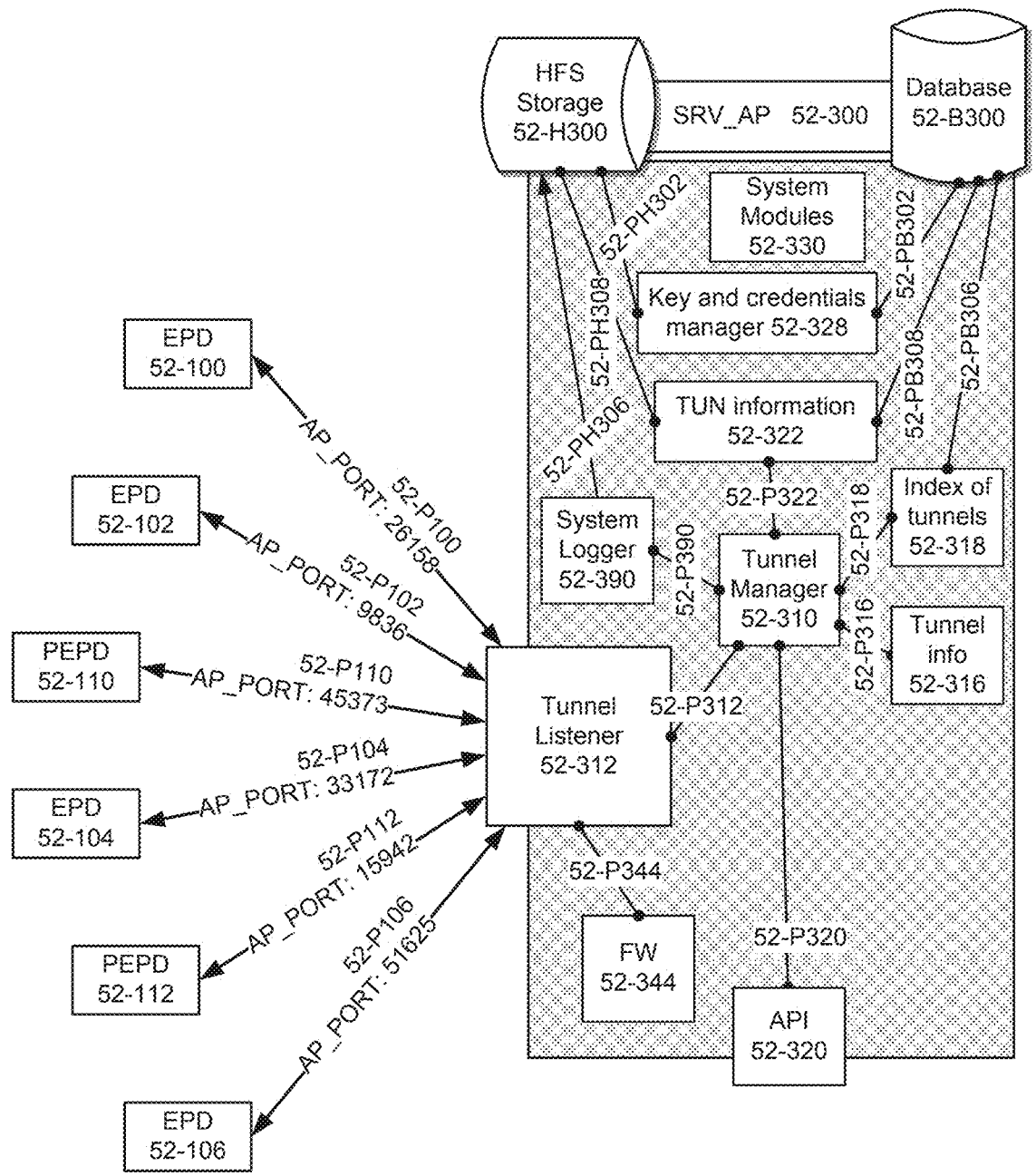
FIG. 52 illustrates the requirement for unique information per tunnel to avoid collisions.

FIG. 52 illustrates the requirement for unique information per tunnel to avoid collisions. This information can include the tunnel name, tunnel ID, tunnel interface name, the port number listened to on a specific IP address, and should to be unique to each tunnel.

This figure illustrates the connection from devices to the SRV_AP 52-300, such as EPD 52-100 to port 26158 via 52-P100, EPD 52-102 to port 9836 via 52-P102, from PEPD 52-110 to port 45373 via 52-P110, EPD 104 to port 33172 via 52-P104, PEPD 52-112 to port 15942, and EPD 52-106 to port 51625 via 52-P106.

The tunnel listener 52-312 will only open those ports to which it expects tunnels to be built upon and will close the rest. Furthermore, only connections from known peers will be accepted. The ports assigned to TUNs via the server availability mechanism are unique and random. The type of tunnel cannot be identified by the port used. Unique, non-conflicting subnets will also be assigned via the tunnel listener governed by the server availability listing and tunnel manager 52-310.

Figure 53:
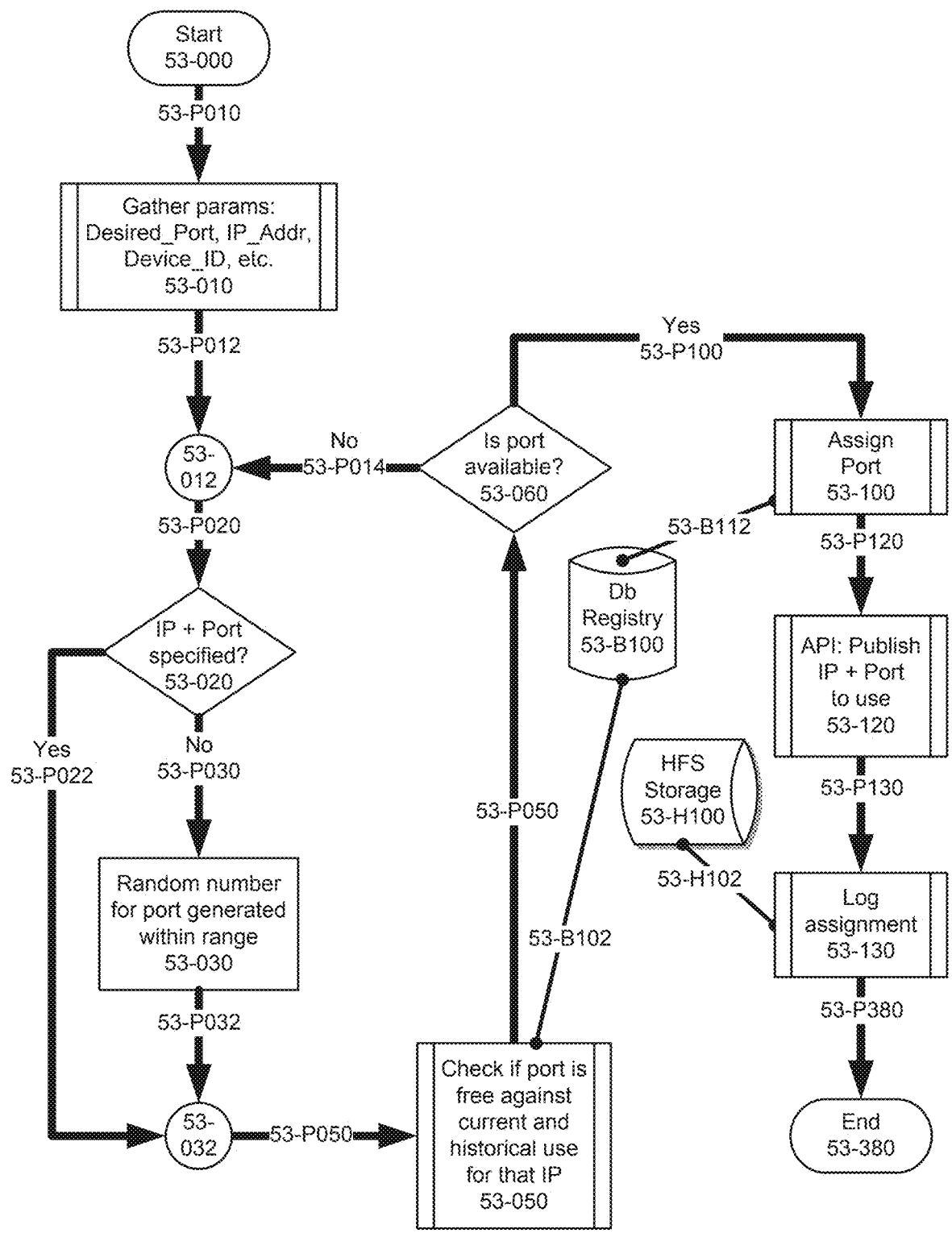
FIG. 53 is a flowchart illustrating the logical flow used to assign a port to an IP address used to build a tunnel.

FIG. 53 is a flowchart illustrating the logical flow used to assign a port to an IP address used to build a tunnel. The flow takes into account various factors when selecting the port and IP address to use.

The first step is to gather parameters 53-010 for the port to IP address assignment by checking to see if desired port and IP_Addrress have been specified to be used by a specific device by its Device_ID, and other factors. The parameters also delineate a floor value and a roof value for port number, and more governing settings.

The logic gate IP+Port specified? 53-020 step checks to see if there is a request for a specific port attached to a specific IP address for a server device by Device_IP.

If the port and IP address have been specified, then the availability for their use is accepted and logic follows path Yes 53-P022. If a preferential port and IP are not specified, then logic follows path No 53-P030 to random number generator for a random port to be generated within range 53-030.

A lookup is done at step 53-050 to check against current and historical use (via path 53-B102 to Db Registry 53-B100) for that port to IP address mapping to see if the port is free or if it is currently in use. A secondary check is done by looking at historical use to see if it indicates if that port and IP combination has been used in the past by this device or other devices, and if so, if that use proved to be relatively problematic. Some unstable or unreliable ports due to filtering or congestion through devices or other reasons can be marked as being problematic. If there is also a trend for blocking problematic ports for other devices, then the port to IP address combination can be marked as unavailable.

If the port is not available at step 53-060, the process of generating a port to IP address mapping is restarted via junction point 53-012.

If the port is available, then the port to IP address will be assigned for use at step 53-100. This assignment will be saved in the Db registry 53-B100 via path 53-B112. Next, the Port to IP Address assignment is published via an API call 53-120 so that relevant devices know about the availability status of the port. The last step is to log the assignment 53-130 of port to IP address including the logic used and other factors which could assist in improving the efficiency of future port assignments.

Figure 54:
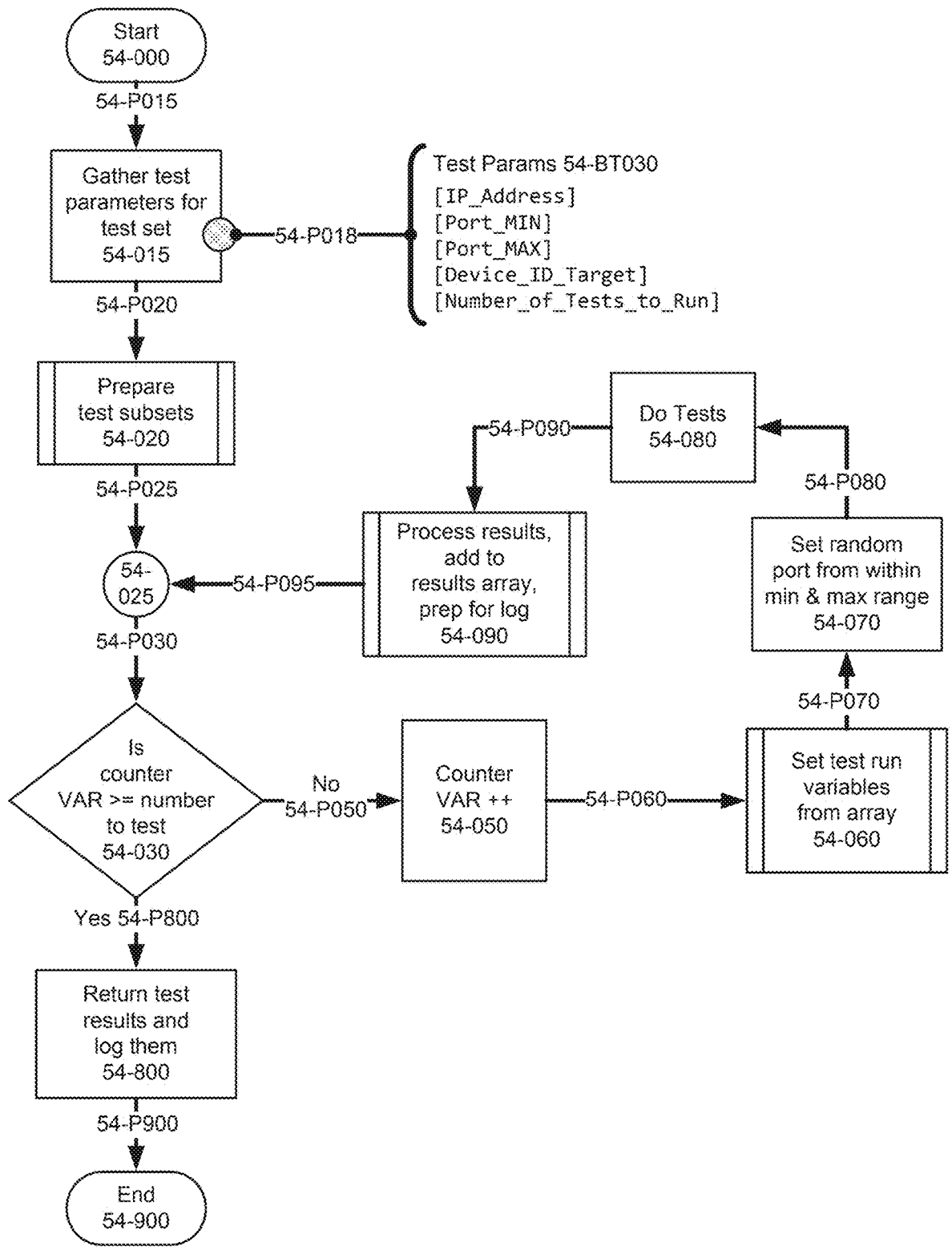
FIG. 54 is a flowchart describing a structure for a series of tests of various ports of an IP address.

FIG. 54 is a flowchart describing a structure for a series of tests of various ports of an IP address. The structure includes a while loop that will continue as long as the counter VAR is less than the prescribed number of tests to run. Results per test are saved in a multi-dimensional array or saved to database or log file.

At the process results, add to results array, prep for log 54-090 step, ongoing statistical analysis can be run on the current test compared with the other tests run in the series.

Figure 55:
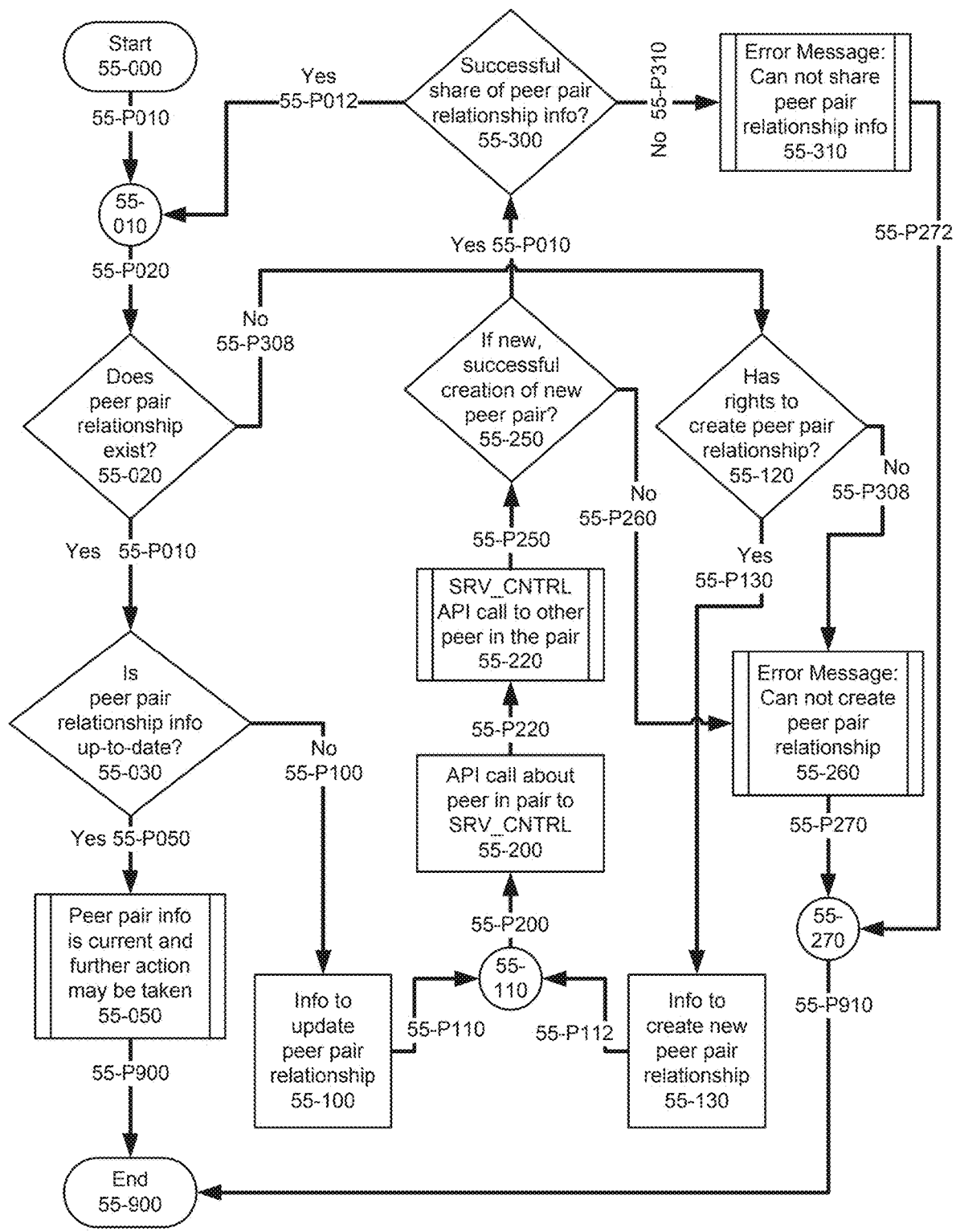
FIG. 55 is a flowchart that show the logic regarding the management of peer pair relationships between devices.

FIG. 55 is a flowchart that shows the logic regarding the management of peer pair relationships between devices. The algorithm checks to see if there is a relationship in place 55-020, if it is up-to-date 55-030, and also checks to see if there are adequate rights to create 55-130 and or update 55-100 the relationship. If a new relationship is created or an existing one is updated, an API call 55-220 via the SRV_CNTRL shares the information with the other peer in the pair.

Figure 56:
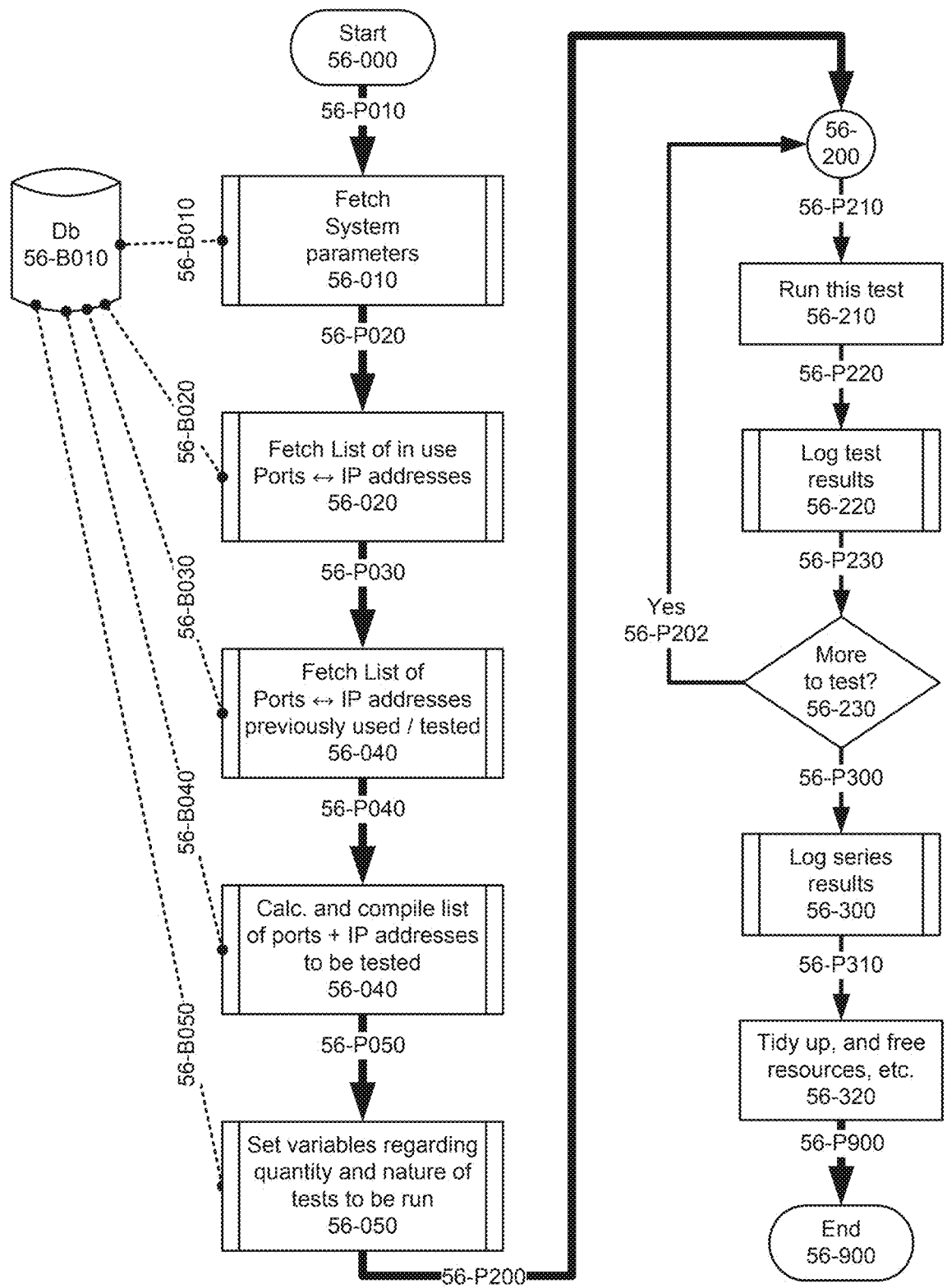
FIG. 56 illustrates the steps used to set up and then run tunnel tests.

FIG. 56 illustrates the steps used set up and then run tunnel tests. This is an alternative to the operation as described by FIG. 54.

Figure 57:
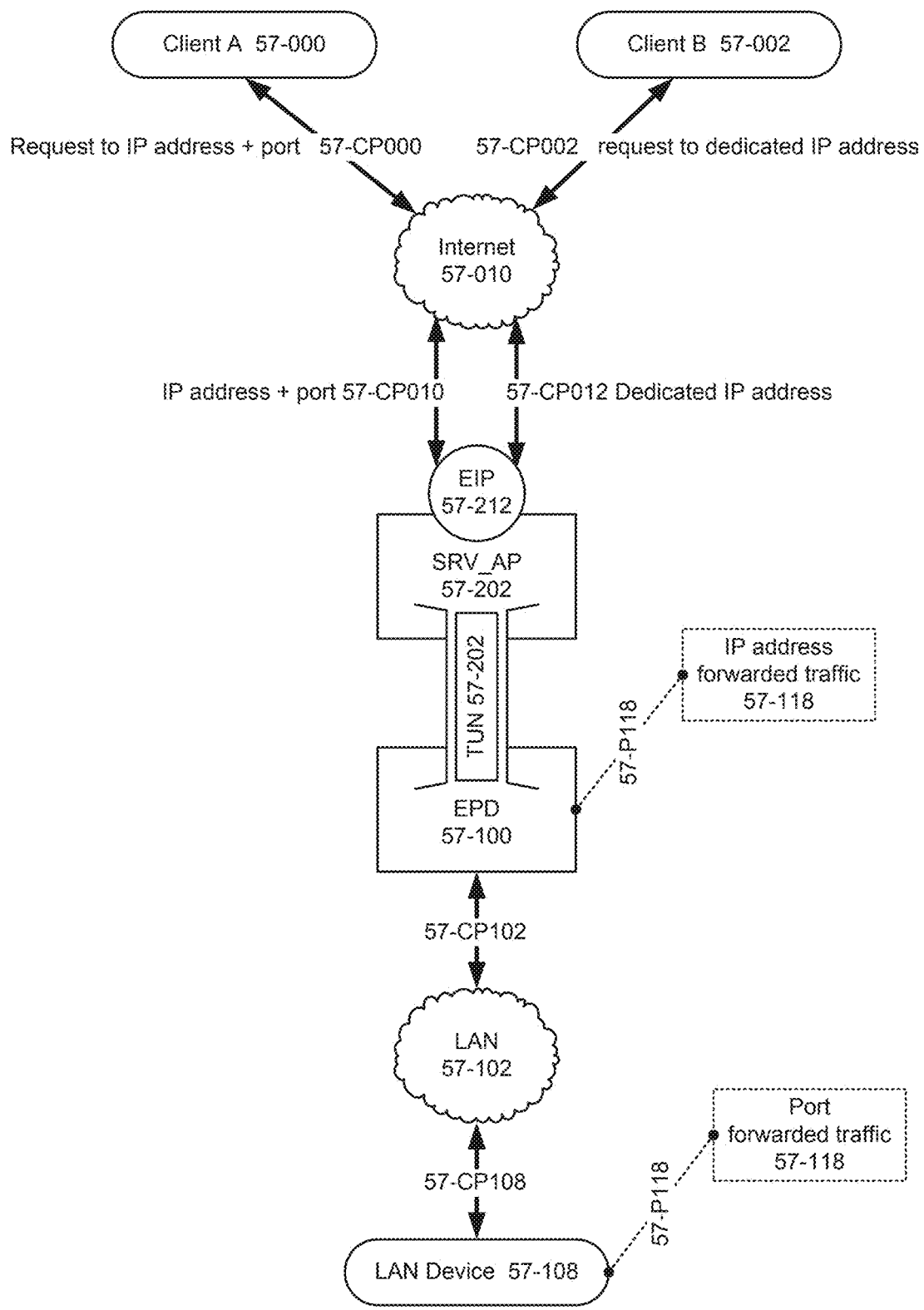
FIG. 57 illustrates a virtual end point (VEP) extended into the cloud.

FIG. 57 illustrates a virtual end point (VEP) extended into the cloud. The VEP is reachable by either dedicated IP address via path 57-CP000 to 57-CP010 or an IP address+port combination via paths 57-CP002 to 57-CP-012.

The egress ingress point (EIP) 57-212 on an access point server (SRV_AP) 57-202 will carry traffic received at the specific port on the IP address via path 57-CP010 through the tunnel TUN 57-202 to EPD 57-100 via LAN 57-102 to the LAN Device 57-108.

If no port is specified, the traffic via 57-CP012 Dedicated IP address can be forwarded to the EPD 57-100 and can be handled via 57-118.

Figure 58:
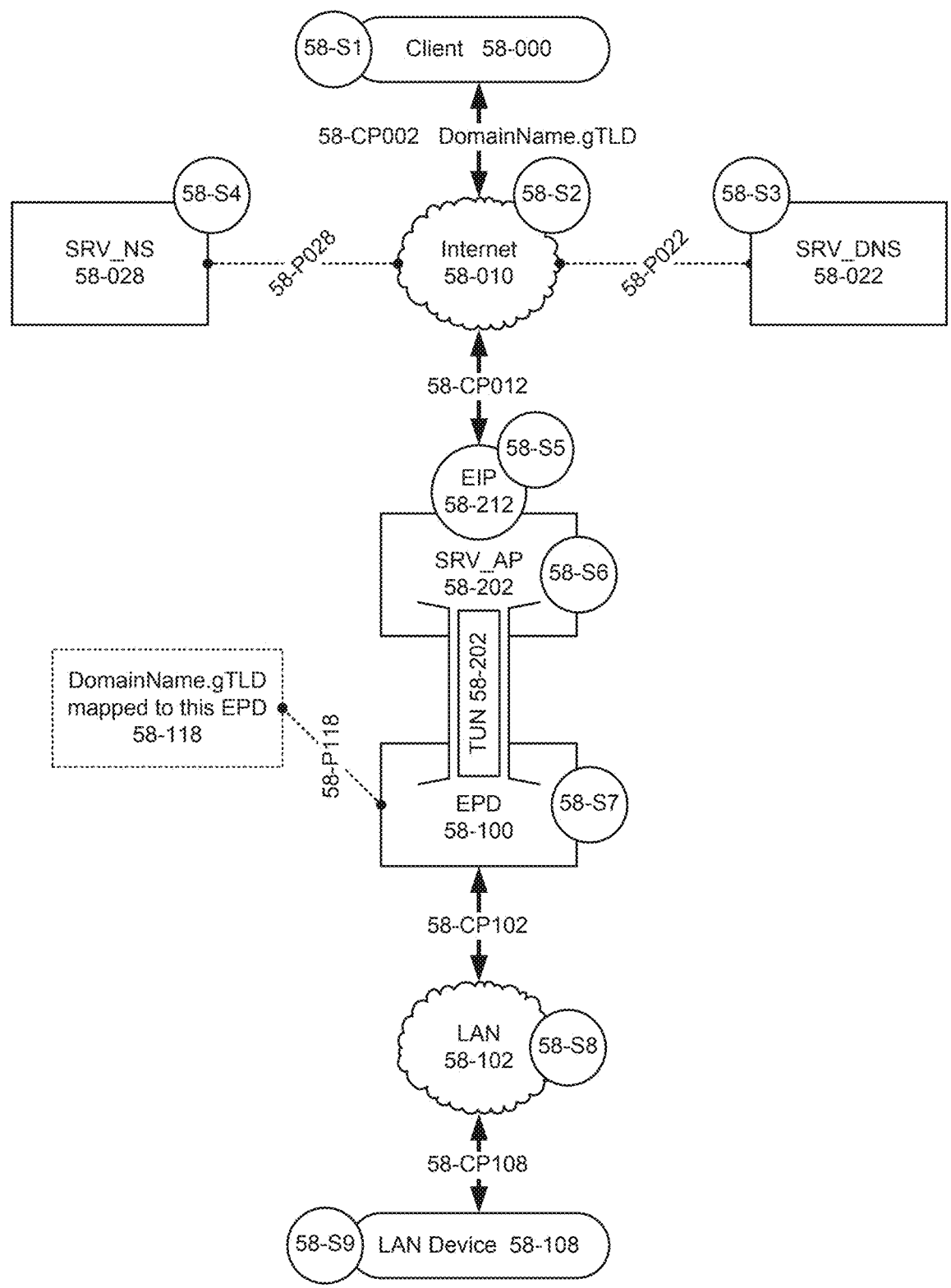
FIG. 58 illustrates the binding of a domain name to a dynamic virtual end point (VEP).

FIG. 58 illustrates the binding of a domain name to a dynamic VEP on a SRV_AP 58-202.

This allows traffic to "find" the EIP 58-212 after the domain name is looked up by a domain name server (SRV_DNS) 58-022. Finer granularity of routing occurs at a nameserver server (SRV_NS) 58-028. This mechanism allows for a DomainName.gTLD mapped to this EPD 58-118.

Figure 59:
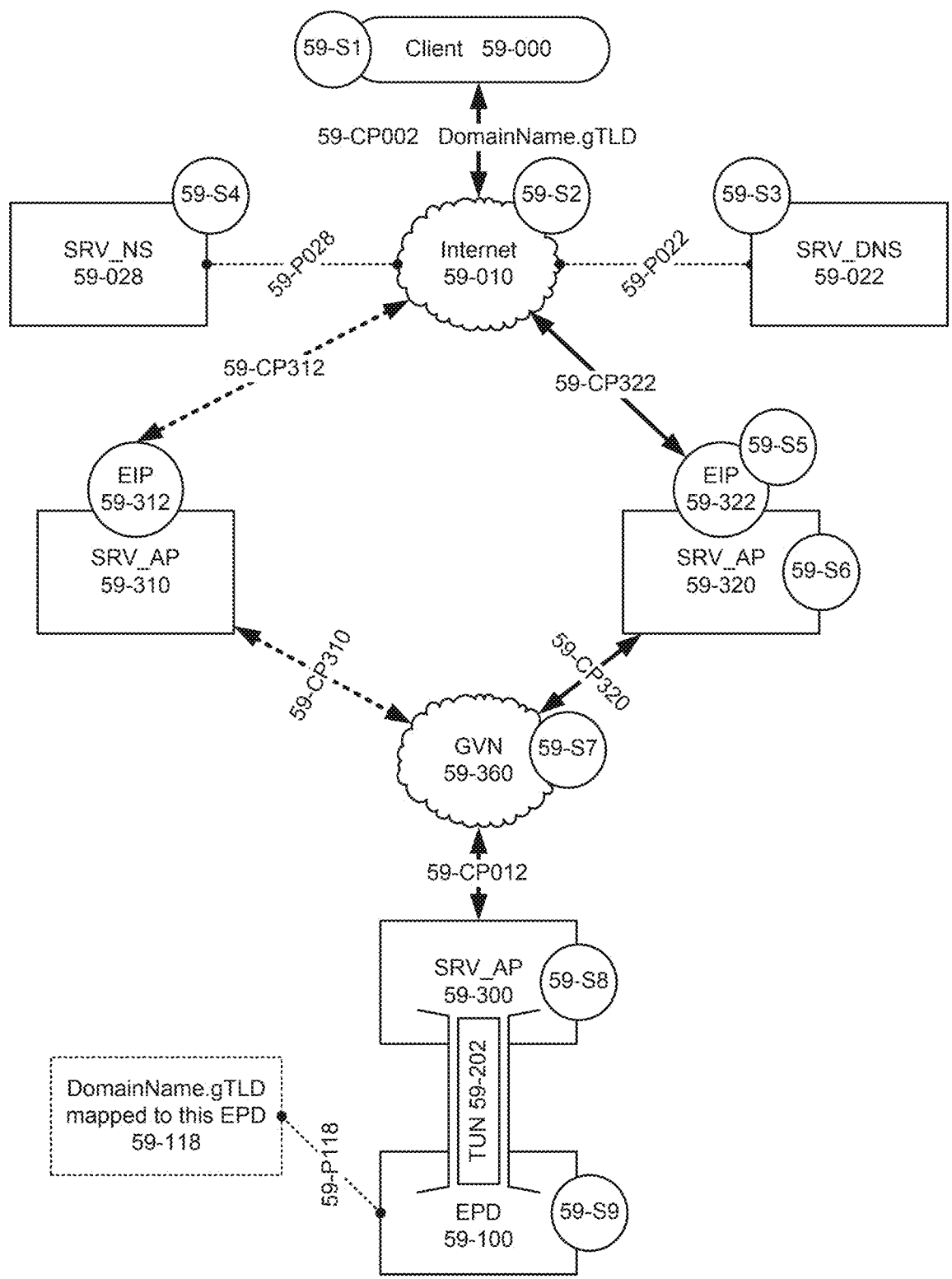
FIG. 59 illustrates the routing of traffic for a domain.gTLD to enter a global virtual network (GVN) via the most optimal egress ingress point (EIP).

FIG. 59 illustrates the routing of traffic for a domain.gTLD to enter a global virtual network (GVN) via the most optimal egress ingress point (EIP). The most optimal egress ingress point (EIP) may be egress ingress point 59-312 on access point server (SRV_AP) 59-310 or EIP 59-322 on SRV_AP 59-320. Traffic from either SRV_AP 59-310 or SRV_AP 59-320 will route to the EPD 59-100 via the most optimal path through the GVN. Conversely return traffic is smart routed back.

Figure 60:
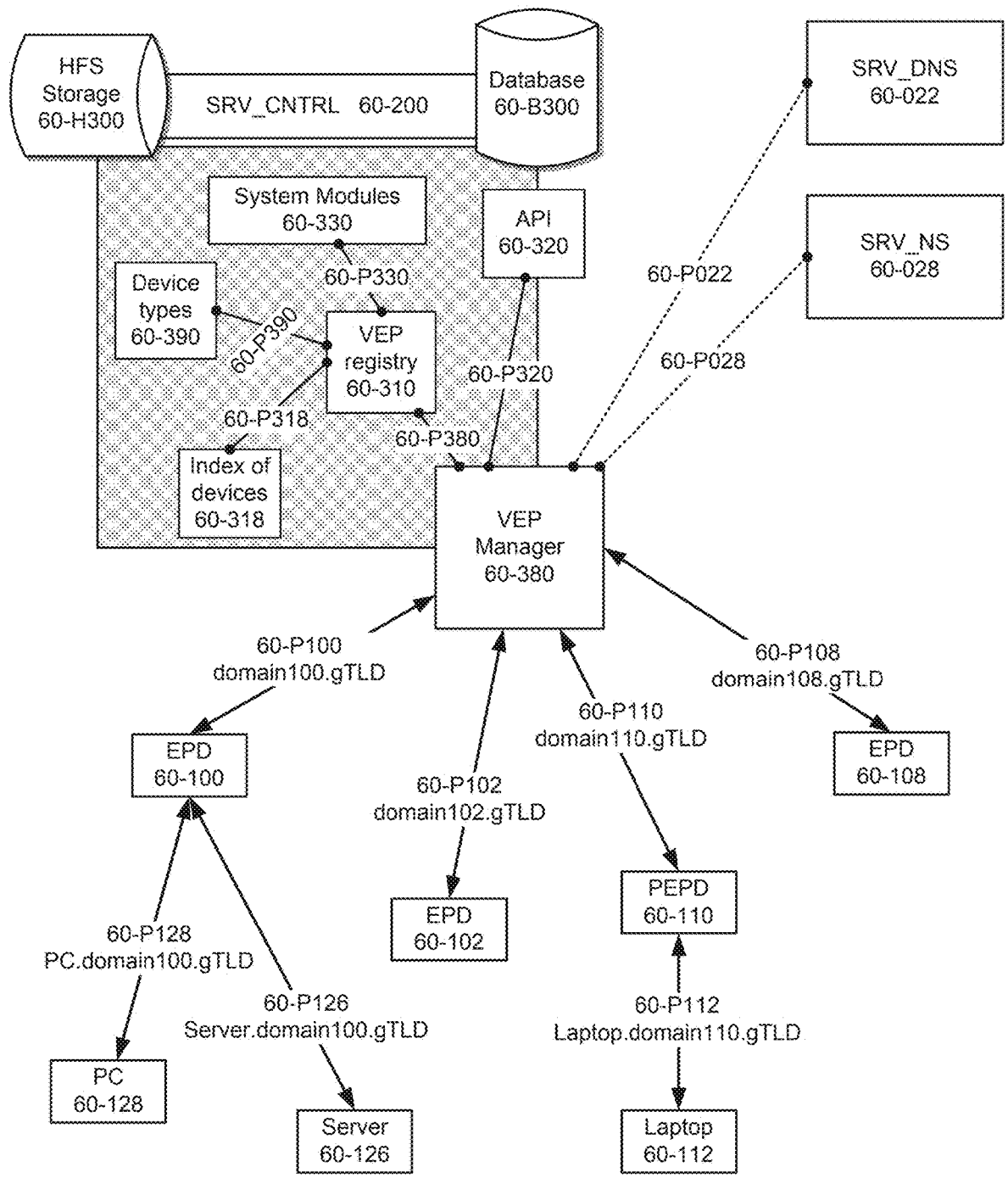
FIG. 60 illustrates a registry of end point devices (EPD) and personal end point devices (PEPD) which can be located and reached via a domain.gTLD.

FIG. 60 illustrates a registry of end point devices (EPD) and personal end point devices (PEPD) which can be located and reached via a domain.gTLD.

gTLD stands for global top-level domain. The registry further stores information for individual devices located in the local area network (LAN) behind an EPD or a personal area network (PAN) behind a PEPD. For example PC.domain100.gTLD will find PC 60-128 via path 60-P128 which is in the internal network behind EPD 60-100. Security settings can also govern whether or not devices within a LAN are reachable from the open internet, or only from known source IP addresses, or only from within the GVN, or from known EPD's, or via other rules.

Figure 61:
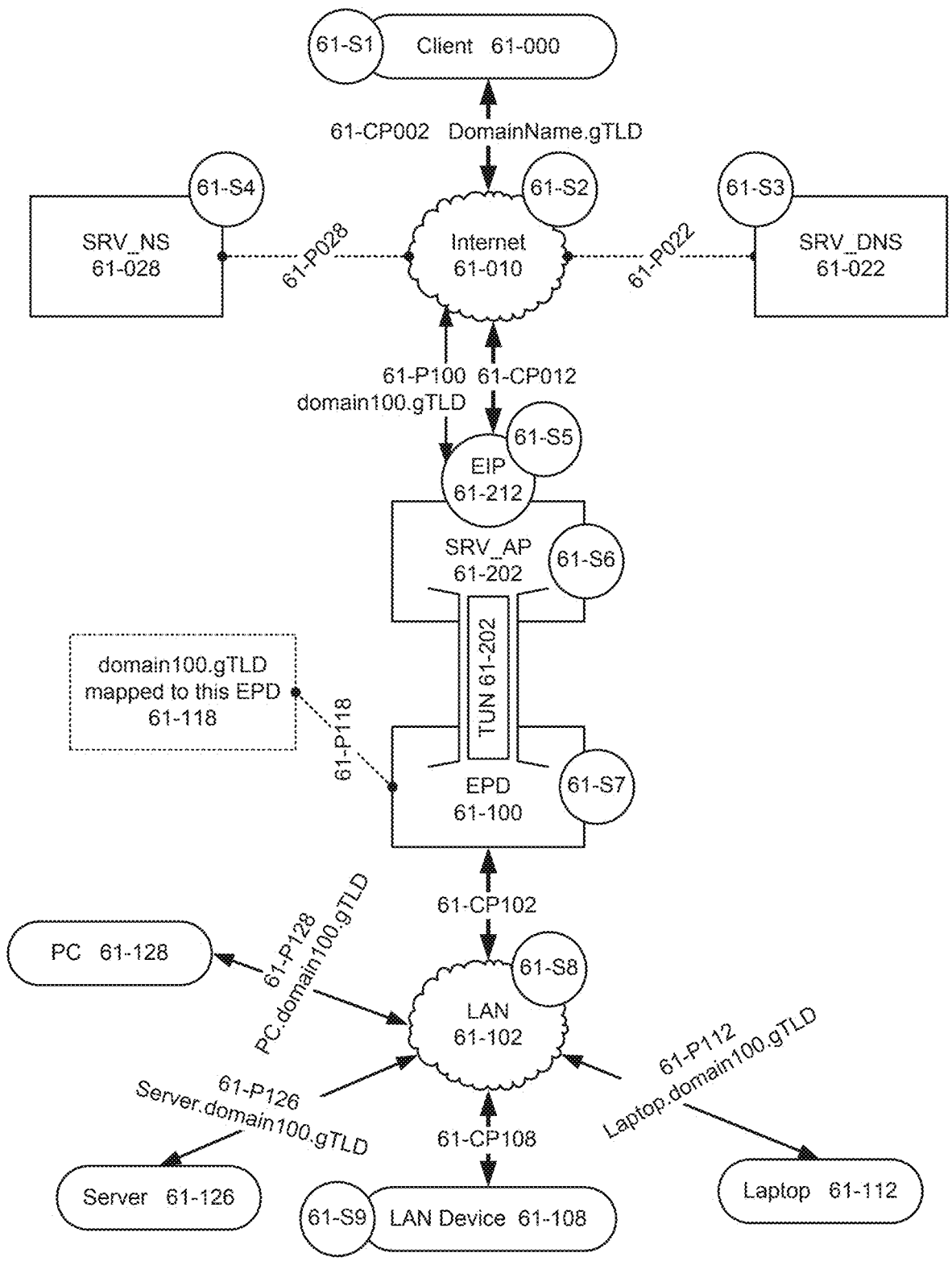
FIG. 61 illustrates devices which may be reachable via a subdomain of a global top-level domain.

FIG. 61 illustrates devices which may be reachable via a subdomain of a global top-level domain. This example shows devices reachable by subdomain.domainname.gTLD such as Server 61-126 via Server.Domain100.gTLD behind EPD 61-100. However, LAN Device 61-108 is not assigned a subdomain and therefore is not reachable from outside via a virtual end point (VEP).

Figure 62:
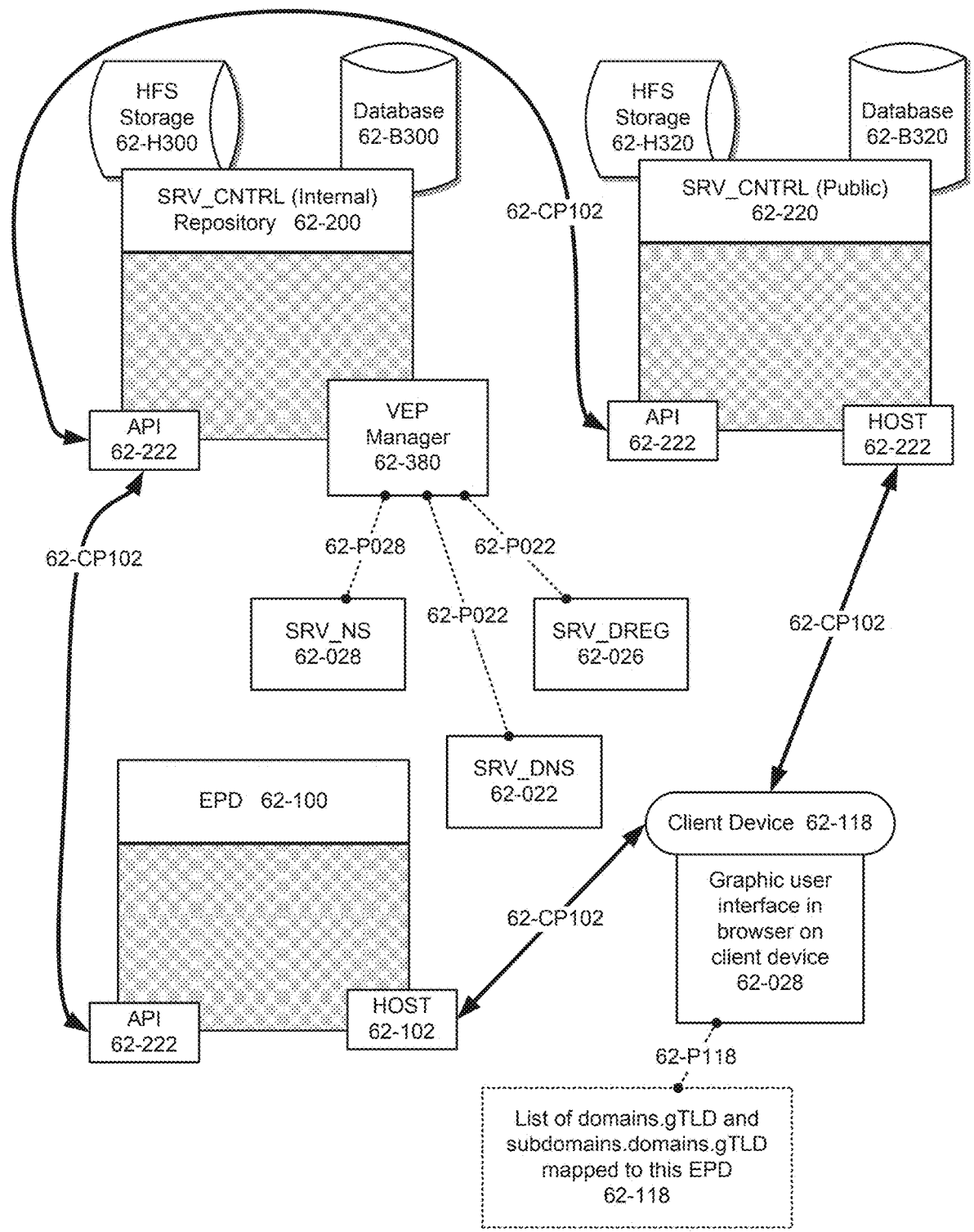
FIG. 62 illustrates a method for utilizing a graphic user interface (GUI) running in a browser on a Client Device to manage virtual end point information.

FIG. 62 illustrates a method for utilizing a graphic user interface (GUI) running in a browser on a Client Device to manage virtual end point information. The user interface (GUI) 62-028 is run in a browser on a Client Device 62_118. The client in the GUI can connect via Host 62-102 on the EPD 62-100 or Host 62-222 hosted on SRV_CNTRL (public) 62-220.

The list of domains.gTLD and associated subdomains is managed and upon "saving" or "committing", the changes are shared to SRV_CNTRL (Internal) Repository 62-200 via its API 62-222 to be saved in the database there 62-B300. The VEP Manager 62-380 publishes this information to the domain registrar server (SRV_DREG) 62-026, the domain name server (DNS) server (SRV_DNS) 62-022, and to the nameserver server (SRV_NS) 62-028.

Figure 63:
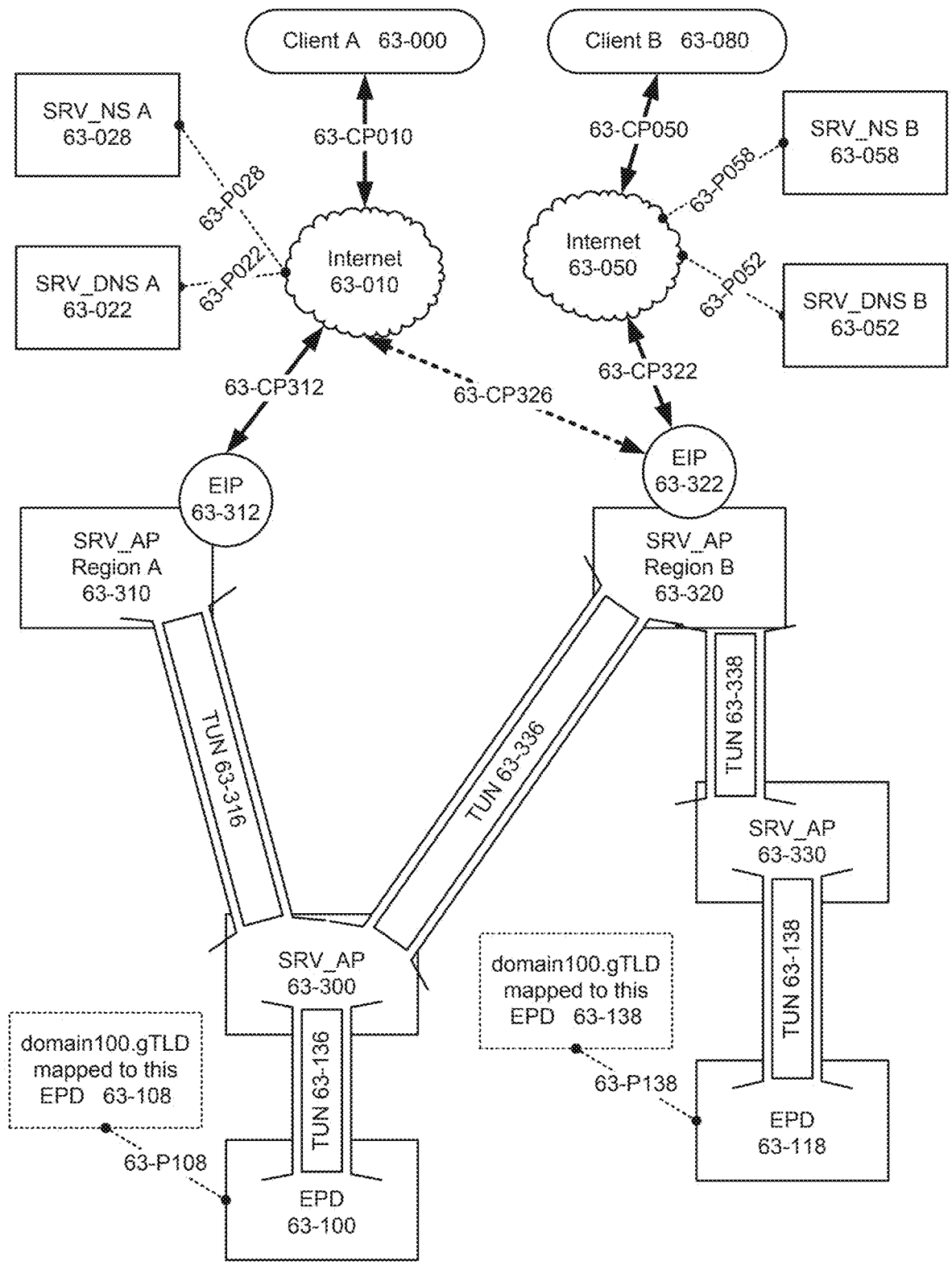
FIG. 63 illustrates how subdomains.domains.gTLD routing can take advantage of advanced smart routing (ASR) in a global virtual network (GVN).

FIG. 63 illustrates how subdomains.domains.gTLD routing can take advantage of advanced smart routing (ASR) in a global virtual network (GVN). This can be used to both find the most optimal egress ingress point (EIP) from the open internet 63-010 or 63-050 as well as utilizing ASR to use the most optimal internal route through the GVN. ASR can utilize a combination of both external paths and internal paths via tunnels to select the most ideal path end-to-end.

Figure 64:
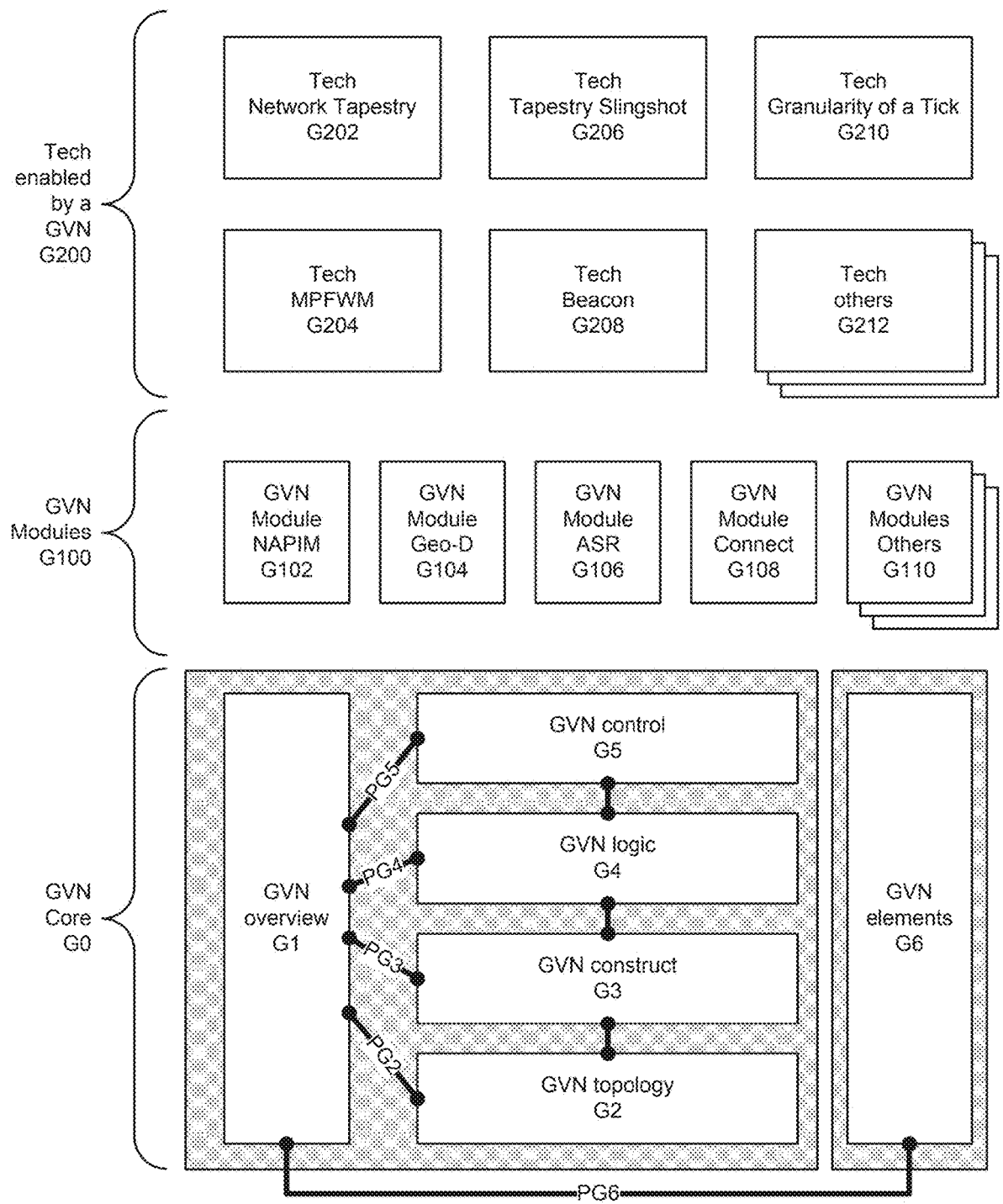
FIG. 64 shows a block diagram of technology used by and enabled by a global virtual network (GVN)

FIG. 64 shows a block diagram of technology used by and enabled by a global virtual network ("GVN") including the GVN core elements G0, GVN modules G100, and technology enabled G200 by the global virtual network GVN. The GVN core includes an overview of the mechanism G1 and its constituent component parts of Topology G2, Construct G3, Logic G4, and Control G5 layers. The GVN core G0 also incorporates the relations to and with GVN Elements G6.

The GVN can include plug-in and/or stand-alone GVN modules G100 including but not limited to: Neutral API Mechanism ("NAPIM") G102, described in PCT/US16/12178; Geodestination ("Geo-D") G104, described in PCT/US15/64242, Advanced Smart Routing ("ASR") G106, Connect G108, and other modules G110 described in U.S. Provisional Application U.S. 62/151,174.

The GVN also provides a platform which can enable other technologies including but not limited to: Network Tapestry G202; MPFWM G204; Network Slingshot G206; Network Beacon G208, Granularity of a tick G210, and other technologies G212. These are described in in U.S. Provisional Application 62/174,394, U.S. Provisional Application 62/266,060.

GVN Modules (G100) and Technology (G200) enabled by GVN can operate on top of an existing GVN, as a component part of a GVN, or can be independent and utilize all or some isolated parts of a GVN to support their own stand-alone operations.

Figure 65:
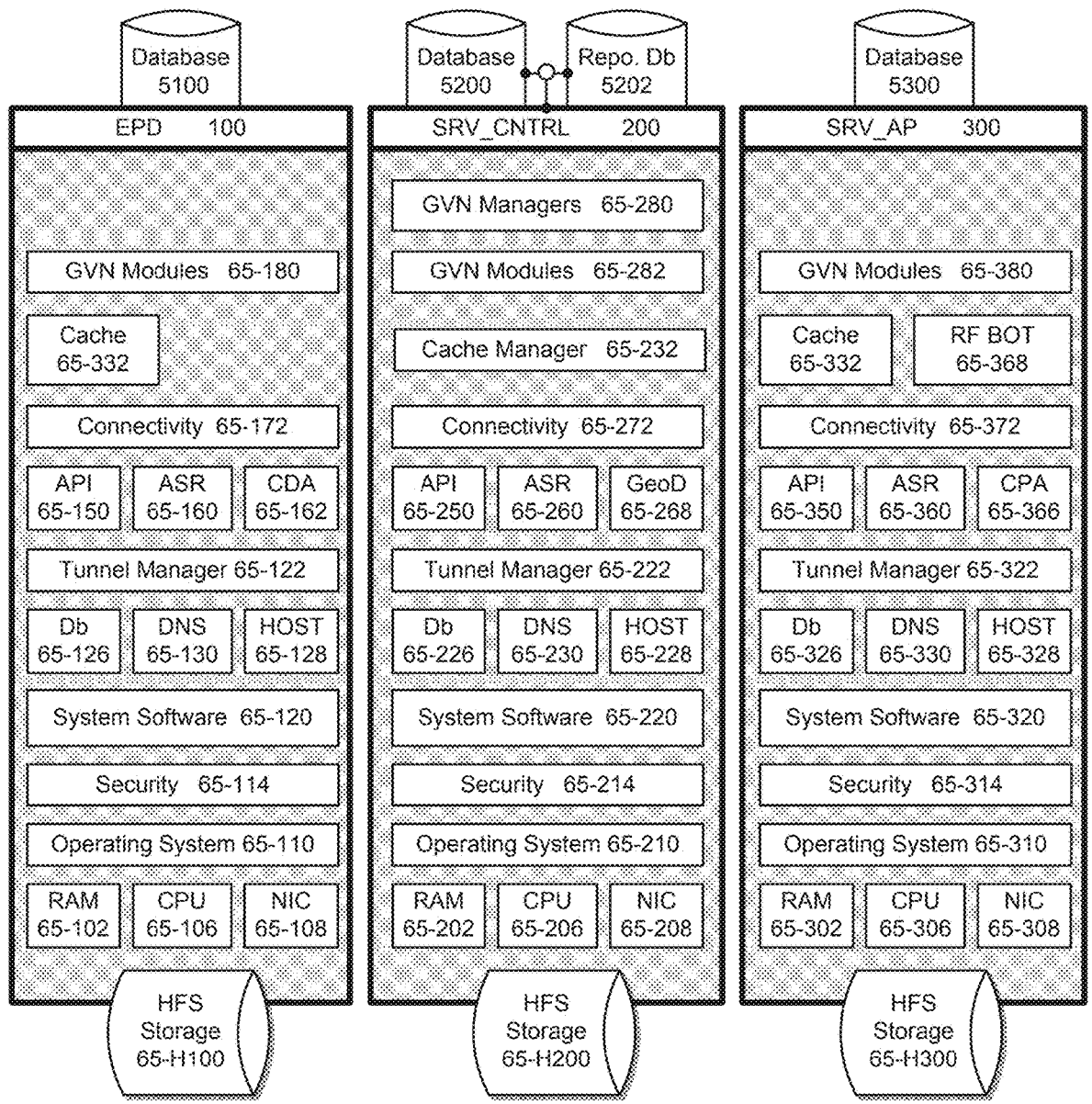
FIG. 65 illustrates some system modules and components for an end point device EPD, central control server SRV_CNTRL, and an access point server SRV_AP.

FIG. 65 illustrates some system modules and components for an end point device EPD 100, central control server SRV_CNTRL 200, and an access point server SRV_AP 300. This figure also illustrates database 5100 on EPD 100, database 5200 on SRV_CNTRL 200, repository database 5202 on SRV_CNTRL 200, and database 5300 on SRV_AP. The figure is hierarchical, with lowest level hardware devices at the bottom, and subsequent systems, components, modules and managers built on top of lower layers. Files and data are stored on the Hierarchical File System (HFS) attached storage devices 65-H100 on EPD 100, 65-H200 on SRV_CNTRL 200, and 65-H300 on SRV_AP 200. The components illustrated in these systems diagrams all operate independently but may also rely on information about other devices that they interact with.

RAM stands for random access memory, CPU for central processing unit (which can also include sub-processors), NIC for network interface card, Db for database software, DNS for domain name system, HOST for hosting software, API for application programming interface, ASR for advanced smart routing, GeoD for geodestination, GVN for global virtual network, CDA for content delivery agent, CPA for content pulling agent, and RF BOT for remote fetcher bot. There may be additional modules, managers, systems, or software components.

Figure 66:
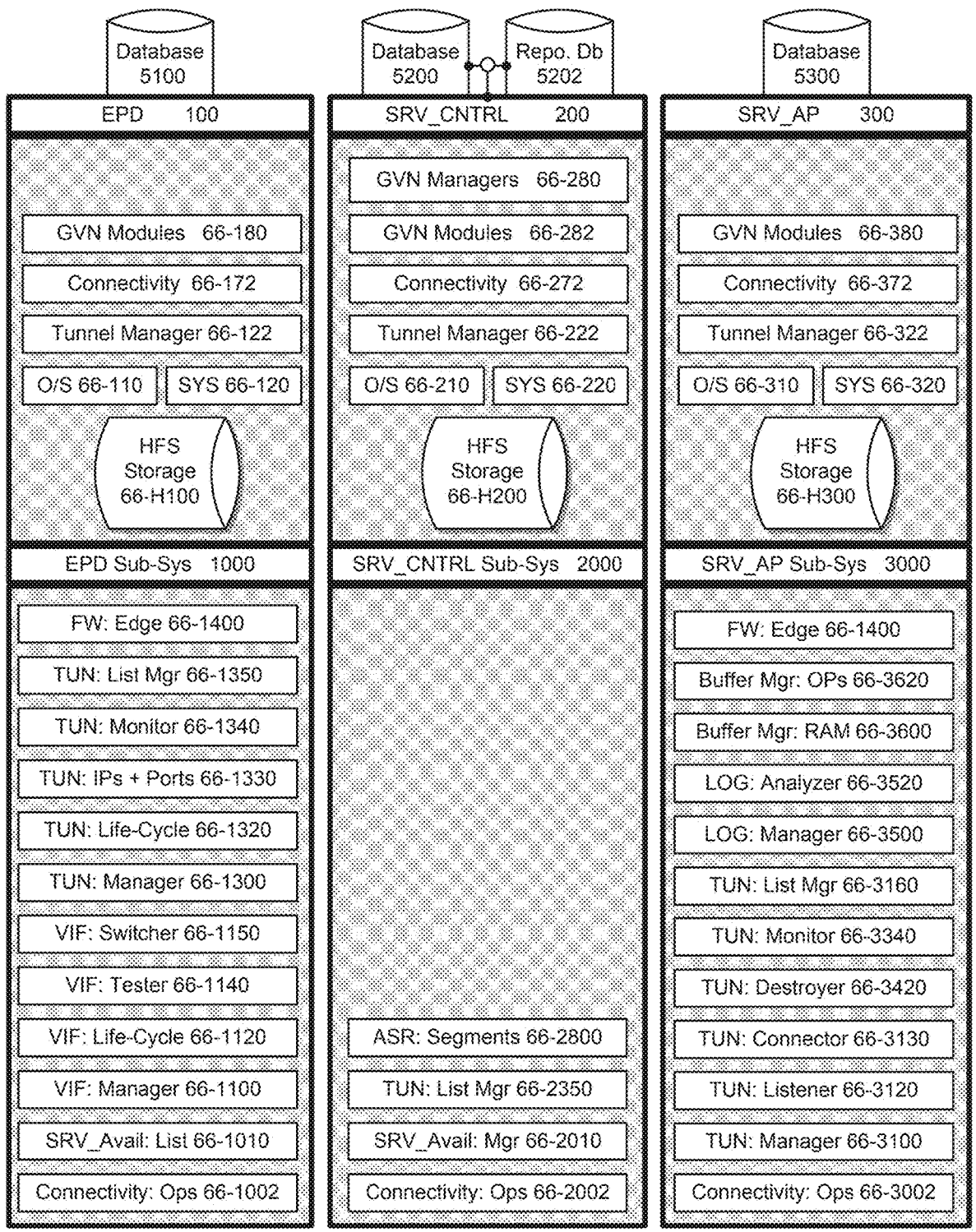
FIG. 66 illustrates some system modules and components for an end point device EPD, central control server SRV_CNTRL, and an access point server SRV_AP.

FIG. 66 illustrates some system modules and components for an end point device EPD 100, central control server SRV_CNTRL 200, and an access point server SRV_AP 300. This figure further identifies subsystems for each device such as EPD sub-sys 1000 for EPD 100, SRV_CNTRL Sub-sys 2000 for CNTRL 200, and SRV_AP sub-sys 3000 for SRV_AP 300. Subsystems have been identified by function and are indicated with prefixes including FW for firewall related subsystems, TUN for tunnel related subsystems, VIF for virtual interface related subsystems, SRV_Avail for the server availability list and related subsystems, BUFF Mgr for buffer management and related subsystems, LOG for the logging module and related subsystems, and CONNECTIVITY for general connectivity operations.

Figure 67:
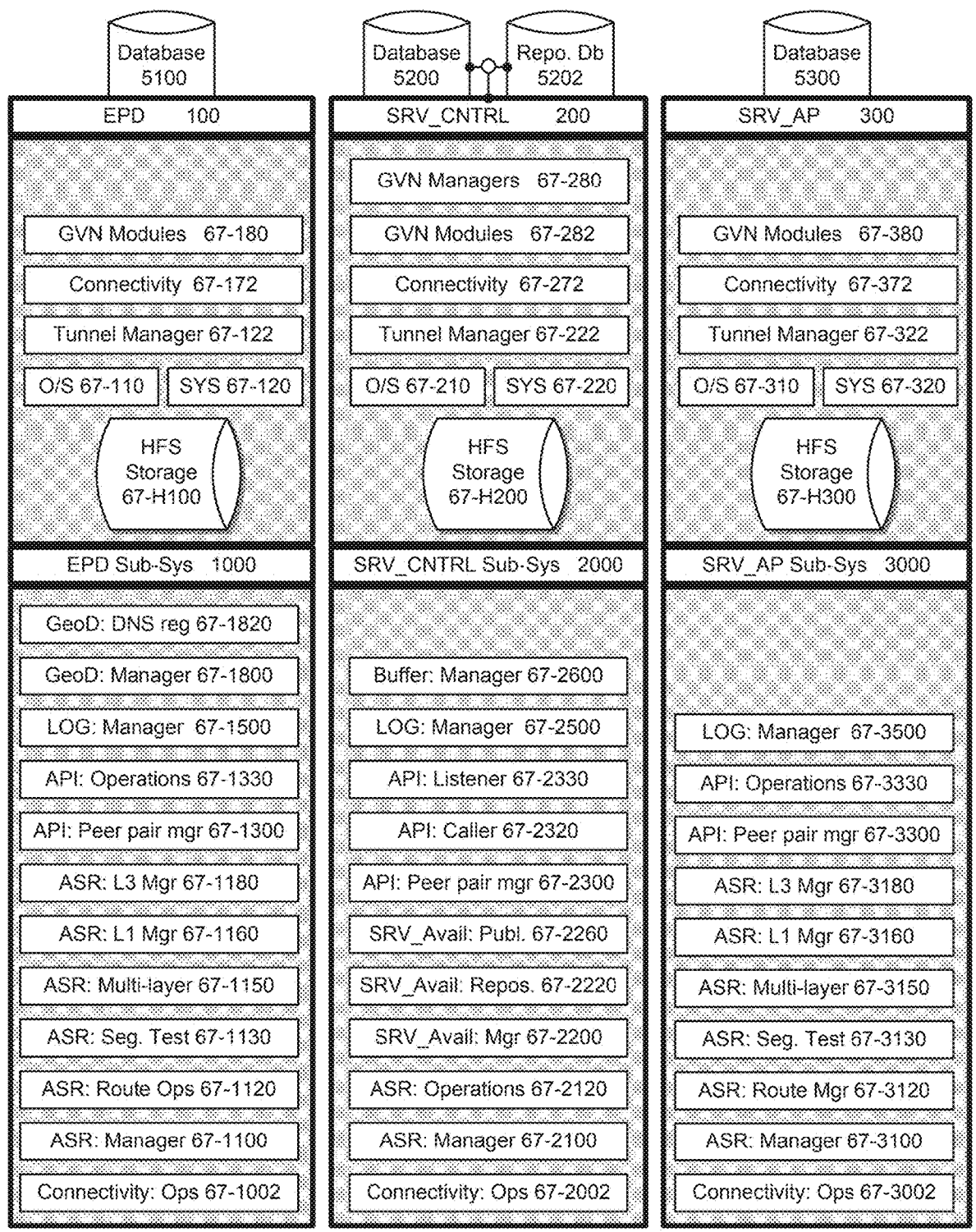
FIG. 67 illustrates some system modules and components for an end point device EPD, central control server SRV_CNTRL, and an access point server SRV_AP.

FIG. 67 illustrates some system modules and components for an end point device EPD 100, central control server SRV_CNTRL 200, and an access point server SRV_AP 300. Subsystems have been identified by function and are indicated with prefixes including Connectivity for general connectivity operations, ASR for advanced smart routing, API for application programming interface, LOG for the logging module and related subsystems, GeoD for the geodestination module and related subsystems, SRV_Avail for server availability list and related subsystems, Buffer for buffer management and related subsystems.

The invention claimed is:

1. A method for connecting devices via a virtual overlay network spanning a plurality of geographical regions and at least partially overlying a network using packets forwarded based at least in part on an Internet protocol, comprising:

at each of an endpoint device, a first access point server providing access to a first geographical region via the virtual overlay network, and a second access point server providing access to a second geographical region via the virtual overlay network, receiving, from a control server for the virtual overlay network, respective peering information and credentials;

the endpoint device and the first access point server automatically establishing at least two secure first tunnels between the endpoint device and the first access point server, based at least in part on their respective peering information and credentials, the at least two secure first tunnels each egressing the endpoint device at a common physical interface;

the endpoint device and the second access point server automatically establishing at least two secure second tunnels between the endpoint device and the second access point server, based at least in part on their respective peering information and credentials, the at least two secure second tunnels each egressing the endpoint device at the common physical interface;

the endpoint device automatically configuring a first virtual interface to provide the endpoint device a logical point of access to the first geographical region, through at least the at least two secure first tunnels;

the endpoint device automatically configuring a second virtual interface to provide the endpoint device a logical point of access to the second geographical region, through at least the at least two secure second tunnels; and for a particular traffic flow to be routed from the endpoint device toward a destination reachable in the second geographical region, evaluating a routing table comprising entries associated respectively each of the first and second virtual interfaces, to select the second virtual interface for that particular traffic flow, and based at least on selection of the second virtual interface, attributes of the particular traffic flow, and attributes of the at least two secure second tunnels, selecting a particular tunnel of the at least two secure second tunnels for forwarding that particular traffic flow.

2. The method of claim 1, further comprising, prior to automatically establishing the at least two secure second tunnels, receiving performance information via the control server indicating that a path to the second geographical region through the second access point server is more optimal than an existing path to the second geographical region, and prompting establishment of the at least two secure second tunnels based at list in part on the performance information.

3. The method of claim 2, wherein the performance information indicates to the endpoint device that the second access point server is more optimal than an existing path to the second geographical region for a particular traffic type.

4. The method of claim 1, wherein at least one of the at least two secure second tunnels is in an active state, and at least one other of the at least two secure second tunnels is concurrently in a standby state.

5. The method of claim 4, further comprising the endpoint device periodically testing the at least one other tunnel in the standby state to assess its viability and operational capability.

6. The method of claim 4, further comprising the endpoint device periodically testing the at least one tunnel in the active state to assess its viability and operational capability.

7. The method of claim 4, further comprising the endpoint device and the second access point server keeping the at least one other tunnel in the standby state alive with at least one of pings or keep alive traffic.

8. The method of claim 4, further comprising, upon the occurrence of a deprecation event, the endpoint device transitions the at least one tunnel in the active state to a deprecated state, transitions the least one other tunnel in the standby state to the active state, and configures the second virtual interface to adjust the logical point of access to the second geographical region to conform to the said transitions.

9. The method of claim 8, wherein the deprecation event comprises an indication that quality of service (QOS) available through the at least one other tunnel in the standby state is superior to QoS available through the at least one tunnel in the active state.

10. The method of claim 1, wherein at least one of the at least two secure first or second tunnels is wrapped in another tunnel.

11. The method of claim 10, wherein at least one of the tunnels wrapped in another tunnel is capped.

12. The method of claim 1, wherein at least one of the at least two secure first or second tunnels is capped.

13. The method of claim 1, further comprising the endpoint device and at least one of the first and second access point servers maintaining parallel non-unique streams between one another on respective ones of the secure tunnels between them, at least during a time of detected packet loss.

14. The method of claim 1, wherein the first access point server is associated with an egress point of the virtual overlay network, and one or more first entries in the routing table associated with the first virtual interface comprise routes selected so as to force egress through the egress point.

15. The method of claim 1, wherein the peering information received by the endpoint device comprises unique port information for each of the first and second access point servers.

16. The method of claim 15, wherein the unique port information received from the control server changes over time.

17. The method of claim 1, further comprising automatically adding at least one of the at least two secure second tunnels to the configuration of the second virtual interface while the second virtual interface already has at least one active entry in the routing table.

* * * * *